(12) United States Patent
Faccin et al.

(10) Patent No.: US 11,223,628 B2
(45) Date of Patent: Jan. 11, 2022

(54) USING MULTIPLE CREDENTIALS FOR ACCESS AND TRAFFIC DIFFERENTIATION

(71) Applicant: QUALCOMM Incorporated, San Diego, CA (US)

(72) Inventors: Stefano Faccin, San Ysidro, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/543,451

(22) Filed: Aug. 16, 2019

(65) Prior Publication Data

US 2019/0372984 A1 Dec. 5, 2019

Related U.S. Application Data

(62) Division of application No. 15/702,546, filed on Sep. 12, 2017, now abandoned, which is a division of
(Continued)

(51) Int. Cl.
*H04L 29/06* (2006.01)
*H04W 4/24* (2018.01)
(Continued)

(52) U.S. Cl.
CPC .......... *H04L 63/102* (2013.01); *H04L 67/141* (2013.01); *H04M 15/00* (2013.01);
(Continued)

(58) Field of Classification Search
CPC ..... H04L 63/102; H04L 63/08; H04L 67/141; H04L 12/1407; H04L 42/0893;
(Continued)

(56) References Cited

U.S. PATENT DOCUMENTS 8,091,121 B2 1/2012 Lioy
8,325,688 B2 12/2012 Mahendran et al.
(Continued)

FOREIGN PATENT DOCUMENTS

AU 2013228815 A1 7/2014
CN 1531247 A 9/2004
(Continued)

OTHER PUBLICATIONS

European Search Report—EP18183235—Search Authority—Munich—dated Dec. 3, 2018.
(Continued)

*Primary Examiner* — Michael S McNally
(74) *Attorney, Agent, or Firm* — Qualcomm Incorporated

(57) ABSTRACT

The disclosure relates in some aspects to establishing connectivity with a network using a first set of credentials and determining whether additional connectivity needs to be established (e.g., using a second set of credentials) to communicate data. The disclosure relates in some aspects to the use of multiple credentials for access and service connectivity. For example, traffic generated by a device may be authorized based on a different set of credentials than the set of credentials used to access the network (e.g., to connect to an LTE network for a PDN connection). In this way, traffic belonging to a specific service or application can be charged and policed based on service specific needs. The disclosure thus relates in some aspects to the use of access credentials and service credentials. These different types of credentials can be used to enable traffic differentiation and policing based on the credentials in use.

29 Claims, 29 Drawing Sheets

Related U.S. Application Data application No. 14/843,727, filed on Sep. 2, 2015, now Pat. No. 9,794,266.

(60) Provisional application No. 62/046,665, filed on Sep. 5, 2014.

(51) Int. Cl.

| | | |
|---|---|---|
| *H04W 48/02* | (2009.01) | |
| *H04M 15/00* | (2006.01) | |
| *H04L 29/08* | (2006.01) | |
| *H04W 12/08* | (2021.01) | |
| *H04W 12/06* | (2021.01) | |
| *H04W 88/06* | (2009.01) | |
| *H04L 12/14* | (2006.01) | |
| *H04L 12/24* | (2006.01) | |

(52) U.S. Cl.
CPC ............ *H04M 15/66* (2013.01); *H04W 4/24* (2013.01); *H04W 12/06* (2013.01); *H04W 12/068* (2021.01); *H04W 12/08* (2013.01); *H04W 48/02* (2013.01); *H04W 88/06* (2013.01); *H04L 12/1407* (2013.01); *H04L 41/0893* (2013.01); *H04L 63/08* (2013.01)

(58) Field of Classification Search
CPC ... H04W 12/068; H04W 12/06; H04W 12/08; H04W 48/02; H04W 88/06; H04M 15/00; H04M 15/66
USPC .............................................................. 726/1
See application file for complete search history.

(56) References Cited

U.S. PATENT DOCUMENTS

| | | |
|---|---|---|
| 9,794,266 B2 | 10/2017 | Faccin et al. |
| 2001/0047401 A1 | 11/2001 | McTernan et al. |
| 2002/0129146 A1 | 9/2002 | Aronoff et al. |
| 2005/0063333 A1 | 3/2005 | Patron et al. |
| 2005/0289652 A1 | 12/2005 | Sharma et al. |
| 2006/0218396 A1 | 9/2006 | Laitinen et al. |
| 2007/0244987 A1 | 10/2007 | Pedersen et al. |
| 2008/0247360 A1 | 10/2008 | Tinnakornsrisuphap et al. |
| 2009/0029846 A1 | 1/2009 | Fitt et al. |
| 2009/0067436 A1 | 3/2009 | Gast et al. |
| 2009/0080664 A1 | 3/2009 | Jung et al. |
| 2009/0199268 A1* | 8/2009 | Ahmavaara ......... H04L 12/4633 726/1 |
| 2009/0298467 A1* | 12/2009 | Zohar ............... H04M 1/72412 455/411 |
| 2010/0136943 A1 | 6/2010 | Hirvela et al. |
| 2013/0160101 A1 | 6/2013 | Hakola et al. |
| 2014/0165165 A1* | 6/2014 | Story, Jr. .................. H04L 63/08 726/6 |
| 2014/0362807 A1 | 12/2014 | Bhatnagar et al. |
| 2015/0085664 A1 | 3/2015 | Sachdev et al. |
| 2015/0128205 A1 | 5/2015 | Mahaffey et al. |
| 2015/0201333 A1 | 7/2015 | Raleigh |
| 2018/0007057 A1 | 1/2018 | Faccin et al. |

FOREIGN PATENT DOCUMENTS

| | | |
|---|---|---|
| CN | 1539216 A | 10/2004 |
| CN | 101621803 A | 1/2010 |
| CN | 102438330 A | 5/2012 |
| CN | 102812758 A | 12/2012 |
| CN | 103167626 A | 6/2013 |
| CN | 103327566 A | 9/2013 |
| CN | 103339989 A | 10/2013 |
| EP | 1492296 A1 | 12/2004 |
| EP | 1873668 A1 | 1/2008 |
| EP | 2288211 A1 | 2/2011 |
| EP | 2750425 A1 | 7/2014 |
| JP | 2009514256 A | 4/2009 |
| JP | 2011044799 A | 3/2011 |
| WO | 2005046147 A1 | 5/2005 |
| WO | 2006085292 A1 | 8/2006 |
| WO | 2007120306 A2 | 10/2007 |
| WO | 2012068462 A2 | 5/2012 |

OTHER PUBLICATIONS

International Search Report and Written Opinion—PCT/US2015/048374—ISA/EPO—dated Feb. 24, 2016.
Taiwan Search Report—TW104129174—TIPO—dated Jan. 3, 2018.
European Search Report—EP21179430—Search Authority—Munich—dated Sep. 10, 2021.

* cited by examiner

USING MULTIPLE CREDENTIALS FOR ACCESS AND TRAFFIC DIFFERENTIATION

CROSS-REFERENCE TO RELATED APPLICATION(S)

This application is a divisional of, and claims priority to, U.S. patent application Ser. No. 15/702,546 filed Sep. 12, 2017, which is a divisional of, and claims priority to, U.S. patent application Ser. No. 14/843,727 filed Sep. 2, 2015, now issued as U.S. Pat. No. 9,794,266, which claims priority to U.S. Provisional Patent Application No. 62/046,665 filed in the U.S. Patent and Trademark Office on Sep. 5, 2014.

BACKGROUND

Field of the Disclosure

Aspects of the disclosure relate generally to wireless communication, and more specifically, but not exclusively, to the use of multiple credentials for traffic differentiation.

Description of Related Art

Different forms of connection and subscription management are employed in different wireless communication networks. Third generation partnership project (3GPP) defined the use of one subscription at a time. 3GPP does not enable dynamic subscriptions or over-the-air (OTA) sign-up by a user equipment (UE). The Wi-Fi alliance specifies, as a starting point, that a user selects manually the subscription to be used. This selection could be performed by upper layer solutions. Based on the subscription selected, appropriate policies (e.g., Hotspot 2.0 managed object (HS2.0 MO)) are used. Thus, in some aspects, Wi-Fi enables dynamic subscriptions and OTA sign up for provisioning. In 3GPP and wireless local area network (WLAN) deployments, all mechanisms are defined considering only one subscription being used at any single time. However, there can be a scenario with multiple credentials in use. When a user is connected to a 3GPP network, the user may manually select a specific WLAN and the credentials for it. This typically leads to non-seamless WLAN offload (NSWO) connectivity. Traffic routing is then based on access network discovery and selection function (ANDSF). It is theoretically possible that the UE selects a different subscription and a WLAN that enables evolved packet core (EPC) connectivity, but UE and network behavior for traffic routing is rather undefined in that case. HS2.0 OTA sign-up is not adopted by 3GPP.

3GPP has defined network-based policing mechanisms employing network awareness. This network awareness is based on applications and traffic type. For example, a policy and charging control (PCC) function has awareness for charging and policing of traffic type and applications such as application-based charging (ABC). Deep packet inspection (DPI) is used in most cases. Thus, there is an implicit awareness of these network attributes. The 3GPP policing mechanism is centralized in the packet data network gateway (PDN GW).

Policing based on quality of service (QoS) status has also been proposed. QoS in a 3GPP network can involve a "pipe" model employing dedicated bearers with QoS "enforcement" in the radio access network (RAN) and the core network (CN) (e.g., in a PDN GW). QoS in a 3GPP network can involve a centralized policing model employing PCC in a PDN GW, whereby "remote" control of QoS enforcement is accomplished in the RAN. In 3GPP policing, the PCC applies traffic policies. There are no per application QoS or per application requirements, just per application charging when ABC is implemented (DPI approach). QoS in Wi-Fi involves IP traffic mapped to access classes based on traffic marking There is no bearer concept. In practice, QoS has not been deployed in 3GPP or Wi-Fi networks due to lack of compelling business cases (e.g., the lack of actual need).

In a QoS model with traffic differentiation, a device "marks" packets appropriately to enable the network to differentiate the traffic. In a passive model (DPI-based), traffic is routed in the core network and examined. An active 3GPP model employs QoS with dedicated bearer creation based on PCC. Also, a device can communicate to a PDN GW information on applications.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: establish a first connectivity with a wireless communication network via a serving node through use of a first set of credentials; determine that data for the apparatus is to be communicated; determine whether a second connectivity needs to be established to communicate the data for the apparatus; and negotiate establishment of the second connectivity via the serving node through use of a second set of credentials if the second connectivity needs to be established.

Another aspect of the disclosure provides a method for a client device to establish connectivity for data traffic. The method includes: establishing a first connectivity with a wireless communication network via a serving node through use of a first set of credentials; determining that data for the client device is to be communicated; determining whether a second connectivity needs to be established to communicate the data for the client device; and negotiating establishment of the second connectivity via the serving node through use of a second set of credentials if the second connectivity needs to be established.

Another aspect of the disclosure provides an apparatus configured for communication. The apparatus including: means for establishing a first connectivity with a wireless communication network via a serving node through use of a first set of credentials; means for determining that data for the apparatus is to be communicated; means for determining whether a second connectivity needs to be established to communicate the data for the apparatus; and means for negotiating establishment of the second connectivity via the serving node through use of a second set of credentials if the second connectivity needs to be established.

Another aspect of the disclosure provides a non-transitory computer-readable medium storing computer-executable code, including code to: establish a first connectivity with a wireless communication network via a serving node through use of a first set of credentials; determine that data for a client device is to be communicated; determine whether a second connectivity needs to be established to communicate the data for the client device; and negotiate establishment of the second connectivity via the serving node through use of a second set of credentials if the second connectivity needs to be established.

Examples of additional aspects of the disclosure follow. In some aspects, the determination of whether the second connectivity needs to be established may include determining, based on information describing the data, whether the first connectivity can be used to communicate the data.

In some aspects, the second set of credentials may be associated with the data, and the negotiation of the establishment of the second connectivity may include selecting the second set of credentials. In some aspects, the selection of the second set of credentials may be based on information describing the data. In some aspects, the selection of the second set of credentials may be based on traffic identifying information that may include at least one of: an application identifier (ID), a service ID, a subscription ID, or a traffic filter. In some aspects, the negotiation of the establishment of the second connectivity may include sending a request that includes at least one of the second set of credentials. In some aspects, the second set of credentials may be associated with at least one of: an application, a service, a service provider, a radio bearer, a virtual wireless communication network, or a dynamic mobile virtual network operator (DMVNO). In some aspects, the second set of credentials includes at least one of: an ownership entity identifier, a content provider identifier, an application identifier, an ownership entity policy, a security credential, an identity of a charging entity for corresponding traffic, or an identity of an authorizing entity for corresponding traffic.

In some aspects, the negotiation of the establishment of the second connectivity may be based on at least one of: a selected set of credentials, or information describing the data. In some aspects, the establishment of the first connectivity may include creating a traffic binding based on the first set of credentials.

In some aspects, the establishment of the second connectivity may include creating a traffic binding based on the second set of credentials. In some aspects, the creation of the traffic binding may include at least one of: creating specific traffic flow templates (TFTs), creating extended TFTs, receiving information about the traffic binding at the client device (or apparatus), or receiving information about the traffic binding at a radio access network (RAN). In some aspects, the creation of the traffic binding may include defining packet marking to be added to at least one data packet of the data. In some aspects, the packet marking may include differentiated services code point (DSCP) marking that includes at least one of: an application identifier (ID), a service ID, an ownership entity (OE) ID, a subscription ID, or a service provider ID. In some aspects, the traffic binding may include a mapping of a specific service bearer identifier (ID) to at least one of: an application, a service, or a subscription. In some aspects, the specific service bearer ID may include at least one of: a dedicated radio access bearer identifier (RAB ID) allocated by a network for specific traffic upon creation of the binding, an existing RAB ID augmented with a qualifier for the data, an existing packet data network (PDN) RAB ID augmented with a qualifier for the data, or a generic RAB ID augmented with a qualifier for the data. In some aspects, the specific service bearer ID is selected if the client device (or apparatus) is generating traffic corresponding to a specific application, service, or subscription.

In some aspects, the establishment of the first connectivity may include at least one of: the client device (or apparatus) performing an attach procedure and establishing a data connection, or the client device (or apparatus) installing data traffic and traffic binding information corresponding to a transport connection being created based on the first set of credentials. In some aspects, the negotiation of the establishment of the second connectivity may include at least one of: establishment of a new data connection, establishment of a new packet data network (PDN) connection, establishment of new communication bearers, or modification of existing communication bearers. In some aspects, the serving node may be a mobility management entity (MME) or a serving general packet radio service (GPRS) support node (SGSN).

In one aspect, the disclosure provides an apparatus configured for communication that includes a memory device and a processing circuit coupled to the memory device. The processing circuit is configured to: establish, based on a first set of credentials, dynamic wireless communication access to enable at least one other apparatus to communicate data via a wireless communication network; and communicate configuration information for support of the dynamic wireless communication access.

Another aspect of the disclosure provides a method for a client device to establish wireless communication access. The method includes: establishing, based on a first set of credentials, dynamic wireless communication access to enable at least one other device to communicate data via a wireless communication network; and communicating configuration information for support of the dynamic wireless communication access.

Another aspect of the disclosure provides an apparatus configured for communication. The apparatus including: means for establishing, based on a first set of credentials, dynamic wireless communication access to enable at least one other apparatus to communicate data via a wireless communication network; and means for communicating configuration information for support of the dynamic wireless communication access.

Another aspect of the disclosure provides a non-transitory computer-readable medium storing computer-executable code, including code to: establish, based on a first set of credentials, dynamic wireless communication access to enable at least one device to communicate data via a wireless communication network; and communicate configuration information for support of the dynamic wireless communication access.

Examples of additional aspects of the disclosure follow. In some aspects, the establishment of the dynamic wireless communication access may include negotiation between the apparatus (e.g., the client device) and a network entity. In some aspects, the establishment of the dynamic wireless communication access may include at least one of: identifying specific services and content for the dynamic wireless communication access, or providing specific services and content for the dynamic wireless communication access. In some aspects, the establishment of the dynamic wireless communication access may include: creating an identifier for the dynamic wireless communication access, or receiving an identifier for the dynamic wireless communication access. In some aspects, policies related to the dynamic wireless communication access may be determined based on: the first set of credentials and negotiations to establish the dynamic wireless communication access.

In some aspects, the establishment of the dynamic wireless communication access may include determining that the at least one other apparatus (e.g., at least one client device)

is authorized to join the dynamic wireless communication access. In some aspects, the communication of the configuration information may include distributing service credentials associated with the dynamic wireless communication access to the at least one other apparatus. In some aspects, the communication of the configuration information may include sending an identifier of the dynamic wireless communication access to the at least one other apparatus.

In some aspects, the communication of the configuration information may include: identifying at least one credential that is authorized for the dynamic wireless communication access; and sending the identified at least one credential to the at least one other apparatus.

In some aspects, the communication of the configuration information may include distributing to a radio access network (RAN) information about the dynamic wireless communication access. In some aspects, the information about the dynamic wireless communication access may include at least one of: a dynamic wireless communication access identifier (ID), or a dynamic wireless communication access policy.

In some aspects, access information for service access to the dynamic wireless communication access may be communicated. In some aspects, the communication of the access information may include at least one of: a radio access network (RAN) advertising support for the dynamic wireless communication access, broadcasting the access information, or sending the access information to the at least one other apparatus in response to a request from the at least one other apparatus.

In one aspect, the disclosure provides an apparatus configured for communication that includes a memory device and a processing circuit coupled to the memory device. The processing circuit is configured to: receive service credentials from a device that established a dynamic subscription for wireless communication based on access credentials; request access to service connectivity based on the dynamic subscription through the use of the service credentials; and establish the service connectivity via a radio access network (RAN) as a result of requesting the access.

Another aspect of the disclosure provides a method for communication including: receiving service credentials from a device that established a dynamic subscription for wireless communication based on access credentials; requesting access to service connectivity based on the dynamic subscription through the use of the service credentials; and establishing the service connectivity via a radio access network (RAN) as a result of requesting the access.

Another aspect of the disclosure provides an apparatus configured for communication. The apparatus including: means for receiving service credentials from a device that established a dynamic subscription for wireless communication based on access credentials; means for requesting access to service connectivity based on the dynamic subscription through the use of the service credentials; and means for establishing the service connectivity via a radio access network (RAN) as a result of requesting the access.

Another aspect of the disclosure provides a non-transitory computer-readable medium storing computer-executable code, including code to: receive service credentials from a device that established a dynamic subscription for wireless communication based on access credentials; request access to service connectivity based on the dynamic subscription through the use of the service credentials; and establish the service connectivity via a radio access network (RAN) as a result of requesting the access.

In one aspect, the disclosure provides an apparatus configured for communication that includes a memory device and a processing circuit coupled to the memory device. The processing circuit is configured to: negotiate with a first device to establish a dynamic subscription for wireless communication based on access credentials; receive a request from a second device for access to service connectivity based on the dynamic subscription, wherein the request includes service credentials associated with the dynamic subscription; determine whether the second device is authorized to access the service connectivity; and establish the service connectivity for the second device via a radio access network (RAN) as a result of the determination.

Another aspect of the disclosure provides a method for communication including: negotiating with a first device to establish a dynamic subscription for wireless communication based on access credentials; receiving a request from a second device for access to service connectivity based on the dynamic subscription, wherein the request includes service credentials associated with the dynamic subscription; determining whether the second device is authorized to access the service connectivity; and establishing the service connectivity for the second device via a radio access network (RAN) as a result of the determination.

Another aspect of the disclosure provides an apparatus configured for communication. The apparatus including: means for negotiating with a first device to establish a dynamic subscription for wireless communication based on access credentials; means for receiving a request from a second device for access to service connectivity based on the dynamic subscription, wherein the request includes service credentials associated with the dynamic subscription; means for determining whether the second device is authorized to access the service connectivity; and means for establishing the service connectivity for the second device via a radio access network (RAN) as a result of the determination.

Another aspect of the disclosure provides a non-transitory computer-readable medium storing computer-executable code, including code to: negotiate with a first device to establish a dynamic subscription for wireless communication based on access credentials; receive a request from a second device for access to service connectivity based on the dynamic subscription, wherein the request includes service credentials associated with the dynamic subscription; determine whether the second device is authorized to access the service connectivity; and establish the service connectivity for the second device via a radio access network (RAN) as a result of the determination.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the features discussed herein. In other words, while one or more implementations may be discussed as having certain features, one or more of such features may also be used in accordance with the various implementations of the disclosure discussed herein. In similar fashion, while certain implementations may be discussed below as device, system, or method implementa-

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
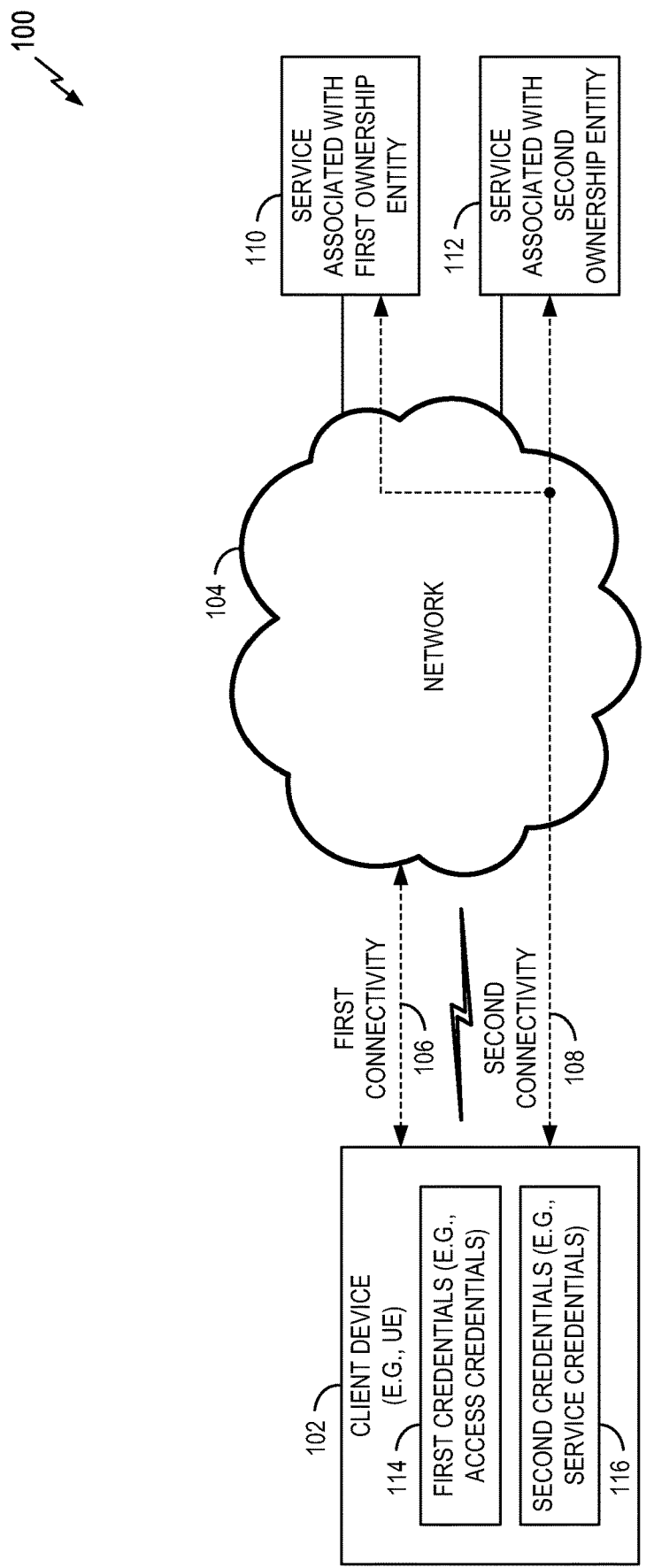
FIG. 1 illustrates an example of a communication system that supports connectivity in accordance with some aspects of the disclosure.

Referring to the communication system 100 of FIG. 1, the disclosure relates in some aspects to a client device 102 that establishes connectivity with a wireless communication network 104 and one or more services. The client device 102 may establish first connectivity 106 to access the network 104. Accessing the network 104 may involve, for example, connecting to a long term evolution (LTE) network for a packet data network (PDN) connection. In addition, the client device 102 may establish second connectivity 108 for data traffic associated with certain network services 110 and 112 (e.g., applications, content, etc.). In some aspects, different network services are associated with different ownership entities (OEs)).

The disclosure relates in some aspects to using multiple credentials to enable the client device 102 to obtain access connectivity and service connectivity. For example, the client device 102 may use a first set of credentials 114 (e.g., access credentials) to access the network 104, while traffic generated by the client device 102 may be authorized based on a second set of credentials 116 (e.g., service credentials). The client device 102 may use different service credentials to access the different network services 110 and 112. In this way, traffic belonging to a specific service or application can be charged and policed based on service specific needs.

The disclosure thus relates in some aspects to the use of access credentials and service credentials. As discussed in detail below, these different credentials can be used to enable traffic differentiation and policing based on the credentials in use.

With the introduction of 5G technologies, there is an opportunity to enable the creation of dynamic subscriptions for flexible and easy establishment of virtual wireless communication networks such as dynamic mobile virtual network operators (DMVNOs). For a virtual wireless communication network (e.g., supported by a specific device) the cost of accessing network resources for a set of devices can be charged to the device creating the virtual wireless communication network, by a service provider (e.g., FACEBOOK establishes a DMVNO for free access for FACEBOOK devices), or some other entity. For the specific case of virtual wireless communication networks, dynamic credentials according to the teachings herein can be used to obtain virtual wireless communication network connectivity.

Several example aspects of the disclosure will now be described with reference to FIGS. 2-5. For purposes of illustration, these figures may illustrate various components in the context of a 3GPP long term evolution (LTE) architecture. It should be appreciated, however, that the teachings herein may be employed in other types of radio technologies and architectures. For purposes of illustration, various aspects of the disclosure may be described in the context of a DMVNO. It should be appreciated that any teachings relating to DMVNOs specifically, may be applicable to virtual wireless communication networks generally. Also, various operations may be described as being performed by specific types of components (e.g., UEs, servers, etc.). It should be understood that these operations can be performed by other types of devices. To reduce the complexity of these figures, only few example components are shown. However, the teachings herein can be implemented using a different number of components or other types of components.

Different Credentials for Different Ownership Entities

In some aspects, the teachings herein support evolution of a logical model of a device (e.g., a UE) from a universal subscriber identity module (USIM)-based device that has one or two credentials (e.g., one for cellular and one for Wi-Fi) to a device with multiple ownership entities. Logically, the device is a set of instances of different logical devices "owned" by different "ownership entities" as represented in a simplified manner in FIG. 2.

In some aspects, an ownership entity (OE) may be an entity that provides credentials to an instance of the device for access to transport and/or services. In some aspects, an ownership entity may be an entity that provides policies to an instance of the device. By way of comparison, a conventional mobile network operator (MNO) is the ownership entity providing credentials and policies related to the USIM.

Figure 2:
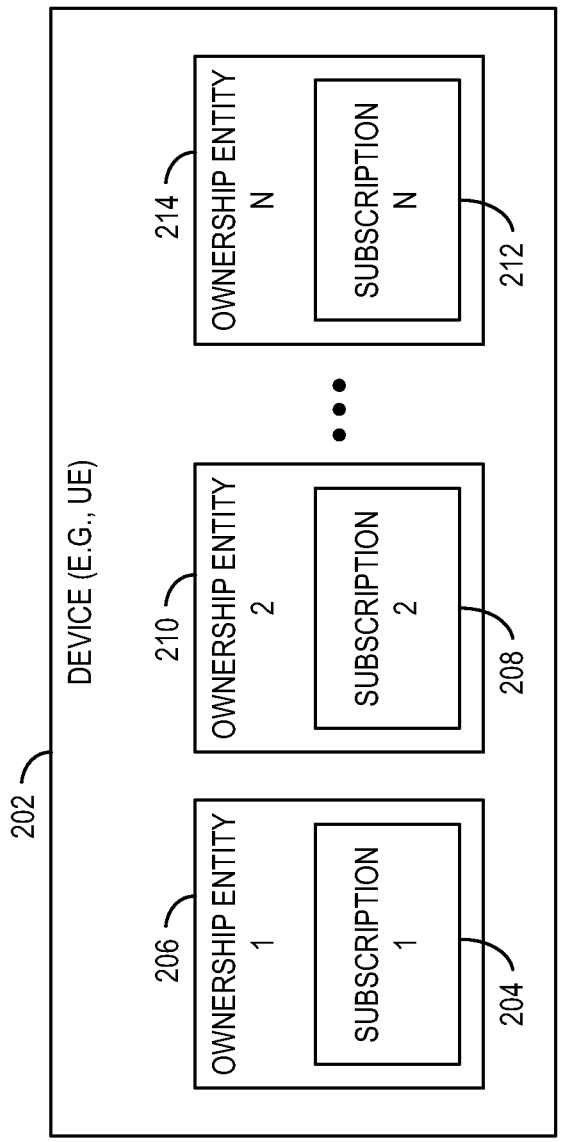
FIG. 2 illustrates an example of a device associated with multiple ownership entities in accordance with some aspects of the disclosure.

One or more of the following features may be used to support multiple ownership entities. As shown in FIG. 2, a device 202 (e.g., a user equipment, UE) may maintain multiple subscriptions, where each subscription corresponds to a different ownership entity. In this example, a first subscription 204 (subscription 1) is associated with a first ownership entity 206 (ownership entity 1), a second subscription 208 (subscription 2) is associated with a second ownership entity 210 (ownership entity 2), and so on, through an $n^{th}$ subscription 212 (subscription N) that is associated with an $n^{th}$ ownership entity 214 (ownership entity N). Other ownership entity and subscription relationships may be employed in other implementations. For example, an ownership entity may be associated with multiple subscriptions.

Subscriptions can be used to authorize different types of traffic. For example, a subscription from FACEBOOK is used for FACEBOOK traffic, a subscription from NETFLIX is used for NETFLIX traffic, and so on.

Advantageously, credentials (e.g., for a subscription) can be provided by generic service providers (SPs) and not only by the mobile network operator. Also, temporary credentials (e.g., for an ad-hoc mobile virtual network operator (MVNO) or sponsorship by a content provider) can be created, stored and used in a device (e.g., a UE). This can enable service providers and applications to provide sponsored content and preferential/differentiated treatment for the traffic (e.g., a fast lane, better QoS, specific traffic routing, etc.).

Distributed awareness of traffic ownership can also be used to support multiple ownership entities. For example, a UE and a network can employ mechanisms to distinguish the traffic belonging to one ownership entity from the rest of the traffic for differentiated treatment (e.g., QoS, routing, etc.).

As mentioned above, a conventional wireless device on a specific access uses one and only one set of credentials. Devices may have subscriptions to services that enable access to content, but transport of Internet protocol (IP) traffic is tied to the credentials used for access: authorization, policing, and charging.

The disclosure relates in some aspects to separating the credentials used for the "access" from the credentials that are used to transport data. Multiple subscriptions in a device can be used simultaneously over the same access (e.g., for different traffic). One subscription can be shared by multiple devices. For example, different credentials based on the same master key can be distributed to different devices. Moreover, provisioning of credentials can be highly dynamic (e.g., dynamic on a short-term basis). For example, such a credential may be changed frequently (e.g., daily, weekly, etc.), changed randomly (e.g., for an event, based on a location, etc.), or maintained for a relatively short period of time (e.g., several hours, one day, one week, etc.). This is in contrast with conventional USIM provisioning where credentials are typically distributed to devices on a long-term basis (e.g., annually, bi-annually, etc.).

Figure 3:
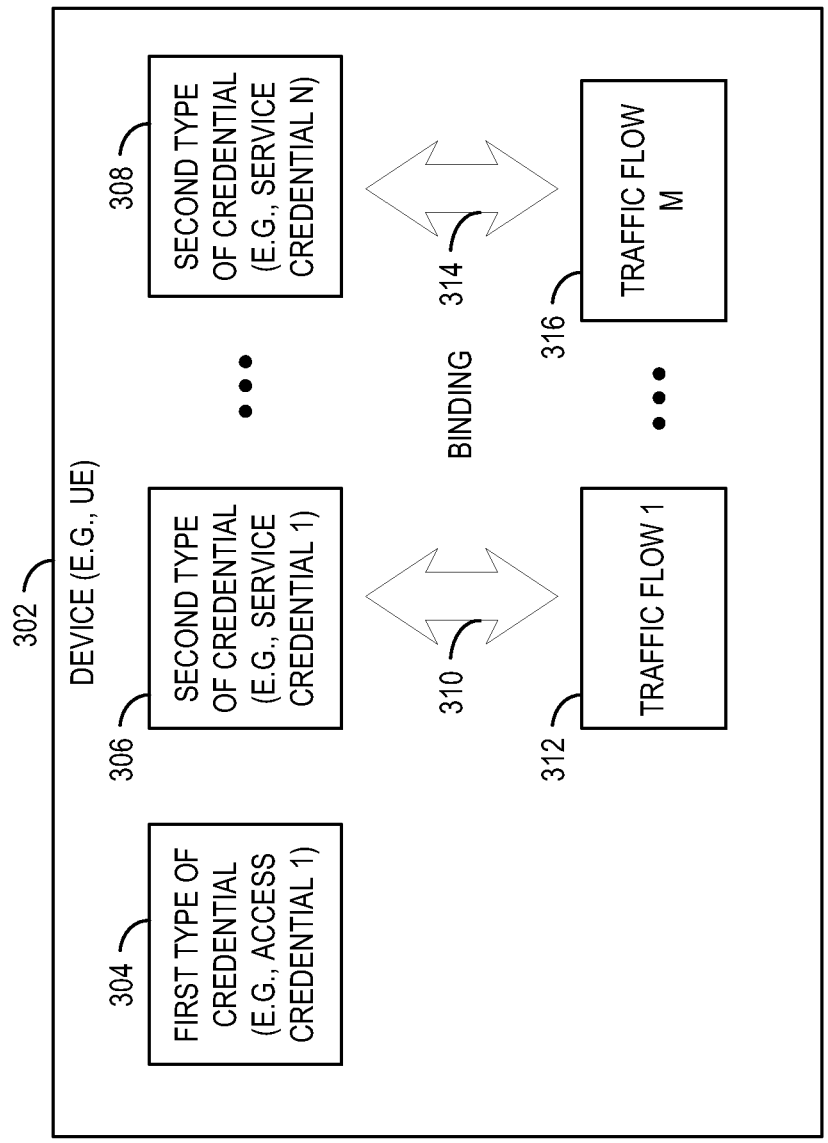
FIG. 3 illustrates an example of a device that maintains multiple credentials in accordance with some aspects of the disclosure.

As illustrated in the simplified example of FIG. 3, a device 300 (e.g., a UE) is provided with multiple sets of credentials. Each set of credentials contains, for example, one or more of: an ownership entity identifier (ID), a content provider ID, an application ID; ownership entity policies (e.g., an OE-specific ANDSF MO); or security credentials (e.g., security keys and certificates associated with a particular OE). An OE-specific policy can specify, for example, how traffic for that OE is to be treated (e.g., routed).

In some implementations, two types of credentials are used: access credentials and service credentials. In the example of FIG. 3, the device 302 maintains a first type of credential 304 (e.g., an access credential 1). In addition, the device 302 maintains several credentials of a second type: a first credential 306 (e.g., a service credential 1), and so on, through an $n^{th}$ credential 308 (e.g., a service credential N). Other credential relationships may be employed in other implementations. For example, a device may be associated with a different number of access and/or service credentials at different points in time.

Access credentials are used to gain access to service provider transport (e.g., access to a network). For example, access credentials may be similar in some aspects to conventional USIM credentials.

Service credentials are used by a device to generate authorized traffic when access credentials have been used to gain access. In some aspects, service credentials can identify to the network the entity (e.g., a user) to be charged for a given traffic flow and the entity (e.g., a service provider) that authorizes the transport of this traffic. For example, credentials may be provided by NETFLIX to sponsor NETFLIX functionality. Thus, as indicated in FIG. 3, a given traffic flow may be bound to a given service credential. For example, a first binding 310 may bind data associated with the service credential 1 to a first traffic flow 312 (traffic flow 1) and an $m^{th}$ binding 314 may bind data associated with the service credential N to an $m^{th}$ traffic flow 316 (traffic flow M). Other binding relationships may be employed in other implementations. For example, traffic binding may be employed for different types of credentials.

Different credential formats can be used in different implementations. Advantageously, by using certificates on a more dynamic basis, as opposed to using only USIM certificates on a long-term basis, the dynamicity and flexibility of a network can be improved.

Subscription/Connectivity Model of a Device

Figure 4:
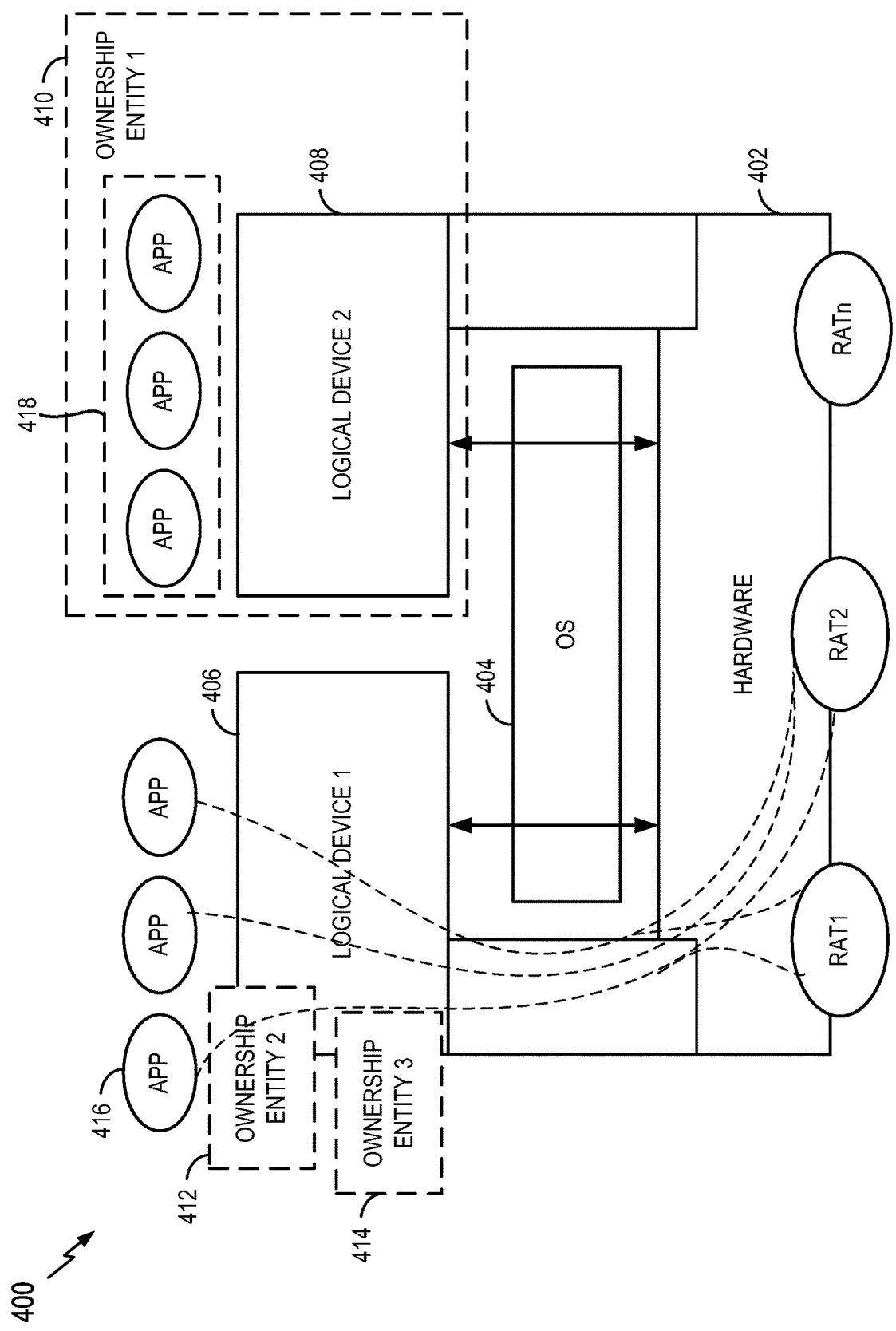
FIG. 4 illustrates an example of a subscription/connectivity model in accordance with some aspects of the disclosure.

FIG. 4 illustrates an example of a subscription and connectivity model 400 of a device (e.g., a UE). As indicated, hardware 402 of the device communicates via an operating system (OS) 404 with multiple logical devices including, a first logical device 406 (logical device 1) and a second logical device 408 (logical device 2). From a logical perspective, different logical devices are associated with different ownership entities. For example, the logical device 1 is associated with a first ownership entity 410 (ownership entity 1), while the logical device 2 is associated with a second ownership entity 412 (ownership entity 2) and a third ownership entity 414 (ownership entity 3).

A given logical device and the associated applications may be owned and/or authorized by a given ownership entity. For example, the ownership entity 2 may authorize access to a first application (APP) 416. As another example, the ownership entity 1 may own or authorize a set of applications 418. In addition, the ownership entity 1 may configure the logical device 2. Access selection and traffic routing can thus be based on the ownership entities, and application awareness (e.g., a mapping of applications to corresponding ownership entities).

In some implementations, the credentials used for the current access may belong to a single ownership entity. The selection of these credentials can be automatic or manual (e.g., with user interaction).

Credential Model of a Device

Figure 5:
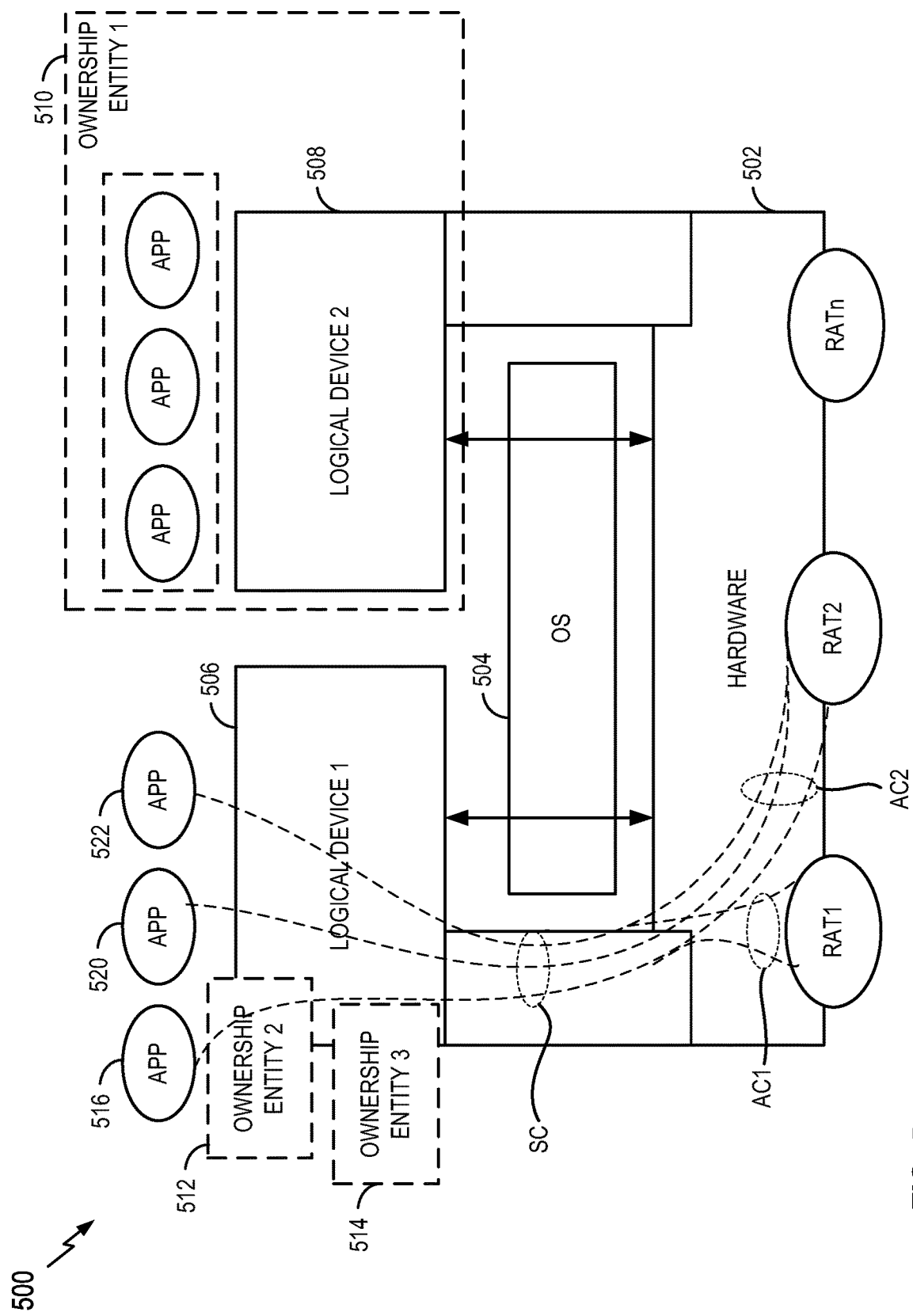
FIG. 5 illustrates an example of a credential model in accordance with some aspects of the disclosure.

FIG. 5 illustrates an example of the application of credentials to a model 500 of a device (e.g., a UE). Similar to the model 400 of FIG. 4, in FIG. 5, hardware 502 of the device communicates via an operating system (OS) 504 with multiple logical devices including, a first logical device 506 (logical device 1) and a second logical device 508 (logical device 2). In addition, the logical device 1 is associated with a first ownership entity 510 (ownership entity 1), while the logical device 2 is associated with a second ownership entity 512 (ownership entity 2) and a third ownership entity 514 (ownership entity 3).

As indicated, a service credential SC may be selected for specific traffic. In other words, different traffic may be bound to different service credentials. To this end, the traffic may be marked (e.g., through the use of an appropriate indication mechanism) to indicate this binding. For example, traffic for an application (APP) 516, traffic for an application 520, and traffic for an application 522 may be bound to different service credentials.

Also, a device may employ multiple access credentials. For example, a first access credential (AC 1) may be used for access to a first RAT (RAT1) and a second access credential (AC 2) may be used for access to a second RAT (RAT2).

In some aspects, service credentials may take the same form as access credentials. For example, credentials may take the same general forms as conventional USIM credentials or Wi-Fi credentials.

In some aspects, at any given time, a device (e.g., a UE) may use one or more access credentials; but no more than one access credential for any specific access. For example the first access credential (AC1) may be used for cellular access and the second access credential (AC2) used for Wi-Fi access.

At any given time, a device may use one or more service credentials. Sets of traffic flows may be associated with a service credential to enable the network to identify the appropriate policies for such traffic. These policies may include, for example, charging and QoS (e.g., throttling down; do not check or block traffic). The association between traffic flows and service credentials also enable a network to route traffic appropriately.

The use of service credentials also enables distributed awareness of ownership entities and service awareness. Service awareness can be an integral component of the quality of experience (QoE) concept.

A split credentials model enables "traffic binding." Credentials in use are bound to traffic. Traffic identifies credentials in use. Binding can be processed in various parts of network (e.g., to perform correct charging, policing, and routing).

In some aspects, service awareness is accomplished through traffic binding. For traffic binding, each packet may "carry" information for service awareness. An example model of traffic binding relates to: applications, credentials, and services.

Conventionally, one access point name (APN) is used per application "type." APN represents an aggregation of services towards a specific network. All these services are routed in the same way. Any differentiation (e.g., charging) is based on DPI.

With traffic binding, an APN model is maintained for traffic differentiation, plus enabling differentiation within a single APN. An APN is still useful for differentiating connectivity to different networks. A single APN model is enabled with traffic differentiation.

In some aspects, traffic binding enables applications (apps) to provide service requirements based on at least one of: a type of application, a related service provider, or a related ownership entity. Lower protocols layers can map this to specific connectivity.

In some implementations, a conventional bearer model is maintained. Current non-access stratum (NAS) and core network (CN) mechanisms may be re-used. Traffic flow templates (TFTs) can be enhanced with appropriate information (e.g., an application identifier (App-ID), an ownership entity ID (OE-ID), a subscription ID, a service provider ID (SP-ID), etc) to enable mapping of specific traffic (mapping the TFTs) to the associated credentials. The mapping through TFT may be established upon bearer creation through an exchange between the UE and the CN.

In some implementations, at bearer creation, a UE negotiates with the CN. Authorization of the service/application is thus provided (if needed, e.g., with an entity providing sponsored connectivity). Service/application traffic is bound to a bearer. For some services/applications, this may result in a 1:1 mapping between service/application and bearers. Thus, the core bearer model may be maintained, while non-access stratum (NAS) procedures can be expanded to enable any needed negotiation/authorization.

Figure 6:
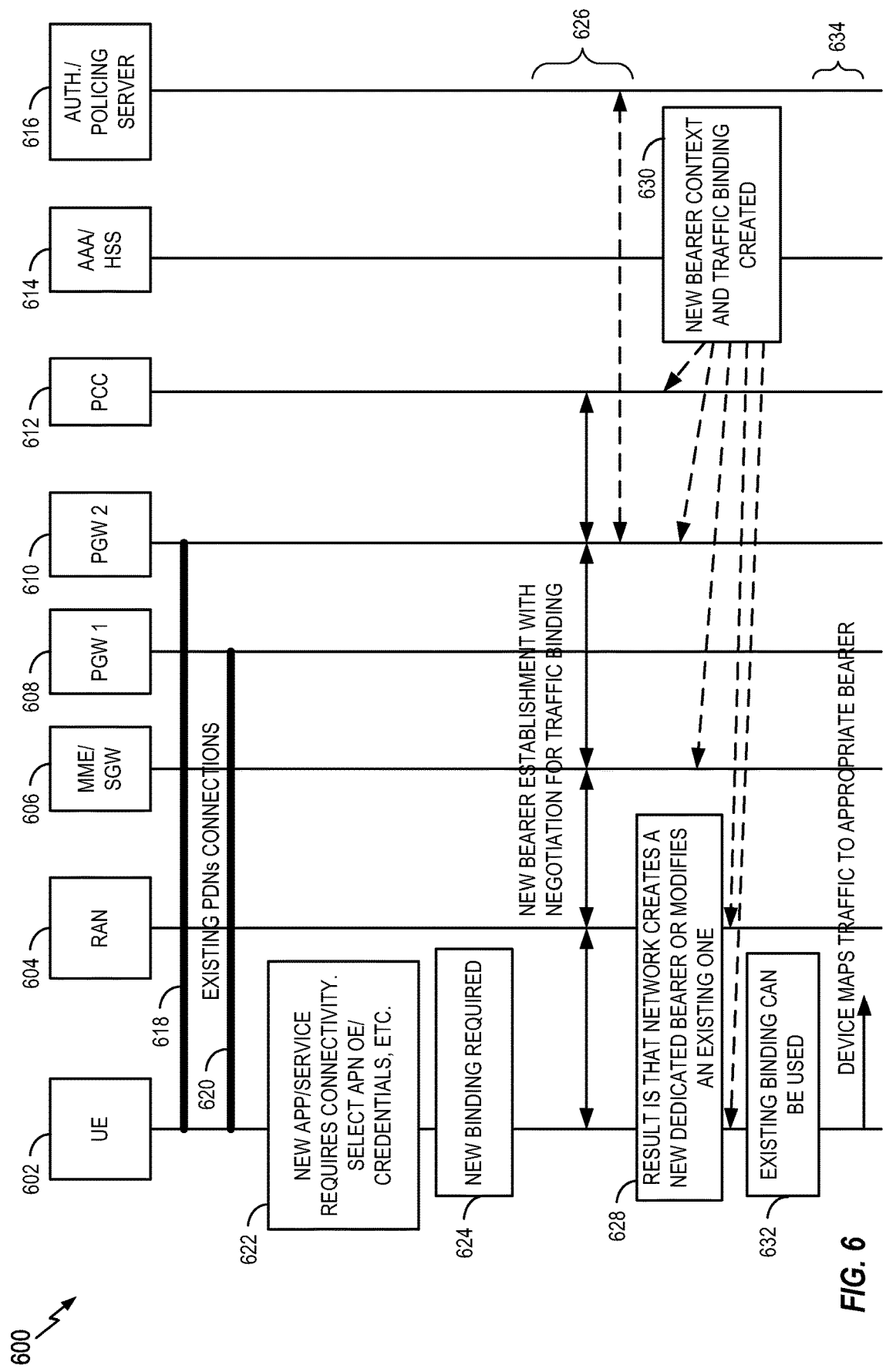
FIG. 6 illustrates an example of signal flow associated with the use of dedicated bearers in accordance with some aspects of the disclosure.

FIG. 6 illustrates an example of signal flow 600 in an implementation of a network that extends the use of dedicated bearers in accordance with the teachings herein. The network includes a UE 602, a RAN 604, a mobility management entity/serving gateway (MME/SGW) 606, a first PDN gateway (PGW) 608 (PGW 1), a second PGW 610 (PGW 2), a PCC 612, an authentication authorization and accounting entity/home subscriber server (AAA/HSS) 614, and an authorization (auth.)/policing server 616.

Initially, the network uses existing PDN connections 618 and 620 for data traffic. As represented by a block 622, at some point in time, a "new" (e.g., newly invoked) application or service for the UE requires connectivity. Thus, the UE selects the corresponding access point name (APN), OE, credentials, etc., for this application or service. As represented by a block 624, a new binding may be required. In this case, new bearers are established, as needed, and negotiation takes place among the network components for the traffic binding 626. As represented by a block 628, the network may thus create a new dedicated bearer or modify an existing bearer. Consequently, as represented by a block 630, a new bearer context and traffic binding may be created for use by the UE 602, the RAN 604, the MME/SGW 606, the PGW 2, and the PCC 612. Alternatively, as represented by a block 632, an existing binding could be used. The devices can then map traffic to the appropriate bearer 634.

In some implementations, an in-band approach is used. In some aspects, this approach moves away from the use of TFT and e2E (UE PDN GW) "pipes." An enhanced TFT may still be used as a construct to describe QoS. In some aspects, this approach creates an overlay bearer concept. Conventional bearers in the CN are maintained if APNs are maintained. The use of radio bearers may be modified, however. Example in-band approaches include: 1) If an APN model is maintained, applications first get bound to an APN; 2) Each packet is marked by the UE with information to discriminate traffic (e.g., DSCP enhancements to carry relevant information (App-ID, OE-ID, Subscription/SP-ID, etc.)); 3) Packet marking done by the UE for the uplink (UL) and the packet gateway PGW for the downlink (DL); 4) Packet marking is established during the bearer establishment. This approach may involve Institute of Electrical and Electronics Engineers (IEEE) 802.11 enhancements to enhance the access classes and allow service differentiation (e.g., a NAS-like protocol over Wi-Fi).

Figure 7:
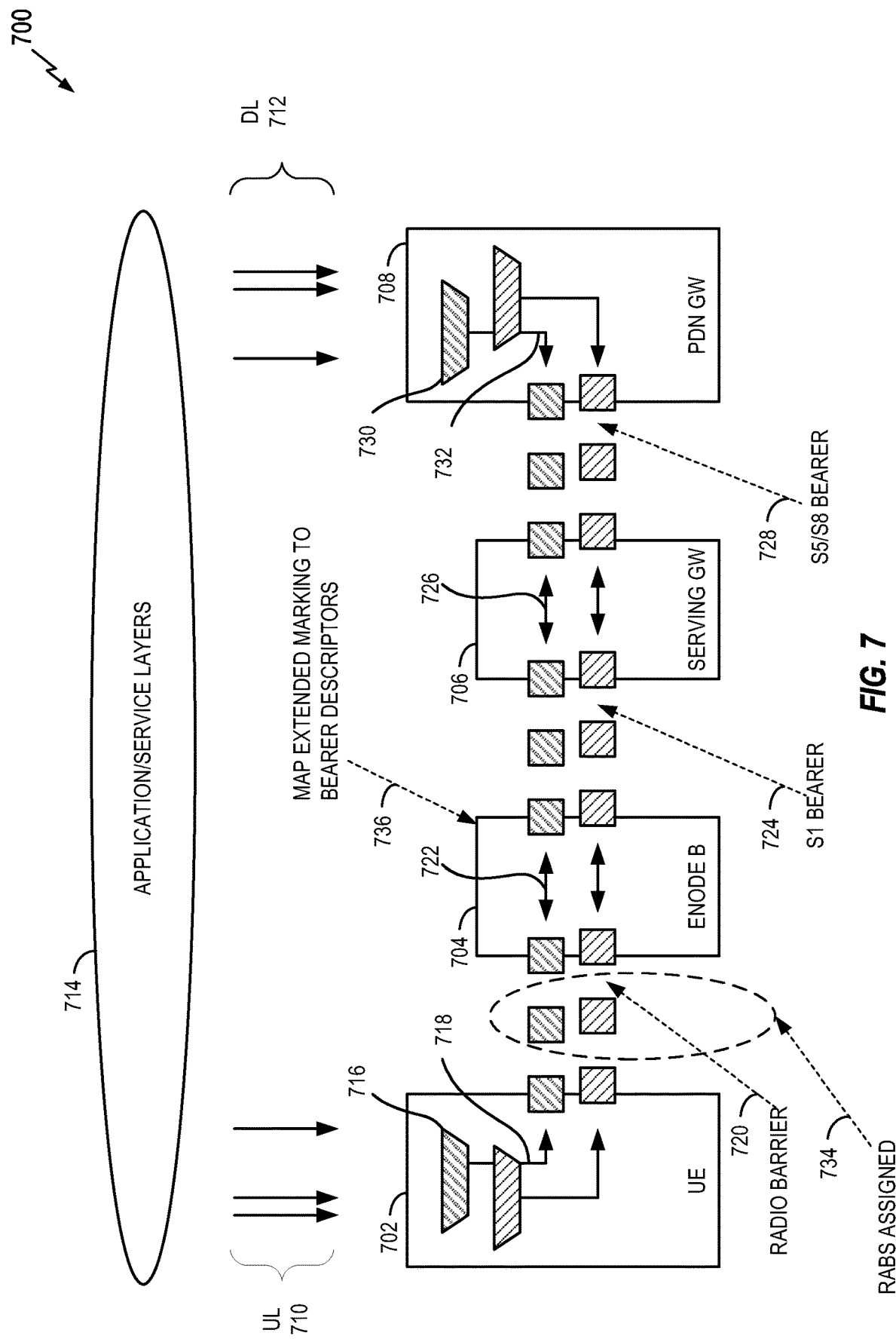
FIG. 7 illustrates an example of an in-band approach in accordance with some aspects of the disclosure.

FIG. 7 illustrates an example of an in-band approach in a network 700. The network includes a UE 702, an eNodeB 704, a serving gateway (GW) 706, and a PDN GW 708. Uplink (UL) flow aggregates 710 and downlink (DL) flow aggregates 712 from application service layers 714 are indicated. At the UE 702, a given UL-TFT 716 is mapped to a particular radio bearer ID (RB-ID) 718 (UL-TFT RB-ID).

Radio bearers 720 carry traffic between the UE 702 and the eNodeB 704. Such radio access bearers (RABs) may be assigned 734 according to conventional techniques. For example, the UE 702 may mark Internet protocol (IP) packets with extended information on applications, service, subscriptions, etc.

At the eNodeB 704, a given RB-ID is mapped to a particular S1 protocol bearer tunnel endpoint ID (TEID) 722 (RB-ID↔S1-TEID). S1 bearers 724 carry traffic between the eNodeB 704 and the serving GW 706. The eNodeB 704 may map extended markings to GPRS tunneling protocol (GTP) bearer descriptors 736 to carry a complete set of information to the PDN GW 708. For example, this information may indicate how to police traffic based on the marking.

At the serving GW 706, a given S1-TEID is mapped to a particular S5/S8 protocol TEID 726 (S1-TEID H S5/S8-TEID). S5/S8 bearers 728 carry traffic between the serving GW 706 and the PDN GW 708. At the PDN GW 708, a given DL-TFT 730 is mapped to a particular S5/S8-TEID 732 (DL-TFT S5/S8-TEID).

Figure 8:
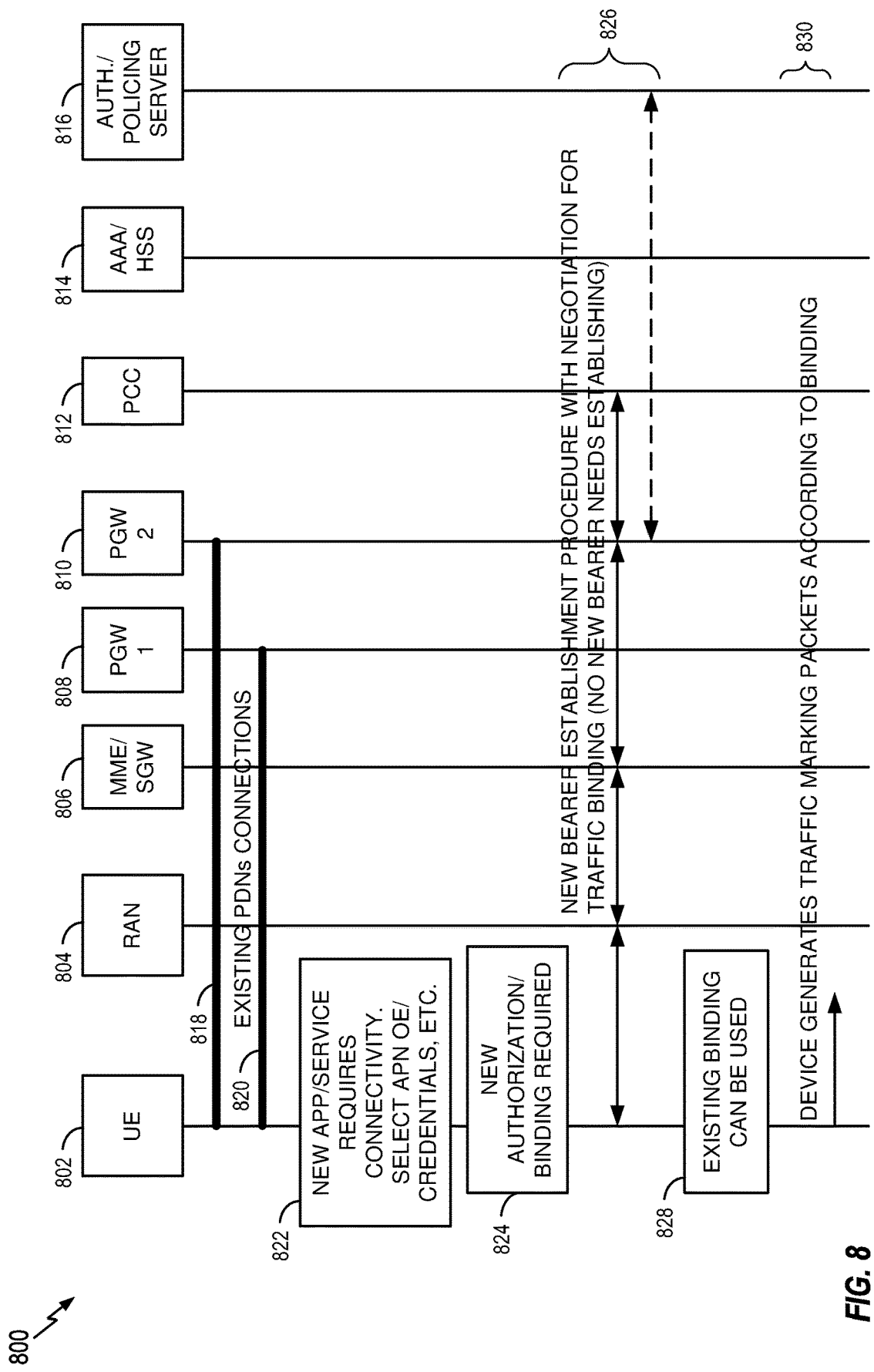
FIG. 8 illustrates an example of signal flow for an in-band approach in accordance with some aspects of the disclosure.

FIG. 8 illustrates an example of signal flow 800 for an in-band approach in a network. The network includes a UE 802, a RAN 804, an MME/SGW 806, a first PGW 808 (PGW 1), a second PGW 810 (PGW 2), a PCC 812, a AAA/HSS 814, and an auth./policing server 816.

Initially, the network uses existing PDN connections 818 and 820 for data traffic. As represented by a block 822, at some point in time, a "new" (e.g., newly invoked) application or service for the UE requires connectivity. Thus, the UE selects the corresponding APN, OE, credentials, etc., for this application or service. As represented by a block 824, a new authorization/binding may be required. In this case, a procedure to establish new bearers may be invoked, as needed, and negotiation takes place among the network component for the traffic binding 826. As represented by a block 828, an existing binding may be used in this case. The devices can thus generate traffic, marking packets to the binding 830.

In some implementations, an out-of-band approach is used. At bearer creation, a UE negotiates with the core network (CN) and signals requirements and traffic information (e.g., Apps, Subscription, etc.) for ongoing/future traffic to appropriate entities. This can be done in radio resource control (RRC) or non-access stratum (NAS) at connection establishment, and updated depending on configuration and policies. Multiple radio access bearers (RAB) "qualifiers" are allocated to a UE. Either logical RABs (for each RAB ID, qualifier=a set of tags) or actual RAB IDs (qualifier=ID). The device has a mapping between applications/service/ subscriptions and the appropriate RAB qualifier to use. Authorization of service (e.g., with entity providing sponsored connectivity) is provided. A bearer is bound to a service, an application, or a subscription.

When the device generates traffic, it selects the appropriate RAB "qualifier" to transport the packets over the radio. The network maps this to the appropriate bearers in the network and transports the appropriate information to the CN. Packet marking is done by the RAN. The UE uses a specific RAB qualifier associated with the packet, and the RAN marks the packet with features associated to the RAB. This approach optimizes use of radio resources (no extra marking over the radio). Traffic automatically gets policed/ charged/differentiated. Service/subscription/applications awareness is already in the RAN. Specific information is set dynamically by the MME in RAN upon negotiation, or a preconfigured set based on UE profile/subscription is provided by MME. Policing for UL happens already in the RAN. Thus, this approach is based on current mechanisms for APN and extended NAS.

Figure 9:
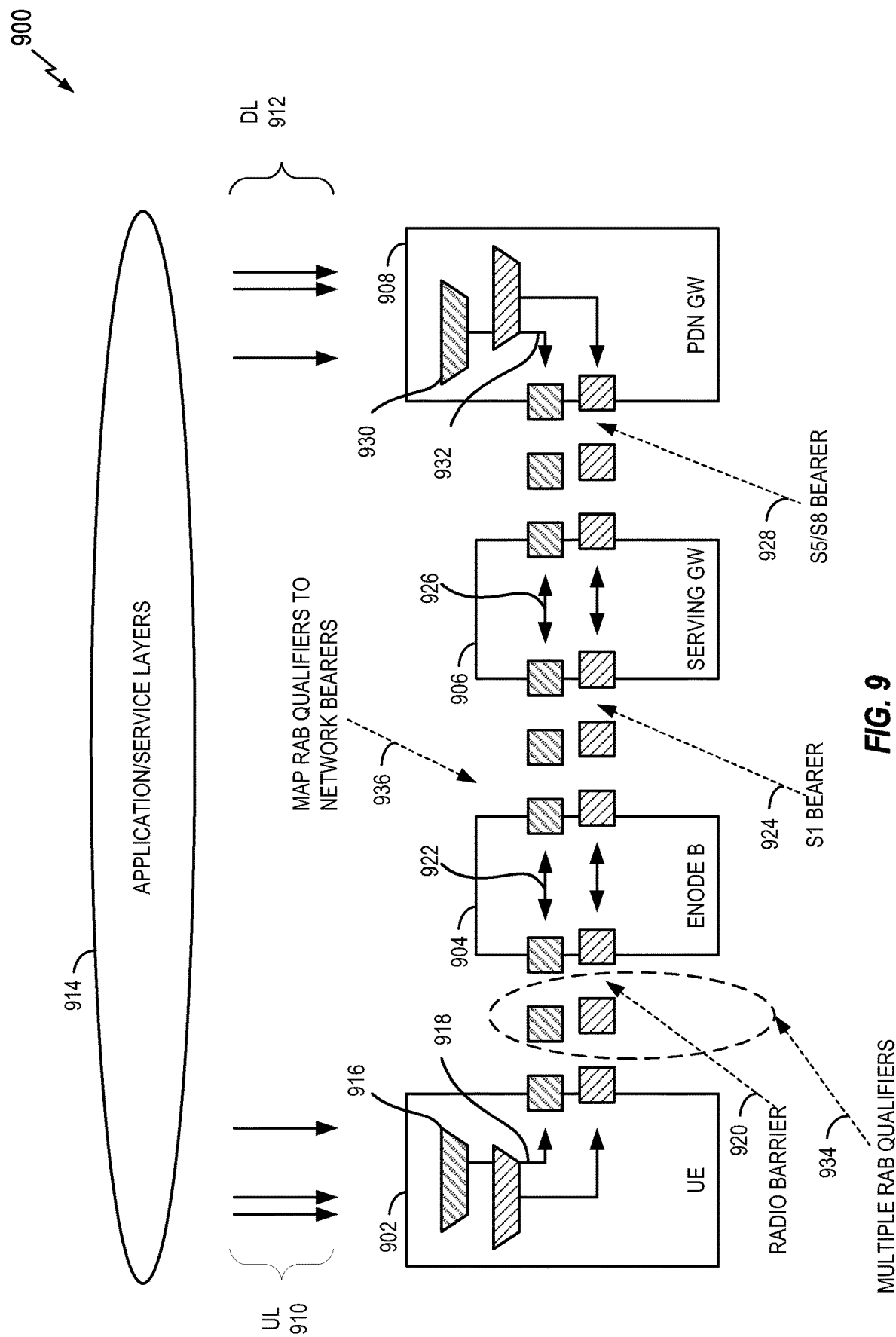
FIG. 9 illustrates an example of an out-of-band approach in accordance with some aspects of the disclosure.

FIG. 9 illustrates an example of an out-of-band approach in a network 900. The network includes a UE 902, an eNodeB 904, a serving gateway (GW) 906, and a PDN GW

908. Uplink (UL) flow aggregates 910 and downlink (DL) flow aggregates 912 from application service layers 914 are indicated. At the UE 902, a given UL-TFT 916 is mapped to a particular radio bearer ID (RB-ID) 918 (UL-TFT RB-ID).

Radio bearers 920 carry traffic between the UE 902 and the eNodeB 904. In the example of FIG. 9, multiple RAB "qualifiers" (e.g., different RAB IDs or RAB parameters) may map 934 specific applications, subscriptions, etc., to the data.

At the eNodeB 904, a given RB-ID is mapped to a particular S1 protocol bearer tunnel endpoint ID 922 (RB-ID↔S1-TEID). S1 bearers 924 carry traffic between the eNodeB 904 and the serving GW 906. In the example of FIG. 9, RAB "qualifiers" may be mapped 936 to network bearers created in the RAN at bearer creation. This mapping may occur either dynamically or in a pre-configured manner based on the corresponding subscription.

At the serving GW 906, a given S1-TEID is mapped to a particular S5/S8 protocol bearer tunnel endpoint ID 926 (S1-TEID H S5/S8-TEID). S5/S8 bearers 928 carry traffic between the serving GW 906 and the PDN GW 908. At the PDN GW 908, a given DL-TFT 930 is mapped to a particular S5/S8-TEID 932 (DL-TFT S5/S8-TEID).

Figure 10:
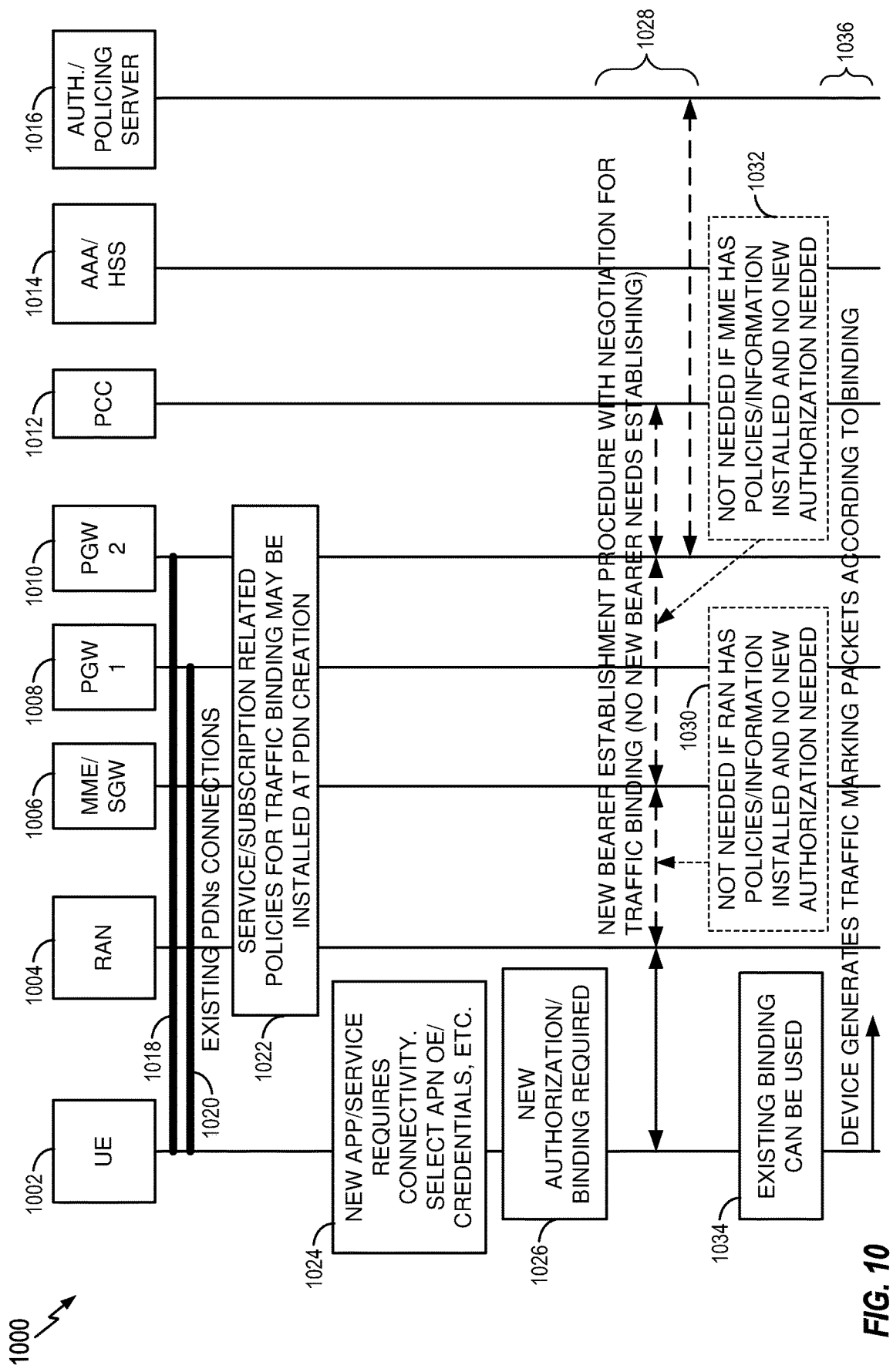
FIG. 10 illustrates an example of signal flow for an out-of-band approach in accordance with some aspects of the disclosure.

FIG. 10 illustrates an example of signal flow 1000 for an out-of-band approach in a network. The network includes a UE 1002, a RAN 1004, an MME/SGW 1006, a first PGW 1008 (PGW 1), a second PGW 1010 (PGW 2), a PCC 1012, a AAA/HSS 1014, and an auth./policing server 1016.

Initially, the network uses existing PDN connections 1018 and 1020 for data traffic. As represented by a block 1022, service and/or subscription related policies for traffic binding may be installed at the creation of the PDN. As represented by a block 1024, at some point in time, a "new" (e.g., newly invoked) application or service for the UE requires connectivity. Thus, the UE selects the corresponding APN, OE, credentials, etc., for this application or service. As represented by a block 1026, a new authorization/binding may be required. In this case, a procedure to establish new bearers may be invoked, as needed, and negotiation takes place among the network component for the traffic binding 1028. As represented by a block 1030, a new binding might not be needed if the RAN has policies and/or information installed and no new authorization is needed. As represented by a block 1032, a new binding might not be needed if the MME has policies and/or information installed and no new authorization is needed. Thus, as represented by a block 1034, an existing binding may be used in this case. The devices can thus generate traffic, marking packets to the binding 1036.

Other Aspects

With the above in mind, several additional examples of aspects of credential and subscription methods will now be treated.

Credentials methods from the perspective of a mobile device (e.g., a UE) can include one or more of the operations that follow.

When a UE is provided with access credentials, the UE upon selecting an access network uses the access credentials to obtain connectivity. For example, the access credentials could be used in a similar manner as conventional USIM credentials.

The following operations correspond to when a UE is provided with service credentials. If the UE has already gained connectivity to the network, when the UE generates traffic belonging to a specific application, service, service provider, or combination thereof, the UE indicates to the network that such traffic corresponds to the service credentials associated with the specific application/service/service provider. This can be achieved, for example, by marking packets with a specific ID corresponding to the service credentials, application, service ID, etc. This in-band "marking" can be accomplished, for example, by including an appropriate indication in a header of each packet. Out-of-band "marking" could also be used. For example, traffic belonging to a specific application, service, service provider, or combination thereof can be sent over a bearer associated with (e.g., designated for) the specific application, service, service provider, or combination. When the UE generates traffic belonging to an application/service/service provider for which no specific service credentials are available, the UE may simply transmit the data.

In some aspects, if a UE is provided only with access credentials, the UE need not identify which transport credentials are associated with a specific traffic when the traffic is generated.

Credentials methods from the perspective of a network (e.g., one or more network nodes) can include one or more of the operations that follow. When the network provides the UE with service credentials, the network stores in the UE profile information about the service credentials. This may be stored, for example, in a network entity that performs policy and charging control. When the network receives traffic from a UE associated with an indication of service credentials, the network applies policies (e.g., for traffic filtering or charging) associated with the service credentials indicated by the UE.

DMVNO

As mentioned above, the teachings herein may be used in conjunction with a DMVNO. In some aspects, the DMVNO concept enables a device or service provider to establish an MVNO with a limited lifetime and/or dynamic features. A simpler and/or faster setup can be achieved in contrast with conventional mobile virtual network operator (MVNO) setup.

Ad-hoc MVNOs can be established. For example, ad-hoc MVNOs can be established between devices. In roaming scenarios, one local device can establish an ad-hoc MVNO for temporary credential provisioning to one or more roaming devices. As another example, ad-hoc MVNOs can be established by applications. A service provider or service owner (e.g., a social media website) can create ad-hoc networks for mobile groups belonging to a service owner (e.g., a social media group). As yet another example, ad-hoc MVNOs can be established by hosting entities. At a trade show or in some other scenario, a company can provide free connectivity to mobile devices by establishing an ad-hoc MVNO.

The use of a DMVNO can leverage a radio access network (RAN) as a service for users and enterprise. This can enable a new business model to create a permanent or temporary MVNO using operator RAN and core network (CN) resources. This is also applicable to personal networks, enterprise networks, events, and local ad-hoc networks.

In general, the following operations may be employed to establish and configure a DMVNO. It should be appreciated that these operations are for purposes of illustration and that other sets of operations can be employed to establish and configure a DMVNO in accordance with teachings herein.

A user configures a DMVNO. For example, a user of a UE or other computing device can use a web interface to configure a DMVNO. This configuration can include managing any specific content or services to the cloud.

An operator operations, administration, and management (OAM) entity configures the network to provide the service.

A RAN advertises the available service. The CN supports the policy and content, if applicable.

Other users are configured to join the DMVNO or manually select the service (e.g., in a manner similar to WLAN selection).

Example DMVNO Operations

Methods for using a DMVNO subscription from the perspective of a mobile device (e.g., a UE) can include one or more of the operations that follow. In this example, credentials as taught herein are used for DMVNO access. Thus, in some aspects, a DMVNO is an example of a particular service that is associated with a particular credential.

A connecting device discovers the support of a DMVNO (e.g., in a broadcast or in response to a query to a radio access network (RAN)). The device requests connectivity to the DMVNO using credentials that identify the UE and the DMVNO (e.g., a DMVNO ID). The connecting device provides, upon requesting connectivity: the identity of the DMVNO to be connected to; and the identity of the connecting device. The identity of the device can include, for example, an identity that can be understood by the entity that established the DMVNO (e.g., a name, username, etc.).

Methods for using a DMVNO subscription from the perspective of a network can include one or more of the operations that follow. As above, the credentials are used for DMVNO access. Also, a network node (e.g., an access point) can advertise support for one or more DMVNOs via radio-level signaling (e.g., via broadcast or in response to a query).

Upon receiving a request for authentication/authorization for a specific DMVNO, the network either: verifies whether the entity that created the DMVNO previously indicated the connecting device is authorized; or requests the establishing entity to indicate whether the connecting device is authorized to connect to the DMVNO. This latter operation may involve, for example, providing to the establishing entity the identity of the DMVNO and the identity of the connecting device that was provided to the network. In response, the establishing entity confirms or denies whether the connecting device is authorized.

Once authorized, the connecting device is provided network access and connectivity is established.

Example Architecture

Figure 11:
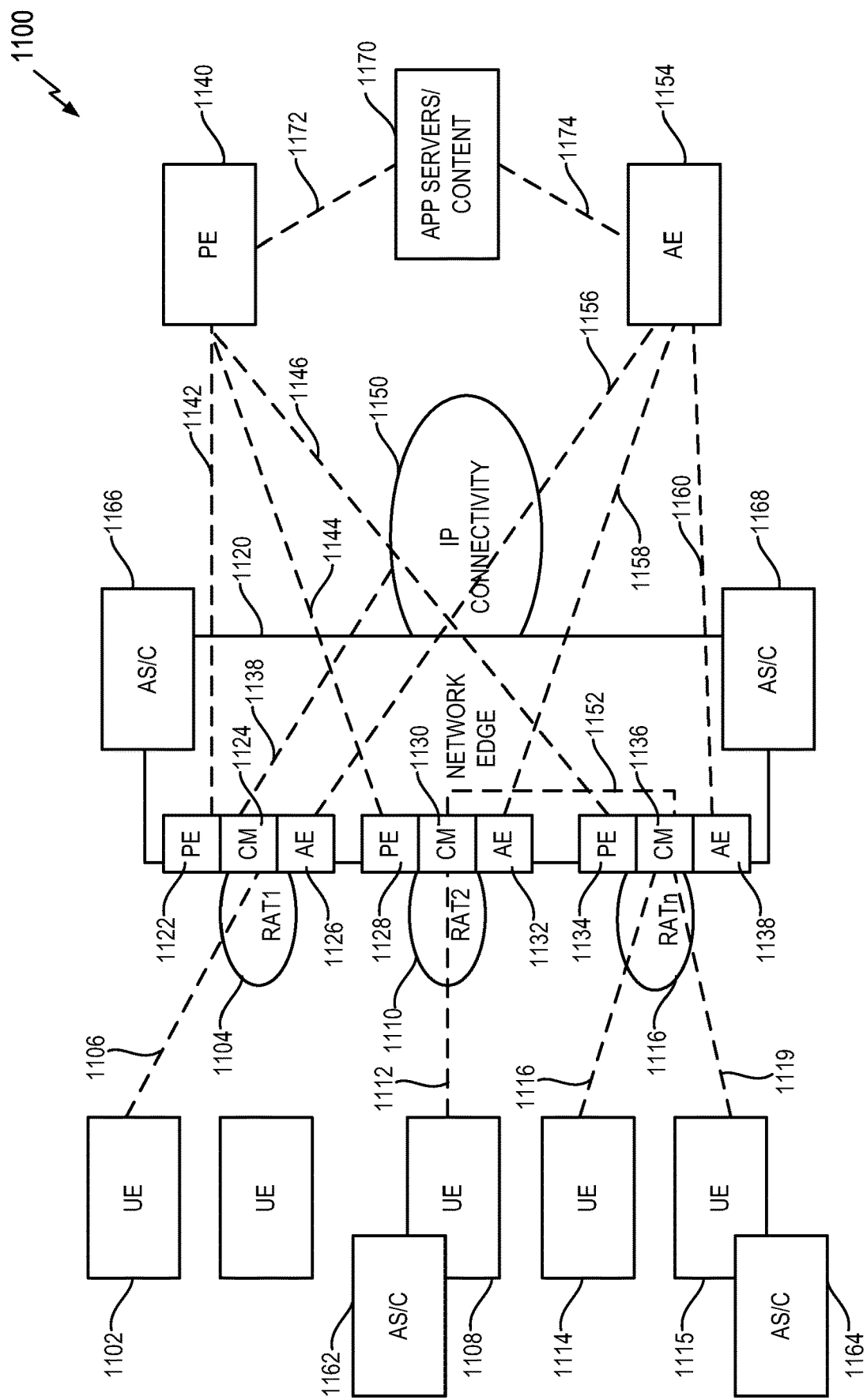
FIG. 11 illustrates an example of a network architecture in accordance with some aspects of the disclosure.

FIG. 11 is a simplified example of a network architecture 1100 within which aspects of the disclosure may be implemented. Several of the components of the architecture will be briefly described.

Policy Engine (PE). Policing is distributed and virtualized. This includes, without limitation, one or more of: charging or policing (e.g., traffic routing, differentiated traffic treatment, and so on).

Authentication/Authorization Engine (AE or AAE). In some aspects, this can be considered an evolution of conventional authentication, authorization, and accounting (AAA) with dynamic functionality. This dynamic functionality can include, without limitation, one or more of: dynamic credentials or DMVNO. This functionality is distributed, for example, as shown in FIG. 11. In some aspects, an AE may be an entity (e.g., in the operator network) that is in charge of dynamic subscription management.

Access Server/Controller (AS/C). This entity is a content provider, and includes application functionality including, without limitation, one or more of: sponsoring, authorization, or credential provisioning.

Connectivity Management (CM). In some aspects, this can be considered an evolution of a 3GPP mobility management entity (MME).

In the network architecture 1100, UEs obtain network connectivity via various radio access technologies (RATs). For example, a first UE 1102 communicates via a first RAT (RAT1) 1104 as represented by a first dashed line 1106. A second UE 1108 communicates via a second RAT (RAT2) 1110 as represented by a second dashed line 1112. A third UE 1114 communicates via an $n^{th}$ RAT (RATn) 1116 as represented by a third dashed line 1118. A fourth UE 1115 communicates via the $n^{th}$ RAT (RATn) 1116 as represented by a fourth dashed line 1119.

In this simplified example, various functionality is described as being at the edge of the core network (the network edge 1120). In particular, for the first RAT 1104, this functionality includes a first policy engine (PE) 1122, a first connectivity management (CM) 1124, and a first authentication/authorization engine (AE or AAE) 1126. For the second RAT 1110, this functionality includes a second policy engine (PE) 1128, a second connectivity management (CM) 1130, and a second authentication/authorization engine (AE or AAE) 1132. For the $n^{th}$ RAT 1116, this functionality includes a third policy engine (PE) 1134, a third connectivity management (CM) 1136, and a third authentication/authorization engine (AE or AAE) 1138.

In a policy engine, policing may be distributed and virtualized. This includes, without limitation, one or more of: charging or policing (e.g., traffic routing, differentiated traffic treatment, and so on). This functionality may be distributed, for example, as shown in FIG. 11. Connectivity between the first policy engine 1122 and a fourth policy engine (PE) 1140 is represented by a fifth dashed line 1142. Connectivity between the second policy engine 1128 and the fourth policy engine 1140 is represented by a sixth dashed line 1144. Connectivity between the third policy engine 1134 and the fourth policy engine 1140 is represented by a seventh dashed line 1146.

In some aspects, the connectivity management of FIG. 11 is an evolution of a 3GPP mobility management entity (MME). Thus, the connectivity management can include, for example, keeping track of the current location of access terminals through the use of tracking areas, location areas, routing areas, or some other suitable technique; controlling paging for access terminals; and providing access control for access terminals. As represented by an eighth dashed line 1148 in FIG. 11, the first connectivity management 1124 enables IP connectivity 1150 for UEs connected via the first RAT 1104. As represented by a ninth dashed line 1152, the second connectivity management 1130 and the third connectivity management 1136 enable connectivity between the second RAT 1110 and the $n^{th}$ RAT 1116.

In some aspects, an authentication/authorization engine (AE) of FIG. 11 is an evolution of conventional authentication, authorization, and accounting (AAA) with dynamic functionality. This dynamic functionality can include, without limitation, dynamic credentials and/or DMVNO. In some aspects, an AE may be an entity (e.g., in the operator network) that is in charge of dynamic subscription management.

The AE functionality may be distributed, for example, as shown in FIG. 11. Connectivity between the first AE 1126 and a fourth AE 1154 is represented by a tenth dashed line 1156. Connectivity between the second AE 1132 and the fourth AE 1154 is represented by an eleventh dashed line 1158. Connectivity between the third AE 1138 and the fourth AE 1154 is represented by a twelfth dashed line 1160.

An access server/controller (AS/C) is a content provider, and includes application functionality including, without limitation, one or more of: sponsoring, authorization, creation of traffic policies and traffic routing, or credential provisioning. An access server/controller (AS/C) may be implemented at a UE, at the network edge, or some other location in a network. In the example of FIG. 11, a first AS/C 1162 is implemented at the second UE 1108, a second AS/C 1164 is implemented at the fourth UE 1115, a third AS/C 1166 is implemented at the network edge 1120, and a fourth AS/C 1168 is implemented at the network edge 1120.

Figure 12:
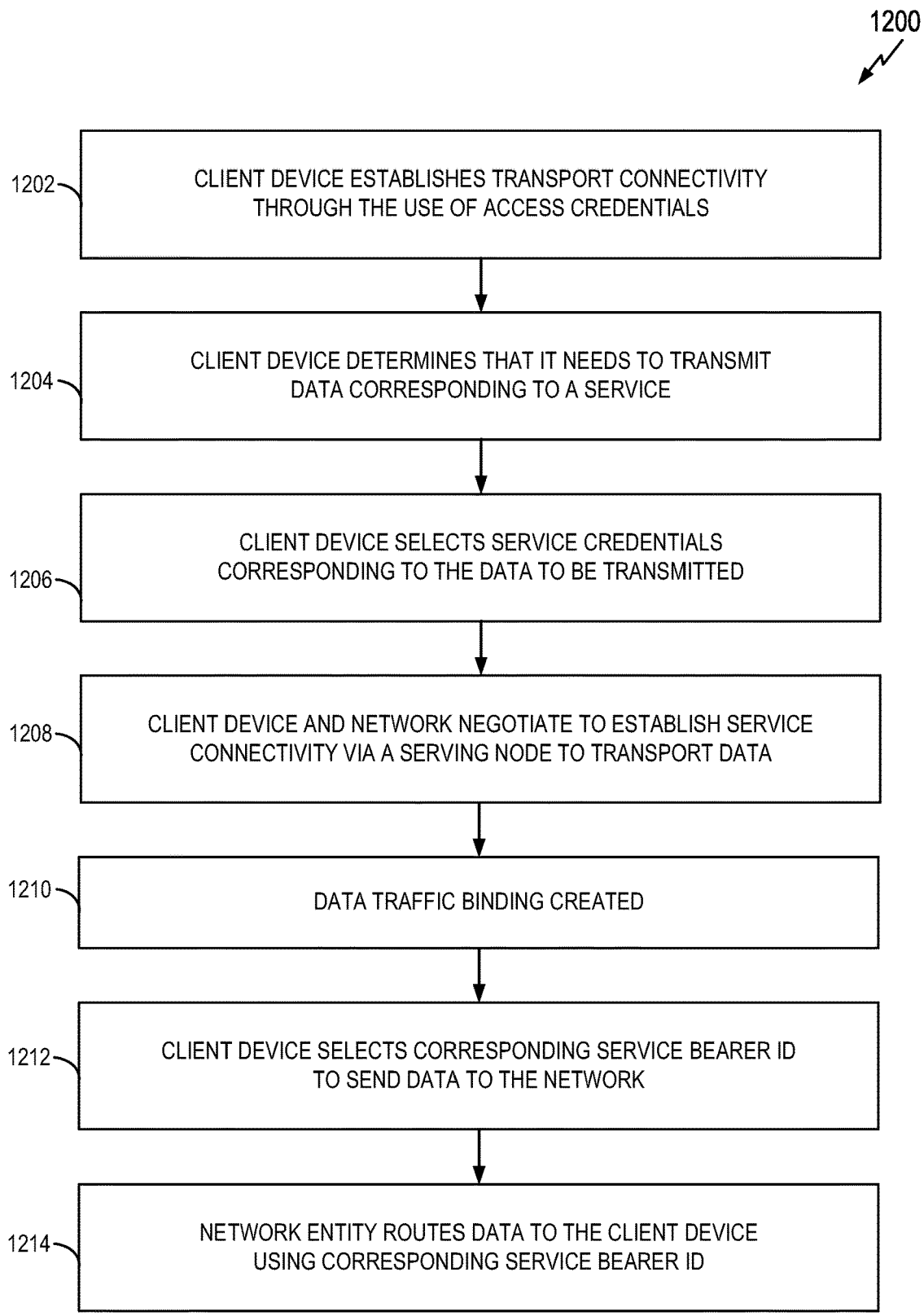
FIG. 12 illustrates an example of a process for establishing service connectivity in accordance with some aspects of the disclosure.
Figure 13:
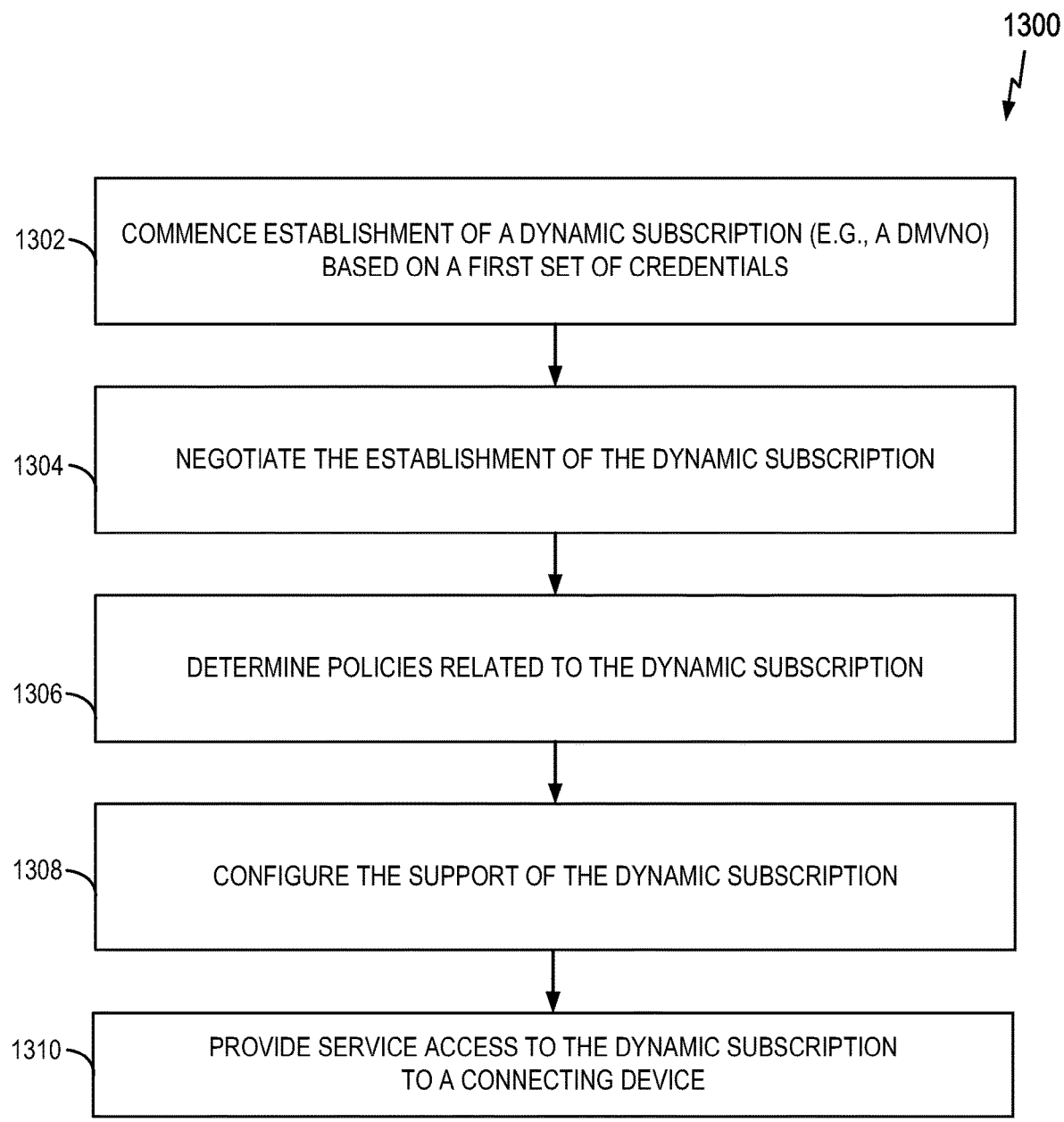
FIG. 13 illustrates an example of a process for establishing a dynamic subscription in accordance with some aspects of the disclosure.
Figure 14:
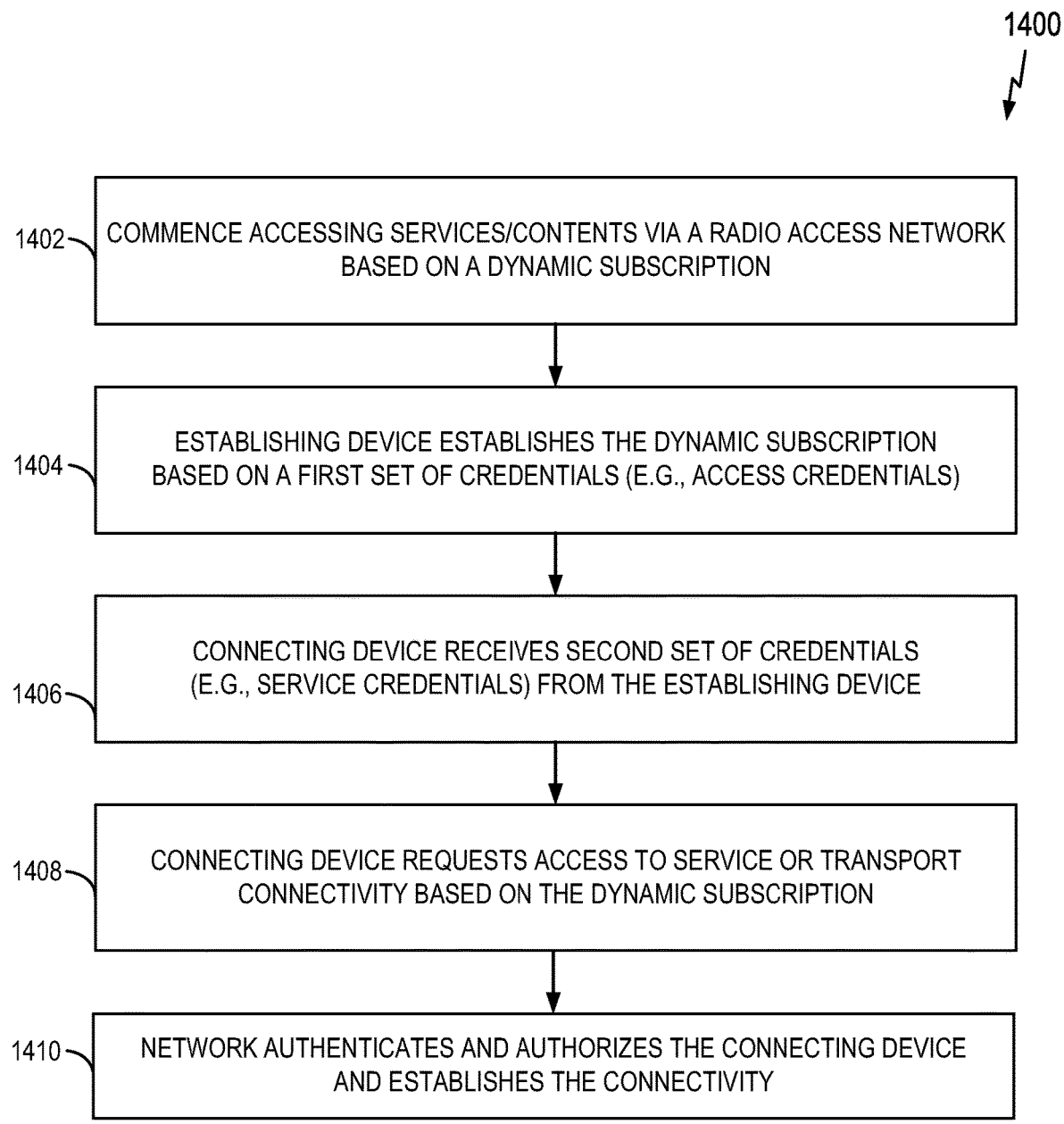
FIG. 14 illustrates an example of a process for accessing service/content based on a dynamic subscription in accordance with some aspects of the disclosure.

The application (APP) servers and/or content 1170 provide service and/or content for users of the network. In the example of FIG. 11, the APP servers and/or content 1170 may be accessed via the fourth policy engine 1140 as represented by a thirteenth dashed line 1172. The APP servers and/or content 1170 also may be accessed via the fourth AE 1154 as represented by a fourteenth dashed line 1174 in this example Example Service Connectivity Operations Referring now to FIGS. 12-14, several examples of operations that may be employed to establish service connectivity in accordance with the teachings herein will be described. FIG. 12 describes operations that a client device may employ to establish service connectivity for data traffic. FIG. 13 describes operations that an establishing device (e.g., a client device and/or a network entity) may employ to establish a dynamic subscription (e.g., a DMVNO). FIG. 14 describes operations that various devices (e.g., a client device and/or a network entity) may employ to enable a connecting device to access services and/or content over a RAN based on a dynamic subscription (e.g., a DMVNO).

FIG. 12 illustrates a process 1200 for establishing connectivity in accordance with some aspects of the disclosure. The process 1200 may take place within a processing circuit (e.g., the processing circuit 1510 of FIG. 15), which may be located in a mobile device, a network node, or some other suitable apparatus. Of course, in various aspects within the scope of the disclosure, the process 1200 may be implemented by any suitable apparatus capable of supporting connectivity-related operations.

At block 1202, a client device establishes transport connectivity through the use of access credentials. In some aspects, establishing transport connectivity may include performing an attach procedure and establishing a data connection (e.g., a PDN connection). In some aspects, establishing transport connectivity may include installing data traffic and traffic binding information corresponding to the transport connection being created based on the access credentials.

At block 1204, the client device determines that it needs to transmit data corresponding to a service.

At block 1206, the client device selects service credentials corresponding to the data to be transmitted. In some aspects, the service credentials are identified based on traffic identifying information such as an application ID, a service ID, a subscription ID, traffic filters, etc.

In some cases, selecting the service credentials includes determining that no service credentials are associated with the data. Thus, in some aspects, the UE might not perform the negotiation of the establishment of service connectivity. For example, the UE may transmit the traffic on the established transport connectivity without any traffic binding.

At block 1208, to transport the data, the client device and the network negotiate to establish service connectivity via a serving node. In some aspects, the serving node is one of an MME or an SGSN.

In some aspects, the negotiation includes the client device sending a request containing one or more service credentials. In some aspects, the negotiation involves the establishment of a new data connection. In some aspects, the new data connection is a PDN connection. In some aspects, the negotiation involves the establishment of new bearers. In some aspects, the negotiation involves the modification of existing bearers.

At block 1210, a traffic binding is created. In some aspects, the creation of the traffic binding involves the creation of specific TFTs. In some aspects, the creation of the traffic binding is performed by the network, and the network stores the traffic binding. In some aspects, the creation of the traffic binding includes the client device receiving the traffic binding from the network. In some aspects, the creation of the traffic binding includes the creation of "extended" TFTs. In some aspects, the creation of the traffic binding includes distributing the traffic binding information to the RAN.

In some aspects, the creation of the traffic binding includes defining packet marking to be added to one or more of the data packets belonging to the data traffic. In some aspects, the packet marking includes DSCP marking augmented with one or more of an application ID, a service ID, an OE ID, a subscription ID, or a service provider ID. In some aspects, the marking is performed by the UE for uplink traffic. In some aspects, the marking is performed by the network (e.g., a PDN GW or a RAN) for downlink traffic.

In some aspects, the binding can be the mapping between a specific service bearer ID and one or more of an application, a service, or a subscription. In some aspects, the specific service bearer ID can be a dedicated RAB ID allocated by the network for the specific traffic upon creation of the binding. In some aspects, the specific service bearer ID can be an existing (e.g., for the PDN) or a generic RAB ID augmented with a qualifier for the traffic (e.g., one or more tags). In some aspects, when generating traffic corresponding to a specific application, service, or subscription, the UE selects the specific service bearer ID.

In some aspects, the RAN maps the traffic binding to network bearers based on the established binding in the uplink. In some aspects, upon receiving data traffic for a service bearer ID, the RAN performs packet marking towards the core network based on the binding information received upon the traffic binding creation.

In some aspects, the RAN maps network bearers to the traffic binding based on the established binding in the uplink. In some aspects, upon receiving data traffic from the core network with a specific packet marking, the RAN routes the data traffic to the UE using the corresponding service bearer ID based on the binding information received upon the traffic binding creation.

In some aspects, creating the traffic binding includes receiving, by the serving node and or the RAN, the traffic binding information from the core network (e.g., from a PDN GW or a PCC). In some aspects, the serving node creates the traffic binding information.

At block 1212, to send data to the network, the client device selects a corresponding service bearer ID.

At block 1214, to route data to the client device, a network entity uses a corresponding service bearer ID.

FIG. 13 illustrates a process 1300 for establishing a dynamic subscription in accordance with some aspects of the disclosure. The process 1300 may take place within a processing circuit (e.g., the processing circuit 1510 of FIG. 15), which may be located in a mobile device, a network node, or some other suitable apparatus. Of course, in various aspects within the scope of the disclosure, the process 1300 may be implemented by any suitable apparatus capable of supporting connectivity-related operations.

At block 1302, a client device commences establishment of a dynamic subscription (e.g., a DMVNO) based on a first set of credentials. In some aspects, the establishment of the dynamic subscription includes the establishing device identifying and/or providing specific services and content. In some aspects, the establishment of the dynamic subscription includes creating an identifier for the dynamic subscription (e.g., this may be done by the UE or the network).

At block 1304, the client device negotiates the establishment of the dynamic subscription (e.g., with a network entity). In some aspects, the establishment of the dynamic subscription includes configuring other connecting devices to join the dynamic subscription. In some aspects, the establishment of the dynamic subscription includes distributing service credentials to another device. In some aspects, the establishment of the dynamic subscription includes providing the identity of the dynamic subscription to another device.

At block 1306, the client device optionally determines policies related to the dynamic subscription. In some aspects, policies related to the dynamic subscription are determined based on the establishing device credentials and the negotiation.

At block 1308, the client device configures the support of the dynamic subscription. In some aspects, configuring the support of the dynamic subscription includes identifying which connecting credentials are authorized. In some aspects, configuring the support of the dynamic subscription includes distributing to the RAN information on the dynamic subscription (dynamic subscription ID, policies, etc.).

At block 1310, the client device and/or another device provides service access to the dynamic subscription to a connecting device. In some aspects, providing service access to the dynamic subscription includes the RAN advertising the support for the dynamic subscription. In some aspects, providing service access to the dynamic subscription includes broadcasting such information. In some aspects, providing service access to the dynamic subscription includes providing such information to a connecting device in response to a request from the connecting device.

FIG. 14 illustrates a process 1400 for accessing services and/or content in accordance with some aspects of the disclosure. The process 1400 may take place within a processing circuit (e.g., the processing circuit 1510 of FIG. 15), which may be located in a mobile device, a network node, or some other suitable apparatus. Of course, in various aspects within the scope of the disclosure, the process 1400 may be implemented by any suitable apparatus capable of supporting connectivity-related operations.

At block 1402, a client device commences accessing services and/or contents via a RAN based on a dynamic subscription (e.g., a DMVNO).

At block 1404, an establishing client device (e.g., the client device of FIG. 13) establishes the dynamic subscription based on a first set of credentials (e.g., access credentials).

At block 1406, a connecting device (e.g., another client device) receives a second set of credentials (e.g., service credentials) from the establishing device.

At block 1408, the connecting device requests access to service or transport connectivity based on the dynamic subscription. In some aspects, the connecting device requesting access to service or transport connectivity based on the dynamic subscription includes the connecting device using the received credentials. In some aspects, the connecting device requesting access to service or transport connectivity based on the dynamic subscription includes the connecting device providing the identity of the connecting device to another device.

In some aspects, the connecting device requesting access to service or transport connectivity based on the dynamic subscription includes requesting to attach to the network. In some aspects, the connecting device requesting access to service or transport connectivity based on the dynamic subscription includes requesting to establish a PDN connection. In some aspects, the connecting device requesting access to service or transport connectivity based on the dynamic subscription includes requesting to establish a new bearer and perform traffic binding. In some aspects, the connecting device requesting access to service or transport connectivity based on the dynamic subscription includes requesting to modify an existing bearer and perform traffic binding.

In some aspects, the connecting device requesting access to service or transport connectivity based on the dynamic subscription includes discovering that the dynamic subscription is supported by the RAN. This may be based on a dynamic subscription ID that may be broadcast by the RAN or provided to the connecting device upon the connecting device requesting if/which dynamic subscription is/are supported.

At block 1410, the network authenticates and authorizes the connecting device and establishes the connectivity. In some aspects, the network authenticating and authorizing the connecting device and establishing the connectivity includes establishing a data connection (e.g., a PDN connection). In some aspects, the network authenticating and authorizing the connecting device and establishing the connectivity includes performing a device attach and establishing a data connection. In some aspects, the network authenticating and authorizing the connecting device and establishing the connectivity includes establishing a new bearer and performing traffic binding. In some aspects, the network authenticating and authorizing the connecting device and establishing the connectivity includes modifying an existing bearer and performing traffic binding.

In some aspects, the network authenticating and authorizing the connecting device includes verifying that the connecting device is authorized. In some aspects, the network authenticating and authorizing the connecting device includes verifying the identity of the connecting device. In some aspects, the network authenticating and authorizing the connecting device includes verifying with the establishing device that the connecting device is authorized. In some aspects, the verification includes providing the identity of the dynamic subscription to the establishing device.

First Example Apparatus

Figure 15:
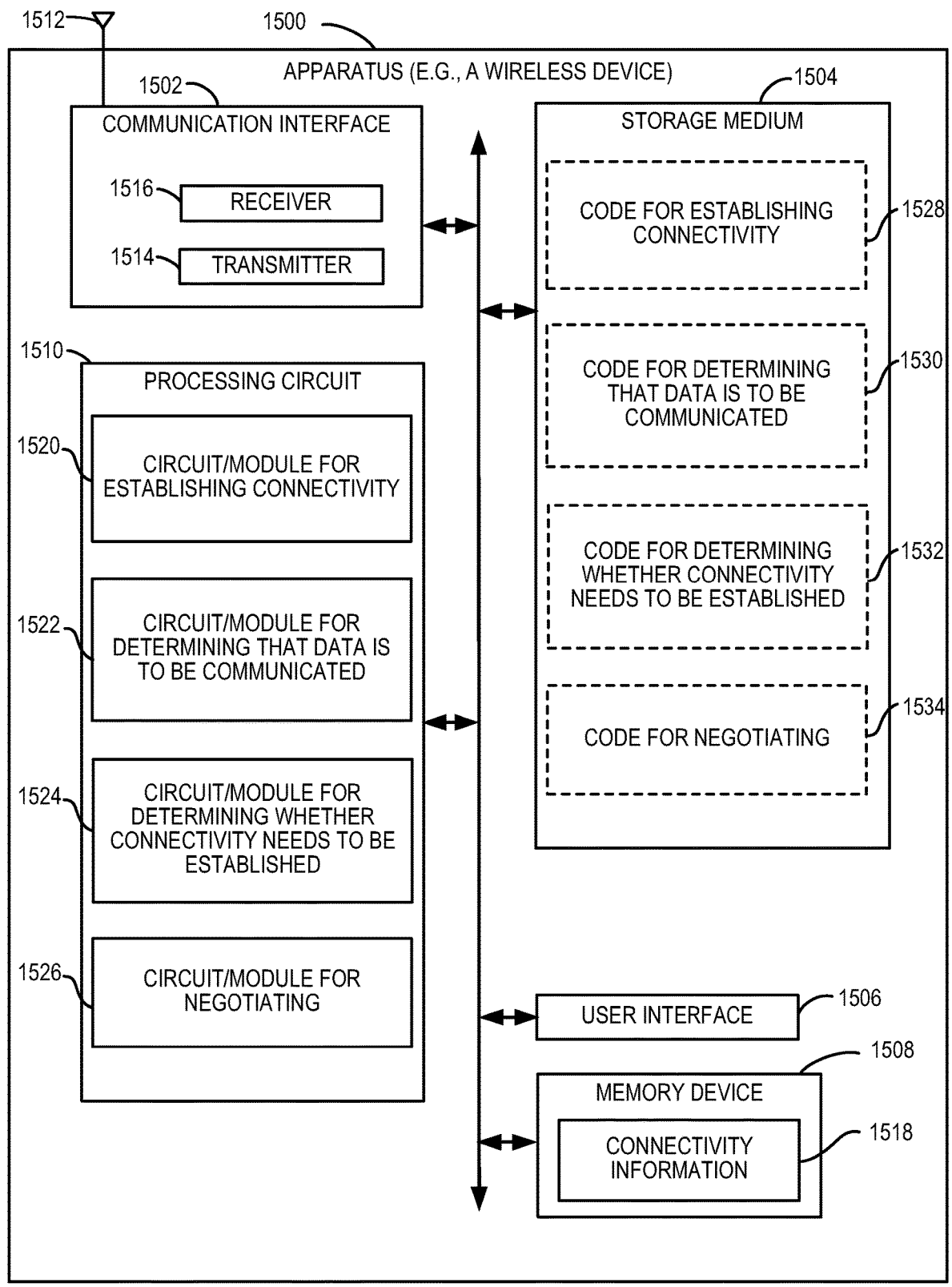
FIG. 15 illustrates a block diagram of an example hardware implementation for an apparatus (e.g., an electronic device) that can support connectivity in accordance with some aspects of the disclosure.

FIG. 15 is an illustration of an apparatus 1500 that may support access and traffic differentiation according to one or more aspects of the disclosure. The apparatus 1500 could embody or be implemented within a UE, an eNB, or some other type of device that supports communication. In various implementations, the apparatus 1500 could embody or be implemented within an access terminal, an access point, or some other type of device. In various implementations, the apparatus 1500 could embody or be implemented within a mobile phone, a smart phone, a tablet, a portable computer, a server, a personal computer, a sensor, an entertainment device, a medical device, or any other electronic device having circuitry. The apparatus 1500 includes a communication interface (e.g., at least one transceiver) 1502, a storage medium 1504, a user interface 1506, a memory device 1508, and a processing circuit 1510.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 may be adapted to facilitate wireless communication of the apparatus 1500. For example, the communication interface 1502 may include circuitry and/or programming adapted to facilitate the communication of information bi-directionally with respect to one or more communication devices in a network. In some implementations, the communication interface 1502 may be configured for wire-based communication. In some implementations, the communication interface 1502 may be coupled to one or more antennas 1512 for wireless communication within a wireless communication system. The communication interface 1502 can be configured with one or more standalone receivers and/or transmitters, as well as one or more transceivers. In the illustrated example, the communication interface 1502 includes a transmitter 1514 and a receiver 1516.

The memory device 1508 may represent one or more memory devices. As indicated, the memory device 1508 may maintain connectivity-related information 1518 along with other information used by the apparatus 1500. In some implementations, the memory device 1508 and the storage medium 1504 are implemented as a common memory component. The memory device 1508 may also be used for storing data that is manipulated by the processing circuit 1510 or some other component of the apparatus 1500.

The storage medium 1504 may represent one or more computer-readable, machine-readable, and/or processor-readable devices for storing programming, such as processor executable code or instructions (e.g., software, firmware), electronic data, databases, or other digital information. The storage medium 1504 may also be used for storing data that is manipulated by the processing circuit 1510 when executing programming. The storage medium 1504 may be any available media that can be accessed by a general purpose or special purpose processor, including portable or fixed storage devices, optical storage devices, and various other mediums capable of storing, containing or carrying programming.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Programming stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols.

The processing circuit 1510 is generally adapted for processing, including the execution of such programming stored on the storage medium 1504. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired programming provided by appropriate media in at least one example. For example, the processing circuit 1510 may be implemented as one or more processors, one or more controllers, and/or other structure configured to execute executable programming Examples of the processing circuit 1510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 1-14 and 16. As used herein, the term "adapted" in relation to the processing circuit 1510 may refer to the processing circuit 1510 being one or more of configured, employed, implemented, and/or programmed to perform a particular process, function, operation and/or routine according to various features described herein.

The processing circuit 1510 may be a specialized processor, such as an application specific integrated circuit (ASIC) that serves as a means for (e.g., structure for) carrying out any one of the operations described in conjunction with FIGS. 1-14 and 16. The processing circuit 1510 may serve as one example of a means for transmitting and/or a means for receiving.

According to at least one example of the apparatus 1500, the processing circuit 1510 may include one or more of a circuit/module for establishing connectivity 1520, a circuit/module for determining that data is to be communicated 1522, a circuit/module for determining whether connectivity needs to be established 1524, or a circuit/module for negotiating 1526.

The circuit/module for establishing connectivity 1520 may include circuitry and/or programming (e.g., code for establishing connectivity 1528 stored on the storage medium 1504) adapted to perform several functions relating to, for example, establishing first connectivity with a wireless communication network via a serving node through the use of a first set of credentials. In some implementations, the circuit/module for establishing connectivity 1520 identifies a serving node (e.g., a core network entity such as an MME or an SGSN) that controls access to a wireless communication network. For example, the circuit/module for establishing connectivity 1520 may receive information about the serving node from a RAN of the network. The circuit/module for establishing connectivity 1520 may then present the credentials to the serving node to establish that the apparatus 1500 is allowed to access the network. The circuit/module for establishing connectivity 1520 may then communicate with the serving node to exchange information (e.g., communication parameters) that enables entities to use the connectivity.

The circuit/module for determining that data is to be communicated 1522 may include circuitry and/or programming (e.g., code for determining that data is to be communicated 1530 stored on the storage medium 1504) adapted to perform several functions relating to, for example, determining that data for the apparatus 1500 (e.g., a client device) is to be communicated (e.g., to a network). In some implementations, the circuit/module for determining that data is to be communicated 1522 makes this determination based on an indication (e.g., from an application layer). For example, when an application associated with a service is invoked or needs to transfer data, the application may generate the indication. To this end, the circuit/module for determining that data is to be communicated 1522 may obtain this indication from the memory device 1508 or some other component of the apparatus. In some implementations, the circuit/module for determining that data is to be communicated 1522 may monitor a transmit buffer (e.g., in the memory device 1508) to determine whether data is to be communicated. In some implementations, the circuit/module for determining that data is to be communicated 1522 sends an indication of its determination (e.g., sends a signal to) the circuit/module for determining whether connectivity needs to be established 1524.

The circuit/module for determining whether connectivity needs to be established 1524 may include circuitry and/or programming (e.g., code for determining whether connectivity needs to be established 1532 stored on the storage medium 1504) adapted to perform several functions relating to, for example, determining whether a second connectivity needs to be established to communicate the data for the apparatus 1500 (e.g., a client device). In some implementations, the circuit/module for determining whether connectivity needs to be established 1524 checks to see whether the data may be communicated via the first connectivity. If so, the second connectivity might not be needed. The second connectivity may be needed, however, for cases where, for example, the data to be communicated is for a particular service, application, etc., that is associated with specific connectivity (e.g., a DMVNO for a given OE). Upon making this determination (e.g., based on information maintained in the memory device 1508 about the connectivity requirements of the services, applications, etc., supported by the apparatus 1500), the circuit/module for determining whether connectivity needs to be established 1524 may generate an indication of this determination. The circuit/module for determining whether connectivity needs to be established 1524 may then send this indication to the circuit/module for negotiating 1526, the memory device 1508, or some other component of the apparatus 1500.

The circuit/module for negotiating 1526 may include circuitry and/or programming (e.g., code for negotiating 1534 stored on the storage medium 1504) adapted to perform several functions relating to, for example, establishing second connectivity via the serving node through which the circuit/module for establishing connectivity 1520 established the first connectivity. In some aspects, the second connectivity is established through the use of a second set of credentials. Initially, the circuit/module for negotiating 1526 receives an indication that the second connectivity is needed (e.g., from the circuit/module for determining whether connectivity needs to be established 1524, the memory device 1508, or some other component of the apparatus 1500). The circuit/module for negotiating 1526 then identifies the serving node (e.g., a core network entity such as an MME or an SGSN). For example, the circuit/module for establishing connectivity 1520 may receive this information from the circuit/module for establishing connectivity 1520, the memory device 1508, or some other component of the apparatus. The circuit/module for negotiating 1526 may then present the second set of credentials to the serving node to establish that the apparatus 1500 is authorized for the connectivity. The circuit/module for negotiating 1526 may then communicate with the serving node to exchange information (e.g., communication parameters) that these entities will use for the connectivity.

As mentioned above, programming stored by the storage medium 1504, when executed by the processing circuit 1510, causes the processing circuit 1510 to perform one or more of the various functions and/or process operations described herein. For example, the storage medium 1504 may include one or more of the code for establishing connectivity 1528, the code for determining that data is to be communicated 1530, the code for determining whether connectivity needs to be established 1532, or the code for negotiating 1534.

First Example Process

Figure 16:
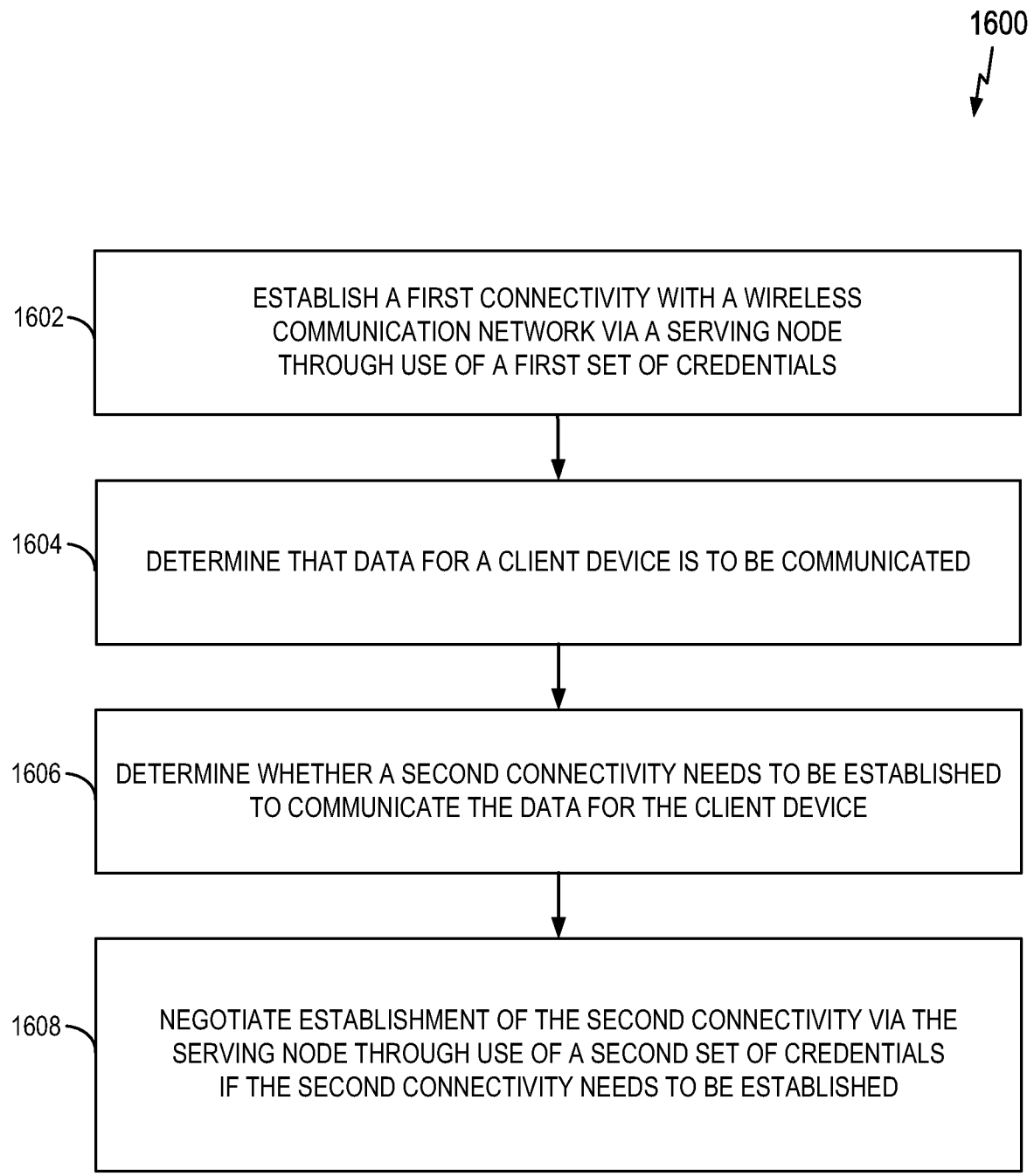
FIG. 16 illustrates an example of a process for establishing connectivity in accordance with some aspects of the disclosure.

FIG. 16 illustrates a process 1600 for supporting communication in accordance with some aspects of the disclosure. The process 1600 may take place within a processing circuit (e.g., the processing circuit 1510 of FIG. 15), which may be located in an access terminal, a base station, or some other suitable apparatus. Of course, in various aspects within the scope of the disclosure, the process 1600 may be implemented by any suitable apparatus capable of supporting dynamic subscriptions.

At block 1602, an apparatus (e.g., a client device) establishes a first connectivity with a wireless communication network via a serving node through use of a first set of credentials. In some aspects, the serving node may be a mobility management entity (MME) or a serving general packet radio service (GPRS) support node (SGSN).

In some aspects, the establishment of the first connectivity may include at least one of: the apparatus (e.g., a client device) performing an attach procedure and establishing a data connection, or the apparatus (e.g., a client device) installing data traffic and traffic binding information corresponding to a transport connection being created based on the first set of credentials.

In some aspects, the negotiation of the establishment of the second connectivity may include at least one of: establishment of a new data connection, establishment of a new packet data network (PDN) connection, establishment of new communication bearers, or modification of existing communication bearers.

At block 1604, the apparatus determines that data for the apparatus (e.g., a client device) is to be communicated. For example, the apparatus may determine that data associated with a particular service needs to be sent to a network server.

At block 1606, the apparatus determines whether a second connectivity needs to be established to communicate the data for the apparatus (e.g., a client device). In some aspects, the determination of whether the second connectivity needs to be established may include determining, based on information describing the data, whether the first connectivity can be used to communicate the data.

At block 1608, the apparatus negotiates establishment of second connectivity via the serving node through use of a second set of credentials if the second connectivity needs to be established.

In some aspects, the second set of credentials may be associated with the data, and the negotiation of the establishment of the second connectivity may include selecting the second set of credentials. In some aspects, the selection of the second set of credentials may be based on information describing the data. In some aspects, the selection of the second set of credentials may be based on traffic identifying information that may include at least one of: an application identifier (ID), a service ID, a subscription ID, or a traffic filter.

In some aspects, the negotiation of the establishment of the second connectivity may include sending a request that includes at least one of the second set of credentials. In some aspects, the second set of credentials may be associated with at least one of: an application, a service, a service provider, a radio bearer, a virtual wireless communication network, or a dynamic mobile virtual network operator (DMVNO). In some aspects, the second set of credentials includes at least one of: an ownership entity identifier, a content provider identifier, an application identifier, an ownership entity policy, a security credential, an identity of a charging entity for corresponding traffic, or an identity of an authorizing entity for corresponding traffic.

In some aspects, the negotiation of the establishment of the second connectivity may be based on at least one of: a selected set of credentials, or information describing the data. In some aspects, the establishment of the first connectivity may include creating a traffic binding based on the first set of credentials.

In some aspects, the establishment of the second connectivity may include creating a traffic binding based on the second set of credentials. In some aspects, the creation of the traffic binding may include at least one of: creating specific traffic flow templates (TFTs), creating extended TFTs, receiving information about the traffic binding at the apparatus (e.g., a client device), or receiving information about the traffic binding at a radio access network (RAN). In some aspects, the creation of the traffic binding may include defining packet marking to be added to at least one data packet of the data. In some aspects, the marking may include differentiated services code point (DSCP) marking that includes at least one of: an application identifier (ID), a service ID, an ownership entity (OE) ID, a subscription ID, or a service provider ID. In some aspects, the traffic binding may include a mapping of a specific service bearer identifier (ID) to at least one of: an application, a service, or a subscription. In some aspects, the specific service bearer ID may include at least one of: a dedicated radio access bearer identifier (RAB ID) allocated by a network for specific traffic upon creation of the binding, an existing RAB ID augmented with a qualifier for the data, an existing packet data network (PDN) RAB ID augmented with a qualifier for the data, or a generic RAB ID augmented with a qualifier for the data. In some aspects, the specific service bearer ID is selected if the apparatus (e.g., a client device) is generating traffic corresponding to a specific application, service, or subscription.

Second Example Apparatus

Figure 17:
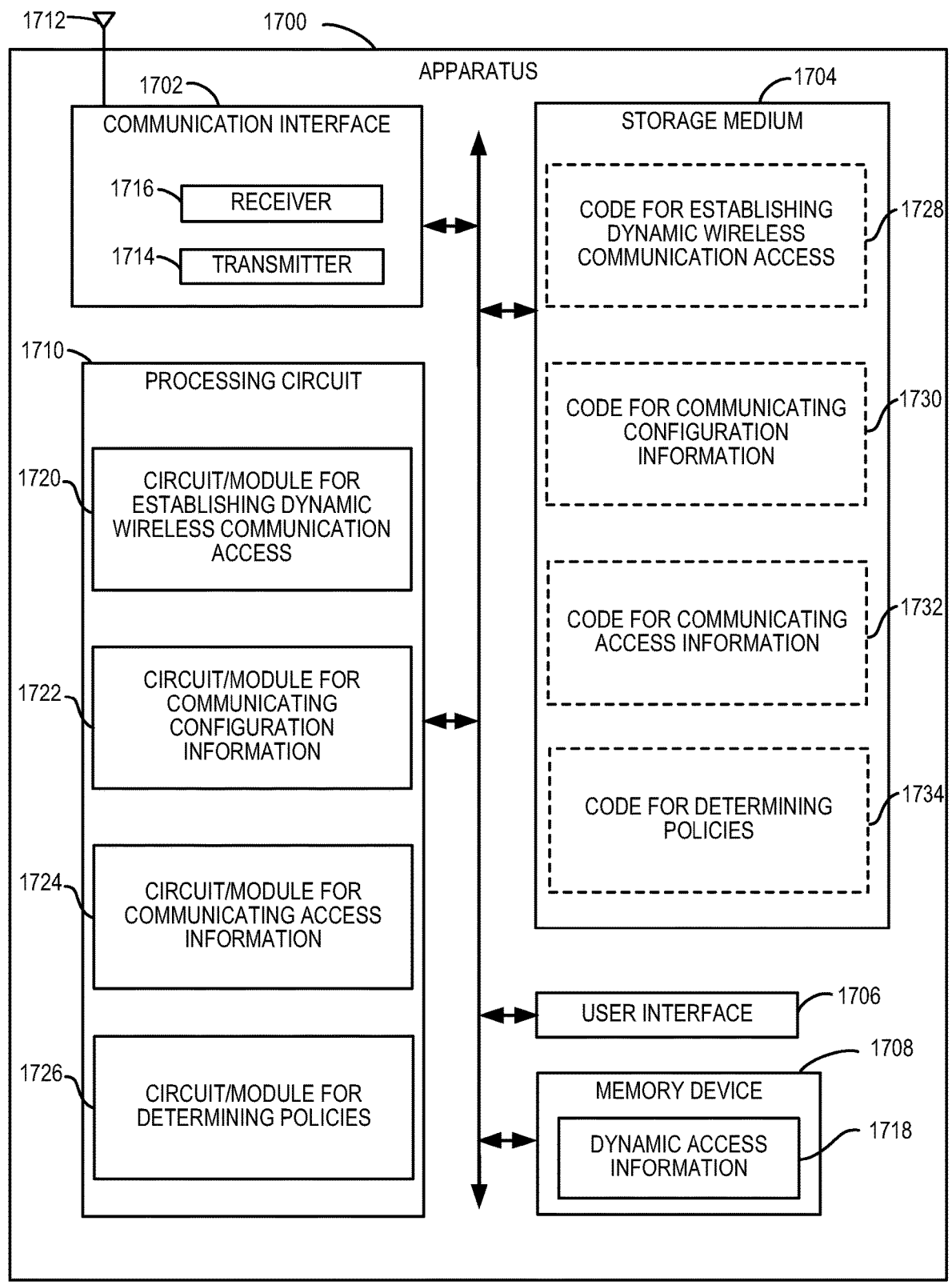
FIG. 17 illustrates a block diagram of another example hardware implementation for an apparatus (e.g., an electronic device) that can support dynamic wireless communication access in accordance with some aspects of the disclosure.

FIG. 17 is an illustration of an apparatus 1700 that may support access and traffic differentiation according to one or more aspects of the disclosure. For example, the apparatus 1700 could embody or be implemented within a UE, an eNB, or some other type of device that supports communication. In various implementations, the apparatus 1700 could embody or be implemented within an access terminal, an access point, or some other type of device. In various implementations, the apparatus 1700 could embody or be implemented within a mobile phone, a smart phone, a tablet, a portable computer, a server, a personal computer, a sensor, an entertainment device, a medical device, or any other electronic device having circuitry.

The apparatus 1700 includes a communication interface (e.g., at least one transceiver) 1702, a storage medium 1704, a user interface 1706, a memory device 1708 (e.g., storing dynamic access-related information 1718), and a processing circuit (e.g., at least one processor) 1710. In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 1500 of FIG. 15.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 1-14 and 18. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application specific integrated circuit (ASIC) that serves as a means for (e.g., structure for) carrying out any one of the operations described in conjunction with FIGS. 1-14 and 18. The processing circuit 1710 may serve as one example of a means for transmitting and/or a means for receiving.

According to at least one example of the apparatus 1700, the processing circuit 1710 may include one or more of a circuit/module for establishing dynamic wireless communication access 1720, a circuit/module for communicating configuration information 1722, a circuit/module for communicating access information 1724, or a circuit/module for determining policies 1726.

The circuit/module for establishing dynamic wireless communication access 1720 may include circuitry and/or programming (e.g., code for establishing dynamic wireless communication access 1728 stored on the storage medium 1704) adapted to perform several functions relating to, for example, establishing, based on a first set of credentials, dynamic wireless communication access to enable at least one other apparatus to communicate via a wireless communication network. In some implementations, the circuit/module for establishing dynamic wireless communication access 1720 selects the parameters of the dynamic wireless communication access. For example, the circuit/module for establishing dynamic wireless communication access 1720 may select one or more of: when the access is to be available, the services that can be accessed, or the devices that are allowed access. The circuit/module for establishing dynamic wireless communication access 1720 may then present the credentials to a network entity (e.g., an MME or an SGSN) to establish that the apparatus 1700 is allowed to establish the access. The circuit/module for establishing dynamic wireless communication access 1720 may then communicate with the network entity to exchange information (e.g., access parameters, identifiers, etc.) that enables entities to use the access.

The circuit/module for communicating configuration information 1722 may include circuitry and/or programming (e.g., code for communicating configuration information 1730 stored on the storage medium 1704) adapted to perform several functions relating to, for example, communicating (e.g., sending and/or receiving via a transceiver) information. In some implementations, the circuit/module for communicating configuration information 1722 obtains configuration information for support of the dynamic wireless communication access (e.g., from the circuit/module for establishing dynamic wireless communication access 1720, the memory device 1708, some other component of the apparatus 1700, or another apparatus (e.g., a network entity)). In some implementations, the circuit/module for communicating configuration information 1722 sends the configuration information to a network entity (e.g., a RAN) or a client device. In some implementations, the communication interface 1702 includes the circuit/module for communicating configuration information 1722 and/or the code for communicating configuration information 1730.

The circuit/module for communicating access information 1724 may include circuitry and/or programming (e.g., code for communicating access information 1732 stored on the storage medium 1704) adapted to perform several functions relating to, for example, communicating (e.g., sending and/or receiving via a transceiver) information. In some implementations, the circuit/module for communicating access information 1724 obtains access information for service access to the dynamic wireless communication access (e.g., from the circuit/module for establishing dynamic wireless communication access 1720, the memory device 1708, some other component of the apparatus 1700, or another apparatus (e.g., a network entity)). In some implementations, the circuit/module for communicating access information 1724 sends the access information to a network entity (e.g., a RAN) or a client device. In some implementations, the communication interface 1702 includes the circuit/module for communicating access information 1724 and/or the code for communicating access information 1732.

The circuit/module for determining policies 1726 may include circuitry and/or programming (e.g., code for determining policies 1734 stored on the storage medium 1704) adapted to perform several functions relating to, for example, determining policies related to the dynamic wireless communication access. In some implementations, the circuit/module for determining policies 1726 initially obtains credentials for the access and information resulting from a negotiation to establish the access. The circuit/module for determining policies 1726 may then determine a policy based on this information. For example, the information may indicate that the access (e.g., a DMVNO for a given OE) is for a particular service, application, etc. Upon making this determination, the circuit/module for determining policies 1726 may generate an indication of this determination. The circuit/module for determining policies 1726 may then send this indication to the circuit/module for communicating configuration information 1722, the memory device 1708, or some other component of the apparatus 1700.

As mentioned above, programming stored by the storage medium 1704, when executed by the processing circuit 1710, causes the processing circuit 1710 to perform one or more of the various functions and/or process operations described herein. For example, the storage medium 1704 may include one or more of the code for establishing dynamic wireless communication access 1728, the code for communicating configuration information 1730, the code for communicating access information 1732, or the code for determining policies 1734.

Second Example Process

Figure 18:
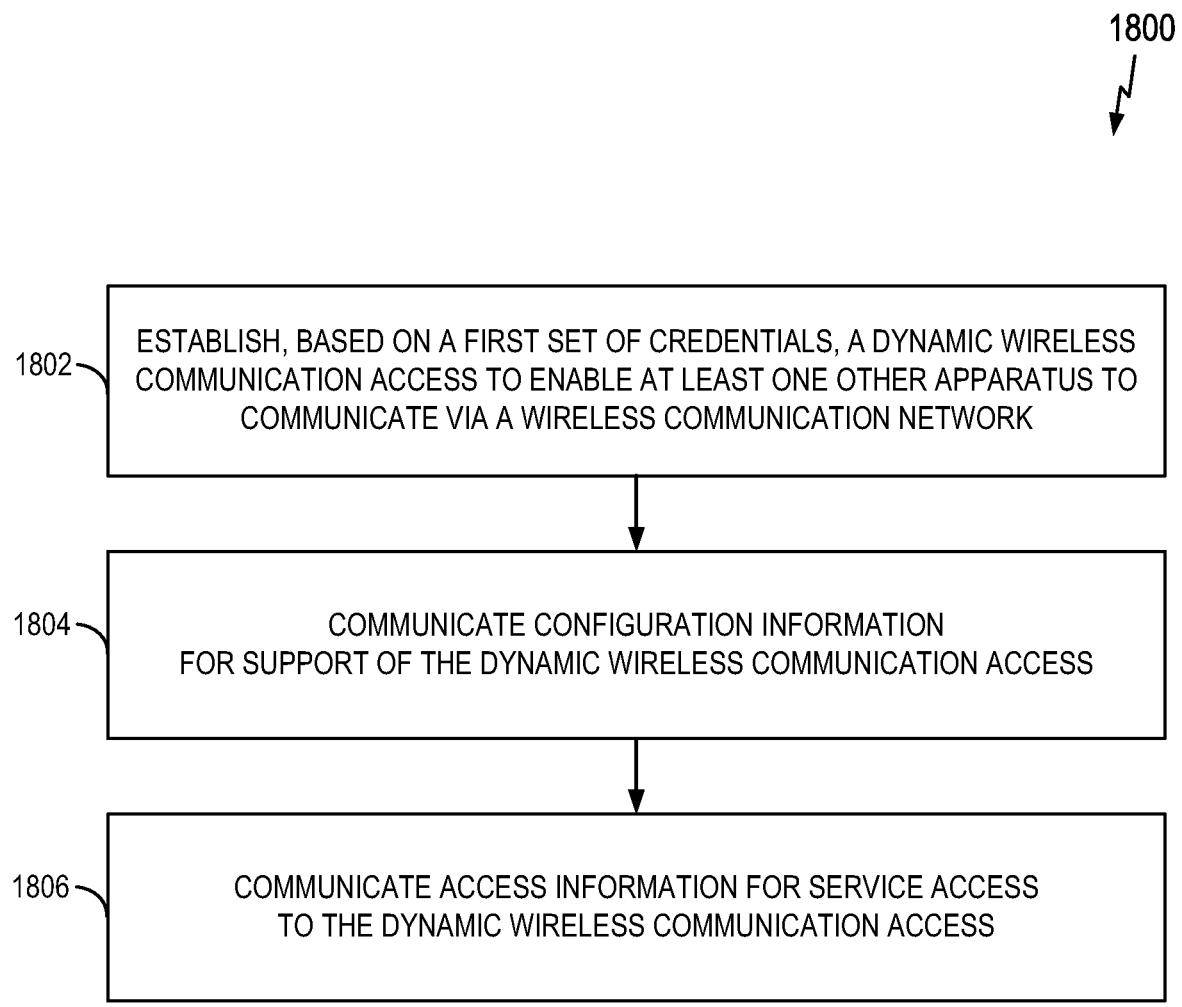
FIG. 18 illustrates an example of a process for establishing dynamic wireless communication access in accordance with some aspects of the disclosure.

FIG. 18 illustrates a process 1800 for supporting communication in accordance with some aspects of the disclosure. The process 1800 may take place within a processing circuit (e.g., the processing circuit 1710 of FIG. 17), which may be located in an access terminal, a base station, or some other suitable apparatus. Of course, in various aspects within the scope of the disclosure, the process 1800 may be implemented by any suitable apparatus capable of supporting dynamic subscriptions.

At block 1802, an apparatus (e.g., a client device or a network entity) establishes, based on a first set of credentials, dynamic wireless communication access to enable at least one other apparatus (e.g., a client device) to communicate data via a wireless communication network. In some aspects, the establishment of the dynamic wireless communication access may include negotiation between the apparatus (e.g., a client device that invokes the establishment of the dynamic wireless communication access) and a network entity. In some aspects, the establishment of the dynamic wireless communication access may include at least one of: identifying specific services and content for the dynamic wireless communication access, or providing specific services and content for the dynamic wireless communication access. In some aspects, the establishment of the dynamic wireless communication access may include: creating an identifier for the dynamic wireless communication access, or receiving an identifier for the dynamic wireless communication access.

In some aspects, the establishment of the dynamic wireless communication access may include determining that the at least one other apparatus (e.g., at least one client device) is authorized to join the dynamic wireless communication access. In some aspects, the communication of the configuration information may include distributing service credentials associated with the dynamic wireless communication access to the at least one other apparatus. In some aspects, the communication of the configuration information may include sending an identifier of the dynamic wireless communication access to the at least one other apparatus.

In some aspects, policies related to the dynamic wireless communication access may be determined based on: the first set of credentials and negotiations to establish the dynamic wireless communication access.

At block 1804, the apparatus communicates configuration information for support of the dynamic subscription. In some aspects, the communication of the configuration information may include: identifying at least one credential that is authorized for the dynamic wireless communication access; and sending the identified at least one credential to the at least one other apparatus.

In some aspects, the communication of the configuration information may include distributing to a radio access network (RAN) information about the dynamic wireless communication access. In some aspects, the information about the dynamic wireless communication access may include at least one of: a dynamic wireless communication access identifier (ID), or a dynamic wireless communication access policy.

At block 1806, the apparatus communicates access information for service access to the dynamic subscription. In some aspects, the communication of the access information may include at least one of: a radio access network (RAN) advertising support for the dynamic wireless communication access, broadcasting the access information, or sending the access information to the at least one other apparatus in response to a request from the at least one other apparatus.

Third Example Apparatus

Figure 19:
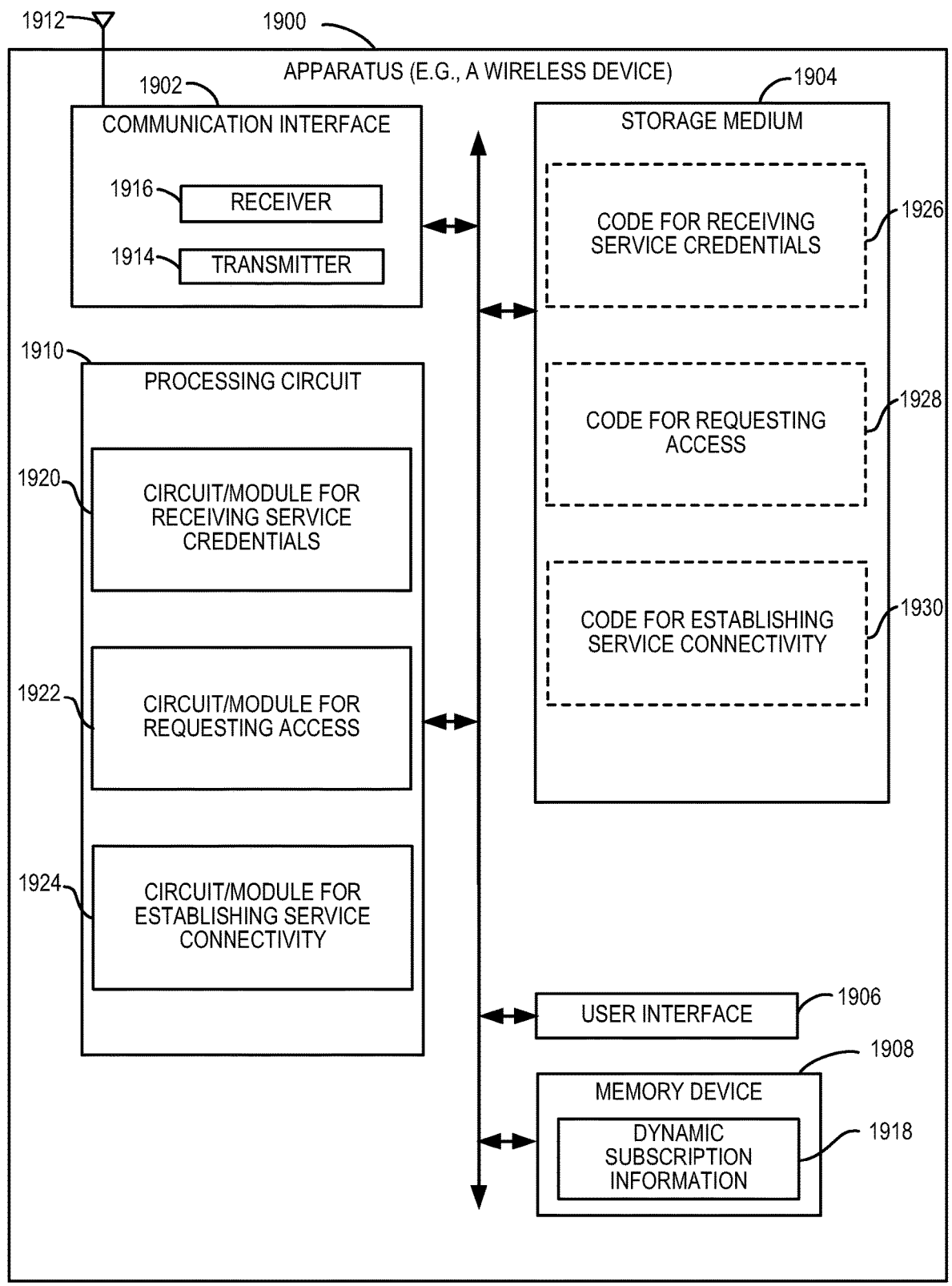
FIG. 19 illustrates a block diagram of another example hardware implementation for an apparatus (e.g., an electronic device) that can support dynamic subscriptions in accordance with some aspects of the disclosure.

FIG. 19 is an illustration of an apparatus 1900 that may support access and traffic differentiation according to one or more aspects of the disclosure. For example, the apparatus 1900 could embody or be implemented within a UE, an eNB, or some other type of device that supports communication. In various implementations, the apparatus 1900 could embody or be implemented within an access terminal, an access point, or some other type of device. In various implementations, the apparatus 1900 could embody or be implemented within a mobile phone, a smart phone, a tablet, a portable computer, a server, a personal computer, a sensor, an entertainment device, a medical device, or any other electronic device having circuitry.

The apparatus 1900 includes a communication interface (e.g., at least one transceiver) 1902, a storage medium 1904, a user interface 1906, a memory device 1908 (e.g., storing dynamic subscription-related information 1918), and a processing circuit (e.g., at least one processor) 1910. In various implementations, the user interface 1906 may include one or more of: a keypad, a display, a speaker, a microphone, a touchscreen display, of some other circuitry for receiving an input from or sending an output to a user. The communication interface 1902 may be coupled to one or more antennas 1912, and may include a transmitter 1914 and a receiver 1916. In general, the components of FIG. 19 may be similar to corresponding components of the apparatus 1500 of FIG. 15.

According to one or more aspects of the disclosure, the processing circuit 1910 may be adapted to perform any or all of the features, processes, functions, operations and/or routines for any or all of the apparatuses described herein. For example, the processing circuit 1910 may be configured to perform any of the steps, functions, and/or processes described with respect to FIGS. 1-14 and 20. As used herein, the term "adapted" in relation to the processing circuit 1910 may refer to the processing circuit 1910 being one or more of configured, employed, implemented, and/or programmed to perform a particular process, function, operation and/or routine according to various features described herein.

The processing circuit 1910 may be a specialized processor, such as an application specific integrated circuit (ASIC) that serves as a means for (e.g., structure for) carrying out any one of the operations described in conjunction with FIGS. 1-14 and 20. The processing circuit 1910 may serve as one example of a means for transmitting and/or a means for receiving.

According to at least one example of the apparatus 1900, the processing circuit 1910 may include one or more of a circuit/module for receiving service credentials 1920, a circuit/module for requesting access 1922, or a circuit/module for establishing service connectivity 1924.

The circuit/module for receiving service credentials 1920 may include circuitry and/or programming (e.g., code for receiving service credentials 1926 stored on the storage medium 1904) adapted to perform several functions relating to, for example, receiving information (e.g., data) from another apparatus. Initially, the circuit/module for receiving service credentials 1920 obtains received information. For example, the circuit/module for receiving service credentials 1920 may obtain this information from a component of the apparatus 1900 (e.g., the receiver 1916, the memory device 1908, or some other component) or directly from a device (e.g., a network entity or a device that establishes a dynamic subscription) that transmitted the information. In some implementations, the circuit/module for receiving service credentials 1920 identifies a memory location of a value in the memory device 1908 and invokes a read of that location to receive the information. In some implementations, the circuit/module for receiving service credentials 1920 processes (e.g., decodes) the received information. The circuit/module for receiving service credentials 1920 outputs the received information (e.g., stores the received information in the memory device 1908 or sends the information to another component of the apparatus 1900). In some implementations, the receiver 1916 includes or embodies the circuit/module for receiving service credentials 1920 and/or includes the code for receiving service credentials 1926.

The circuit/module for requesting access 1922 may include circuitry and/or programming (e.g., code for requesting access 1928 stored on the storage medium 1904) adapted to perform several functions relating to, for example, sending a request (e.g., data) to another apparatus. Initially, the circuit/module for requesting access 1922 obtains the request information to be sent (e.g., a dynamic subscription ID) from the memory device 1908, or some other component. The circuit/module for requesting access 1922 may then format the information for sending (e.g., in a message, according to a protocol, etc.). The circuit/module for requesting access 1922 then causes the information to be sent via a wireless communication medium. To this end, the circuit/module for requesting access 1922 may send the data to the transmitter 1914 or some other component for transmission. In some implementations, the transmitter 1914 includes or embodies the circuit/module for requesting access 1922 and/or includes the code for requesting access 1928.

The circuit/module for establishing service connectivity 1924 may include circuitry and/or programming (e.g., code for establishing service connectivity 1930 stored on the storage medium 1904) adapted to perform several functions relating to, for example, establishing connectivity with a wireless communication network via a RAN. In some implementations, the circuit/module for establishing service connectivity 1924 identifies a network entity node (e.g., a RAN entity) that provides wireless access to a wireless communication network. For example, the circuit/module for establishing service connectivity 1924 may receive information about the network entity from the circuit/module for requesting access 1922. The circuit/module for establishing service connectivity 1924 may then present this information and, optionally, credentials to the network entity to establish that the apparatus 1900 is allowed to access the service connectivity. The circuit/module for establishing service connectivity 1924 may then communicate with the network entity to exchange information (e.g., communication parameters) that enables entities to use the connectivity.

As mentioned above, programming stored by the storage medium 1904, when executed by the processing circuit 1910, causes the processing circuit 1910 to perform one or more of the various functions and/or process operations described herein. For example, the storage medium 1904 may include one or more of the code for receiving service credentials 1926, the code for requesting access 1928, or the code for establishing service connectivity 1930.

Third Example Process

Figure 20:
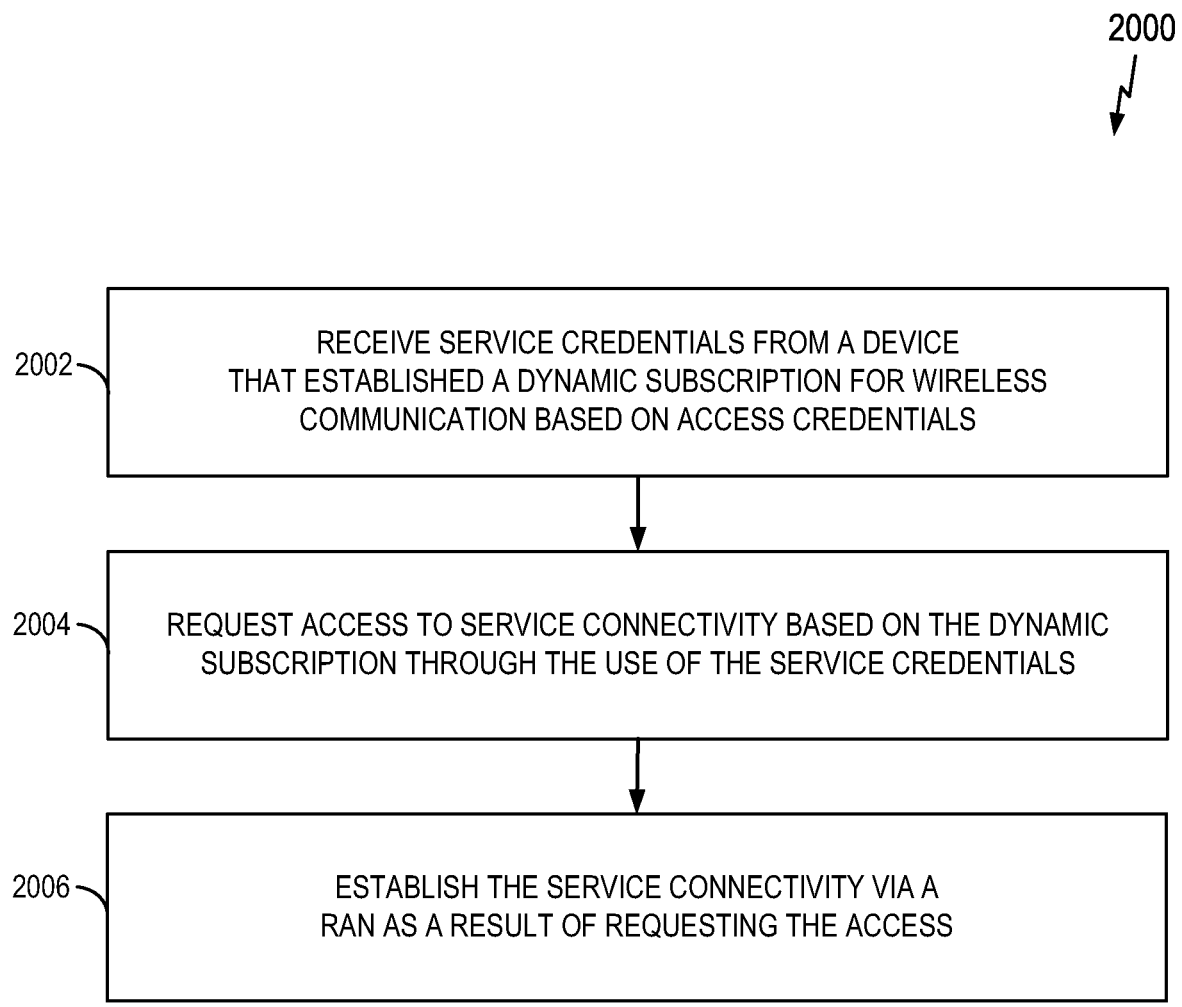
FIG. 20 illustrates an example of a process for establishing service connectivity in accordance with some aspects of the disclosure.

FIG. 20 illustrates a process 2000 for supporting communication in accordance with some aspects of the disclosure. The process 2000 may take place within a processing circuit (e.g., the processing circuit 1910 of FIG. 19), which may be located in an access terminal, a base station, or some other suitable apparatus. Of course, in various aspects within the scope of the disclosure, the process 2000 may be implemented by any suitable apparatus capable of supporting dynamic subscriptions.

At block 2002, an apparatus (e.g., a client device) receives service credentials from a device that established a dynamic subscription for wireless communication based on access credentials. For example, the apparatus may receive the service credentials directly from the device or indirectly (e.g., from a network node that stores service credentials that are received from the device).

At block 2004, the apparatus requests access to service connectivity based on the dynamic subscription through the use of the service credentials. In some aspects, the requesting of access may include discovering that the dynamic subscription is supported by a radio access network (RAN) based on dynamic subscription ID. In some aspects, the dynamic subscription ID may be: broadcast by the RAN; received as a result of sending a request regarding whether dynamic subscription is supported by the RAN; or received as a result of sending a query regarding which dynamic subscriptions are supported by the RAN.

In some aspects, the requesting of access may include at least one of: requesting to attach to a network, or requesting to establish a packet data network (PDN) connection. In some aspects, the requesting of access may include at least one of: requesting to establish a new bearer and performing traffic binding, or requesting to modify an existing bearer and performing traffic binding. In some aspects, the requesting of access may include a connecting device sending an identity of the connecting device.

At block 2006, the apparatus establishes the service connectivity via a radio access network (RAN) as a result of requesting the access. In some aspects, the service connectivity may include transport connectivity.

Fourth Example Apparatus

Figure 21:
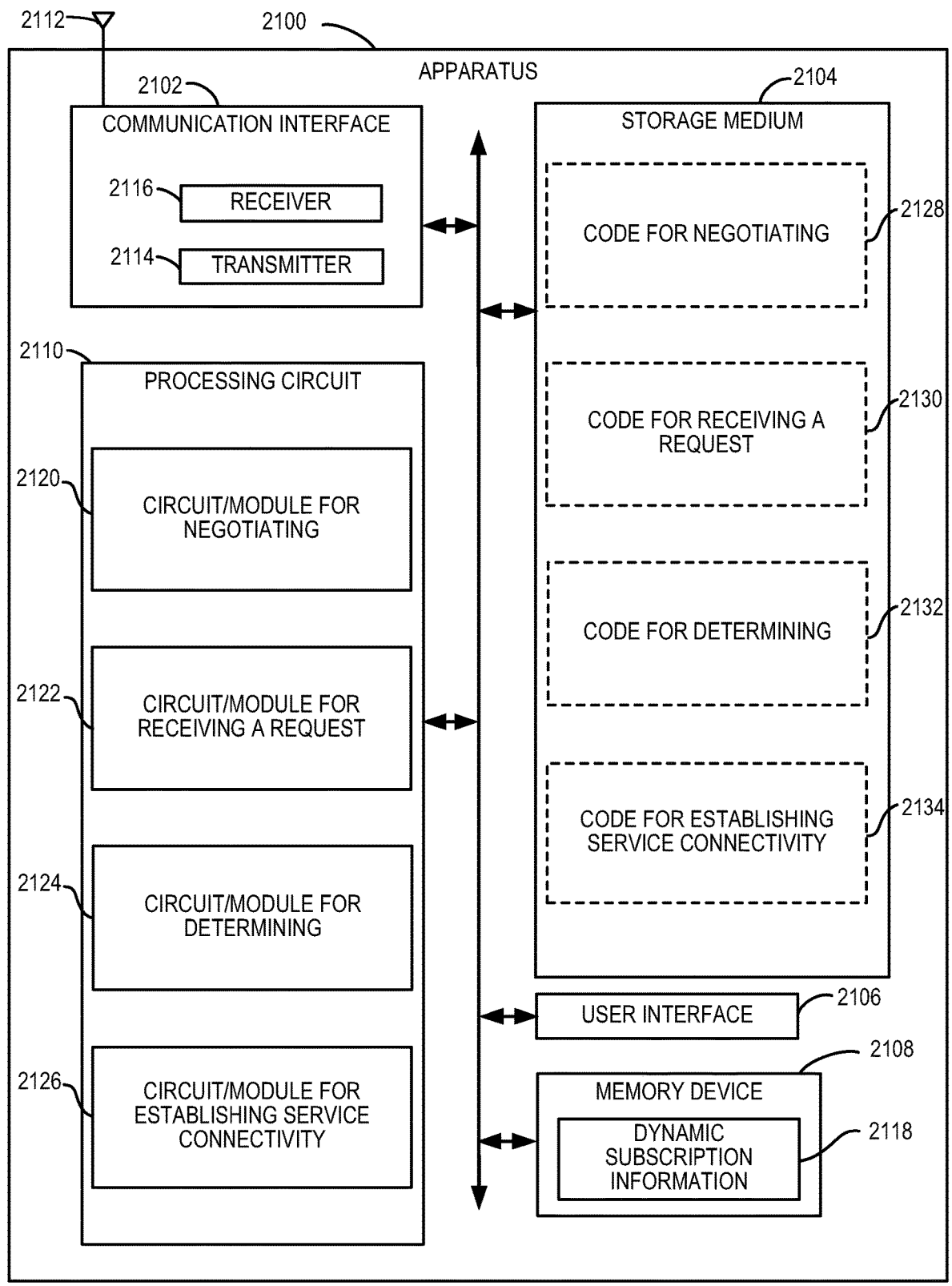
FIG. 21 illustrates a block diagram of another example hardware implementation for an apparatus (e.g., an electronic device) that can support dynamic subscriptions in accordance with some aspects of the disclosure.

FIG. 21 is an illustration of an apparatus 2100 that may support access and traffic differentiation according to one or more aspects of the disclosure. For example, the apparatus 2100 could embody or be implemented within a network entity, an eNB, a UE, or some other type of device that supports communication. In various implementations, the apparatus 2100 could embody or be implemented within a radio access network (RAN), a core network, an access point, an access terminal, or some other type of device. In various implementations, the apparatus 2100 could embody or be implemented within a mobile phone, a smart phone, a tablet, a portable computer, a server, a personal computer, a sensor, an entertainment device, a medical device, or any other electronic device having circuitry.

The apparatus 2100 includes a communication interface (e.g., at least one transceiver) 2102, a storage medium 2104, a user interface 2106, a memory device 2108 (e.g., storing dynamic subscription-related information 2118), and a processing circuit (e.g., at least one processor) 2110. In various implementations, the user interface 2106 may include one or more of: a keypad, a display, a speaker, a microphone, a touchscreen display, of some other circuitry for receiving an input from or sending an output to a user. The communication interface 2102 may be coupled to one or more antennas 2112, and may include a transmitter 2114 and a receiver 2116. In general, the components of FIG. 21 may be similar to corresponding components of the apparatus 1500 of FIG. 15.

According to one or more aspects of the disclosure, the processing circuit 2110 may be adapted to perform any or all of the features, processes, functions, operations and/or routines for any or all of the apparatuses described herein. For example, the processing circuit 2110 may be configured to perform any of the steps, functions, and/or processes described with respect to FIGS. 1-14 and 22. As used herein, the term "adapted" in relation to the processing circuit 2110 may refer to the processing circuit 2110 being one or more of configured, employed, implemented, and/or programmed to perform a particular process, function, operation and/or routine according to various features described herein.

The processing circuit 2110 may be a specialized processor, such as an application specific integrated circuit (ASIC) that serves as a means for (e.g., structure for) carrying out any one of the operations described in conjunction with FIGS. 1-14 and 22. The processing circuit 2110 may serve as one example of a means for transmitting and/or a means for receiving.

According to at least one example of the apparatus 2100, the processing circuit 2110 may include one or more of a circuit/module for negotiating 2120, a circuit/module for receiving a request 2122, a circuit/module for determining 2124, and a circuit/module for establishing service connectivity 2126.

The circuit/module for negotiating 2120 may include circuitry and/or programming (e.g., code for negotiating 2128 stored on the storage medium 2104) adapted to perform several functions relating to, for example, negotiating with a device to establish, based on a set of access credentials, a dynamic subscription for wireless communication. In some implementations, the circuit/module for negotiating 2120 selects the parameters of the dynamic subscription. For example, the circuit/module for negotiating 2120 may select one or more of: when the dynamic subscription is to be available, the services that can be accessed, or the devices that are allowed access. The circuit/module for negotiating 2120 may then may then communicate with the device to exchange information (e.g., access parameters, identifiers, etc.) that enables entities to use the dynamic subscription.

The circuit/module for receiving a request 2122 may include circuitry and/or programming (e.g., code for receiving a request 2130 stored on the storage medium 2104) adapted to perform several functions relating to, for example, receiving information (e.g., data) from another apparatus. Initially, the circuit/module for receiving a request 2122 obtains received information. For example, the circuit/module for receiving a request 2122 may obtain this information from a component of the apparatus 2100 (e.g., the receiver 2116, the memory device 2108, or some other component) or directly from a device (e.g., a device that wishes to access a dynamic subscription) that transmitted the information. In some implementations, the circuit/module for receiving a request 2122 identifies a memory location of a value in the memory device 2108 and invokes a read of that location to receive the information. In some implementations, the circuit/module for receiving a request 2122 processes (e.g., decodes) the received information. The circuit/module for receiving a request 2122 outputs the received information (e.g., stores the received information in the memory device 2108 or sends the information to another component of the apparatus 2100). In some implementations, the receiver 2116 includes or embodies the circuit/module for receiving a request 2122 and/or includes the code for receiving a request 2130.

The circuit/module for determining 2124 may include circuitry and/or programming (e.g., code for determining 2132 stored on the storage medium 2104) adapted to perform several functions relating to, for example, determining whether a device is authorized to access service connectivity. In some implementations, the circuit/module for determining 2124 obtains credentials received from a client device by the circuit/module for receiving a request 2122. The circuit/module for determining 2124 may then compare these credentials with authorization information (associated with the service connectivity) stored in a database to determine whether the device is authorized. Upon making this determination, the circuit/module for determining 2124 may generate an indication of this determination. The circuit/module for determining 2124 may then send this indication to the circuit/module for establishing service connectivity 2126, the memory device 2108, or some other component of the apparatus 2100.

The circuit/module for establishing service connectivity 2126 may include circuitry and/or programming (e.g., code for establishing service connectivity 2134 stored on the storage medium 2104) adapted to perform several functions relating to, for example, establishing connectivity with a client device via a RAN. In some implementations, the circuit/module for establishing service connectivity 2126 identifies a network entity node (e.g., a RAN entity) that provides wireless access to the client device. The circuit/module for establishing service connectivity 2126 may then communicate with the client device to exchange information (e.g., communication parameters) that enables entities to use the connectivity.

As mentioned above, programming stored by the storage medium 2104, when executed by the processing circuit 2110, causes the processing circuit 2110 to perform one or more of the various functions and/or process operations described herein. For example, the storage medium 2104 may include one or more of the code for negotiating 2128, the code for receiving a request 2130, the code for determining 2132, or the code for establishing service connectivity 2134.

Fourth Example Process

Figure 22:
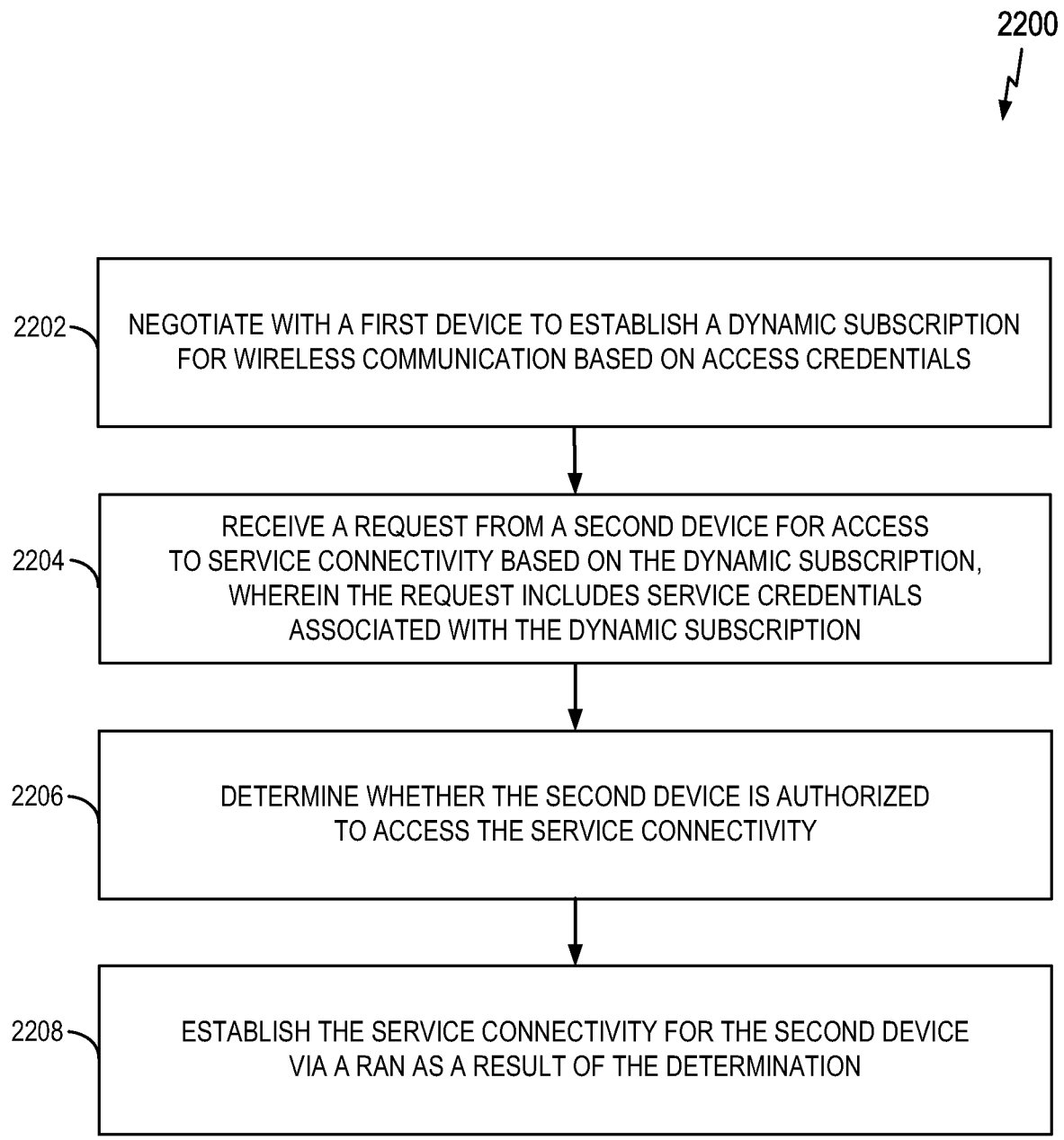
FIG. 22 illustrates an example of a process for establishing service connectivity in accordance with some aspects of the disclosure.

FIG. 22 illustrates a process 2200 for supporting communication in accordance with some aspects of the disclosure. The process 2200 may take place within a processing circuit (e.g., the processing circuit 2110 of FIG. 21), which may be located in a network entity, a base station, an access terminal, or some other suitable apparatus. Of course, in various aspects within the scope of the disclosure, the process 2200 may be implemented by any suitable apparatus capable of supporting dynamic subscriptions.

At block 2202, an apparatus (e.g., a network entity) negotiates with a first device to establish a dynamic subscription for wireless communication based on access credentials. For example, a network entity may receive a request from a client device to establish a DMVNO.

At block 2204, the apparatus receives a request from a second device for access to service connectivity based on the dynamic subscription, wherein the request includes service credentials associated with the dynamic subscription. In some aspects, each of the service credentials may be associated with at least one of: an application, a service, a service provider, a radio bearer, a virtual wireless communication network, or a dynamic mobile virtual network operator (DMVNO). In some aspects, each of the service credentials may include at least one of: an ownership entity identifier, a content provider identifier, an application identifier, an ownership entity policy, a security credential, an identity of a charging entity for corresponding traffic, or an identity of an authorizing entity for corresponding traffic.

At block 2206, the apparatus determines whether the second device is authorized to access the service connectivity. In some aspects, the determination of whether the second device is authorized may include verifying an identity of the second device. In some aspects, the determination of whether the second device is authorized may include verifying with the first device that the second device is authorized to access the service connectivity. In some aspects, the determination of whether the second device is authorized may include sending an identifier of the dynamic subscription to the first device.

At block 2208, the apparatus establishes the service connectivity for the second device via a radio access network (RAN) as a result of the determination. In some aspects, the establishment of the service connectivity may include at least one of: establishing a data connection, or establishing a packet data network (PDN) connection. In some aspects, the establishment of the service connectivity may include performing a device attach and establishing a data connection. In some aspects, the establishment of the service connectivity may include at least one of: establishing a new bearer and performing traffic binding, or modifying an existing bearer and performing traffic binding.

Fifth Example Apparatus

Figure 23:
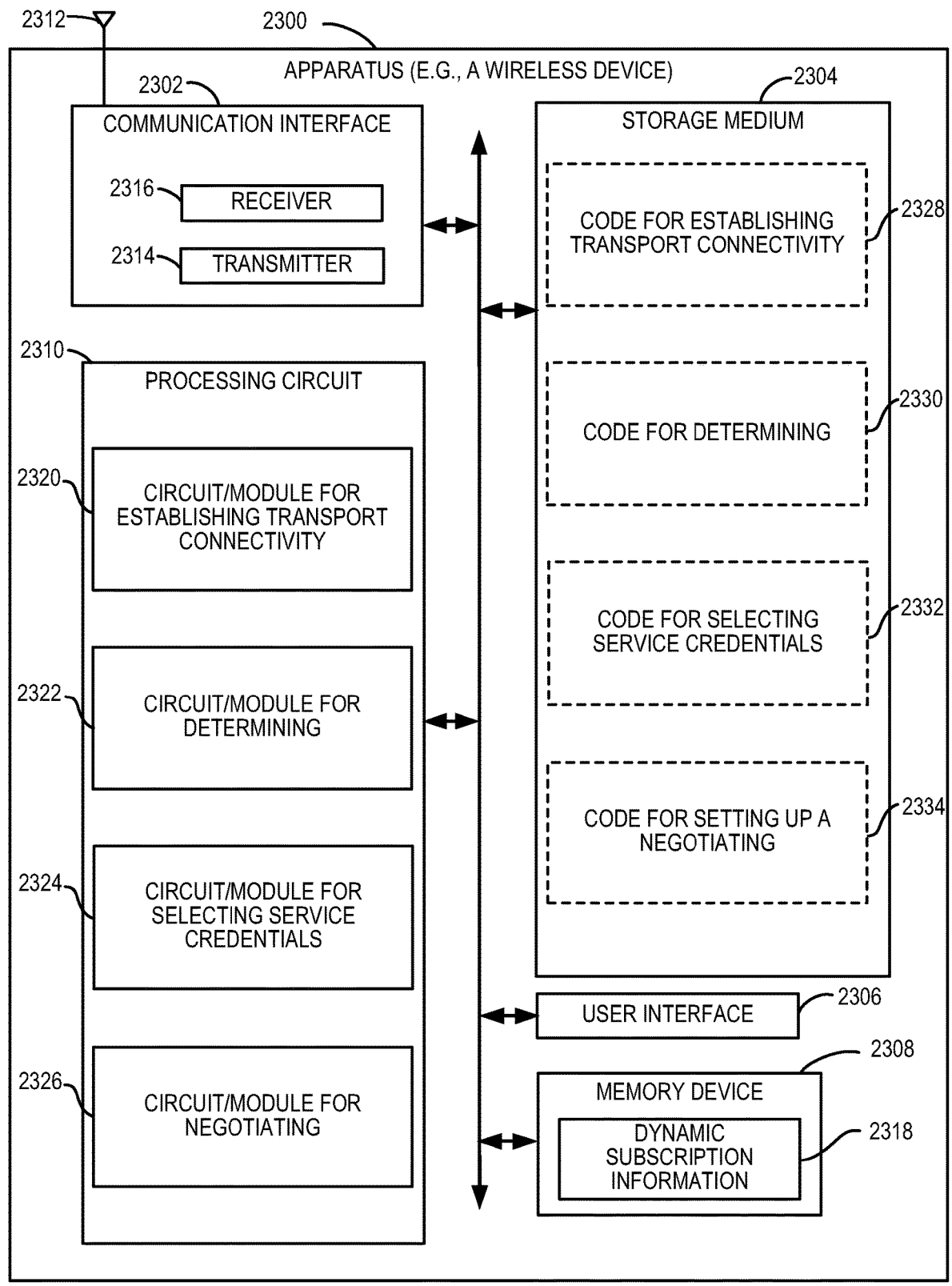
FIG. 23 illustrates a block diagram of another example hardware implementation for an apparatus (e.g., an electronic device) that can support dynamic subscriptions in accordance with some aspects of the disclosure.

FIG. 23 is an illustration of an apparatus 2300 that may support access and traffic differentiation according to one or more aspects of the disclosure. For example, the apparatus 2300 could embody or be implemented within a UE, an eNB, or some other type of device that supports wireless communication. In various implementations, the apparatus 2300 could embody or be implemented within an access terminal, an access point, or some other type of device. In various implementations, the apparatus 2300 could embody or be implemented within a mobile phone, a smart phone, a tablet, a portable computer, a server, a personal computer, a sensor, an entertainment device, a medical device, or any other electronic device having circuitry.

The apparatus 2300 includes a communication interface (e.g., at least one transceiver) 2302, a storage medium 2304, a user interface 2306, a memory device 2308 (e.g., storing dynamic subscription-related information 2318), and a processing circuit (e.g., at least one processor) 2310. In various implementations, the user interface 2306 may include one or more of: a keypad, a display, a speaker, a microphone, a touchscreen display, of some other circuitry for receiving an input from or sending an output to a user. The communication interface 2302 may be coupled to one or more antennas 2312, and may include a transmitter 2314 and a receiver 2316. In general, the components of FIG. 23 may be similar to corresponding components of the apparatus 1500 of FIG. 15.

According to one or more aspects of the disclosure, the processing circuit 2310 may be adapted to perform any or all of the features, processes, functions, operations and/or routines for any or all of the apparatuses described herein. For example, the processing circuit 2310 may be configured to perform any of the steps, functions, and/or processes described with respect to FIGS. 1-14 and 24. As used herein, the term "adapted" in relation to the processing circuit 2310 may refer to the processing circuit 2310 being one or more of configured, employed, implemented, and/or programmed to perform a particular process, function, operation and/or routine according to various features described herein.

The processing circuit 2310 may be a specialized processor, such as an application specific integrated circuit (ASIC) that serves as a means for (e.g., structure for) carrying out any one of the operations described in conjunction with FIGS. 1-14 and 24. The processing circuit 2310 may serve as one example of a means for transmitting and/or a means for receiving.

According to at least one example of the apparatus 2300, the processing circuit 2310 may include one or more of a circuit/module for establishing transport connectivity 2320, a circuit/module for determining 2322, a circuit/module for selecting service credentials 2324, or a circuit/module for negotiating 2326. In some aspects, the circuit/module for establishing transport connectivity 2320 may perform operations similar to the circuit/module for establishing connectivity 1520. In some aspects, the circuit/module for determining 2322 may perform operations similar to the circuit/module for determining that data is to be communicated 1522. In some aspects, the circuit/module for selecting service credentials 2324 may identify a service credential to use based on information associated with data to be communicated (e.g., an application ID, a service ID, etc.). In some aspects, the circuit/module for negotiating 2326 may perform operations similar to the circuit/module for negotiating 1526.

As mentioned above, programming stored by the storage medium 2304, when executed by the processing circuit 2310, causes the processing circuit 2310 to perform one or more of the various functions and/or process operations described herein. For example, the storage medium 2304 may include one or more of the code for establishing transport connectivity 2328, the code for determining 2330, the code for selecting service credentials 2332, or the code for negotiating 2334.

Fifth Example Process

Figure 24:
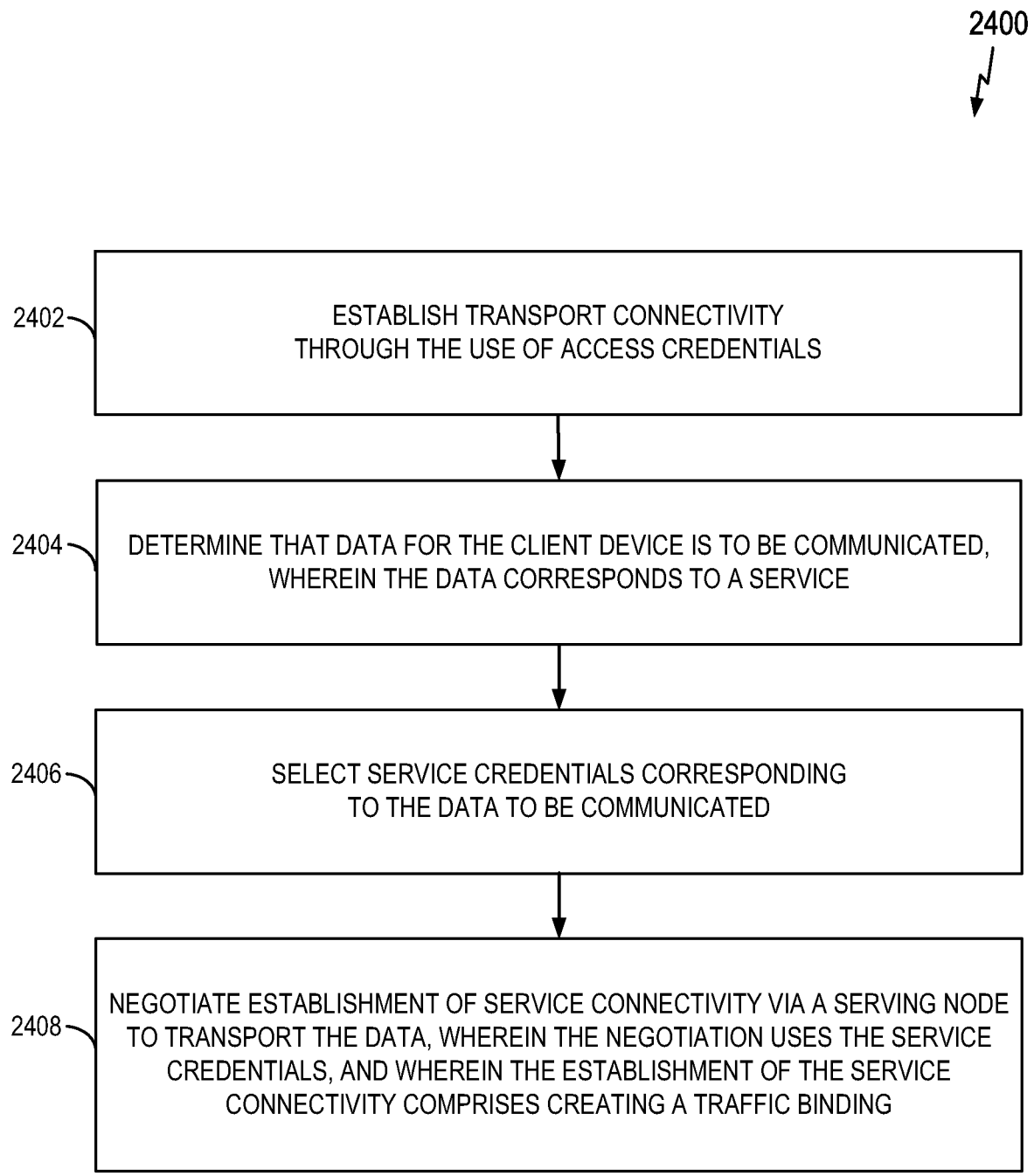
FIG. 24 illustrates an example of a process for establishing service connectivity in accordance with some aspects of the disclosure.

FIG. 24 illustrates a process 2400 for supporting communication in accordance with some aspects of the disclosure. The process 2400 may take place within a processing circuit (e.g., the processing circuit 2310 of FIG. 23), which may be located in an access terminal, a base station, or some other suitable apparatus. Of course, in various aspects within the scope of the disclosure, the process 2400 may be implemented by any suitable apparatus capable of supporting dynamic subscriptions.

At block 2402, an apparatus (e.g., a client device or a network entity) establishes transport connectivity through the use of access credentials. In some aspects, the establishment of the transport connectivity may include at least one of: the client device performing an attach procedure and establishing a data connection, or the client device installing data traffic and traffic binding information corresponding to a transport connection being created based on the access credentials.

At block 2404, the apparatus determines that data for the client device is to be communicated, wherein the data corresponds to a particular service.

At block 2406, the apparatus selects service credentials corresponding to the data to be communicated. In some aspects, the service credentials are selected based on traffic identifying information that may include at least one of: an application identifier (ID), a service ID, a subscription ID, or a traffic filter.

In some aspects, each credential may be associated with at least one of: an application, a service, a service provider, a radio bearer, a virtual wireless communication network, or a dynamic mobile virtual network operator (DMVNO). In some aspects, each credential may include at least one of: an ownership entity identifier, a content provider identifier, an application identifier, an ownership entity policy, a security credential, an identity of a charging entity for corresponding traffic, or an identity of an authorizing entity for corresponding traffic.

At block 2408, the apparatus negotiates establishment of service connectivity via a serving node to transport the data. In some aspects, the negotiation involves the use of the service credentials. In some aspects, the establishment of the service connectivity involves creating a traffic binding.

In some aspects, the negotiation may include the client device sending a request that includes at least one of the service credentials. In some aspects, the negotiation may include at least one of: establishment of a new data connection, establishment of a new packet data network (PDN) connection, establishment of new communication bearers, or modification of existing communication bearers.

In some aspects, the creation of the traffic binding may include at least one of: creating specific traffic flow templates (TFTs), creating extended TFTs, receiving information about the traffic binding at the client device, or receiving information about the traffic binding at a radio access network (RAN).

In some aspects, the process 2400 may further include: storing information about the traffic binding at a network entity that created the traffic binding, wherein the network entity may include at least one of: a packet data network gateway (PDN GW), a policy control and charging (PCC) entity, or the serving node. In some aspects, the creation of the traffic binding may include at least one of: sending information about the traffic binding to the client device, sending information about the traffic binding to a radio access network (RAN), sending information about the traffic binding to the serving node.

In some aspects, the creation of the traffic binding may include defining packet marking to be added to at least one data packet of the data traffic. In some aspects, the marking may include differentiated services code point (DSCP) marking that includes at least one of: an Application identifier (ID), a Service ID, an ownership entity (OE) ID, a Subscription ID, or a Service Provider ID. In some aspects, the marking may be performed by at least one of: the client device for uplink traffic, a network entity for downlink traffic, a packet data network gateway (PDN GW) for downlink traffic, or a radio access network (RAN) for downlink traffic.

In some aspects, the binding may include a mapping of a specific service bearer identifier (ID) to at least one of: an application, a service, or a subscription. In some aspects, the specific service bearer ID may include at least one of: a dedicated radio access bearer identifier (RAB ID) allocated by a network for specific traffic upon creation of the binding, an existing RAB ID augmented with a qualifier for the data traffic, an existing packet data network (PDN) RAB ID augmented with a qualifier for the data traffic, or a generic RAB ID augmented with a qualifier for the data traffic. In some aspects, the process 2400 may further include the client device selecting the specific service bearer ID when generating traffic corresponding to a specific application, service, or subscription.

In some aspects, a radio access network (RAN) may map the traffic binding to network bearers based on an established binding for a communication uplink. In some aspects, the RAN may perform at least one of: upon receiving data traffic for a service bearer ID, performing packet marking towards a core network based on binding information received upon the creation of the traffic binding; mappings network bearers to the traffic binding based on the established binding in the communication uplink; or upon receiving data traffic from a core network with a specific packet marking, routing the data traffic to the client device using a corresponding service bearer ID based on binding information received upon the creation of the traffic binding.

Additional Processes

Figure 25:
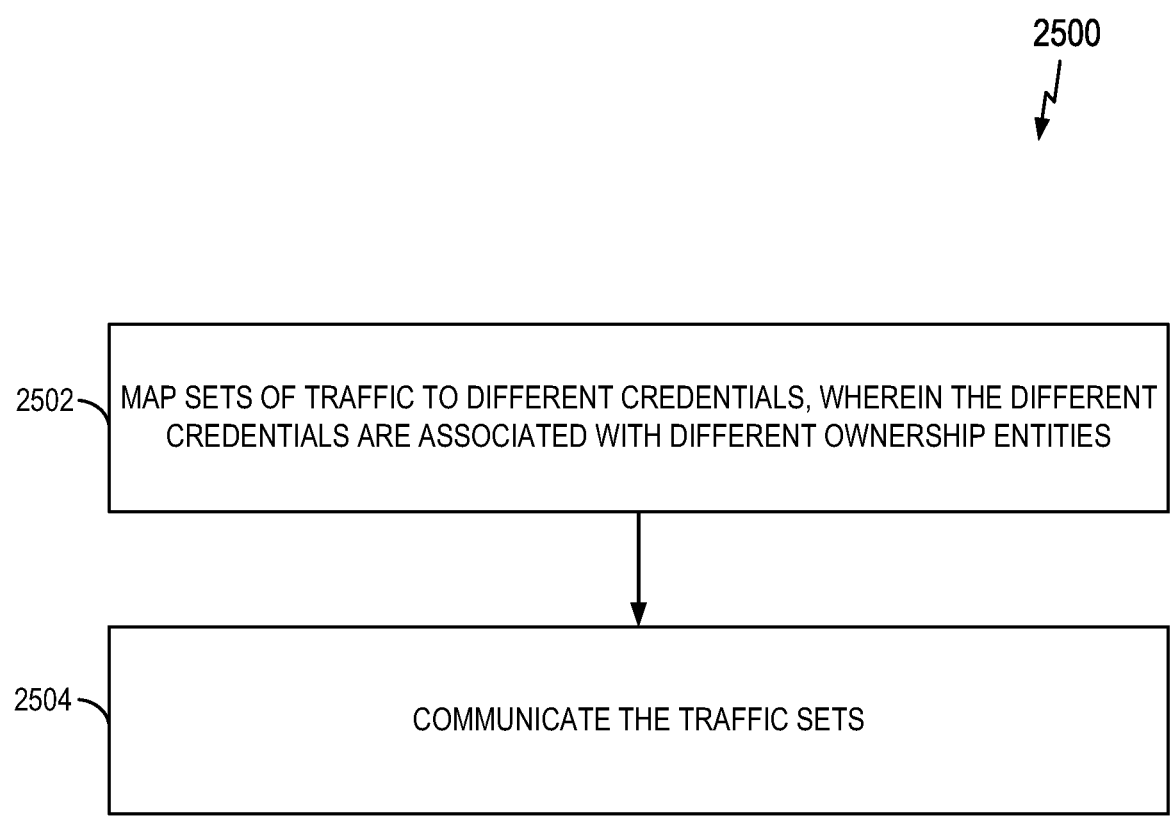
FIG. 25 illustrates another example of a process for supporting access and/or traffic differentiation in accordance with some aspects of the disclosure.

FIG. 25 illustrates a process 2500 for traffic differentiation in accordance with some aspects of the disclosure. The process 2500 may take place within a processing circuit (e.g., the processing circuit 1510 of FIG. 15), which may be located in a mobile device, a network node, or some other suitable apparatus. Of course, in various aspects within the scope of the disclosure, the process 2500 may be implemented by any suitable apparatus capable of supporting credential-related operations.

At block 2502, sets of traffic are mapped to different credentials. For example a first traffic flow may be bound to a first service credential and a second traffic flow bound to a second service credential. In some aspects, the different credentials are associated with different ownership entities.

In some aspects, the different credentials may be credentials of a first type, and the process 2500 may further include using a credential of a second type to gain access to service provider transport. In some aspects, the credentials of the first type may be service credentials, and the credential of the second type may be an access credential.

In some aspects, the different credentials are associated with different radio bearers; and the communicating of the traffic sets comprises, for each traffic set, communicating the traffic set over the radio bearer associated with the traffic set.

At block 2504, the traffic sets are communicated. For example, a mobile device (e.g., a UE) or a network node (e.g., a server, a RAN node, an access node, etc.) may send or receive the traffic sets.

In some aspects, the process 2500 may further include communicating information that indicates, for each traffic set, the credential mapped to the traffic set. In some aspects, the information is communicated in-band with respect to the communication of the traffic sets. In some aspects, the information is communicated out-of-band with respect to the communication of the traffic sets.

In some aspects, the process 2500 may further include, for each traffic set, applying a policy associated with the credential for the traffic set. In some aspects, the policy comprises at least one of: traffic filtering, traffic charging, preferred treatment for at least one of the traffic sets, or differentiated treatment for the traffic sets.

Figure 26:
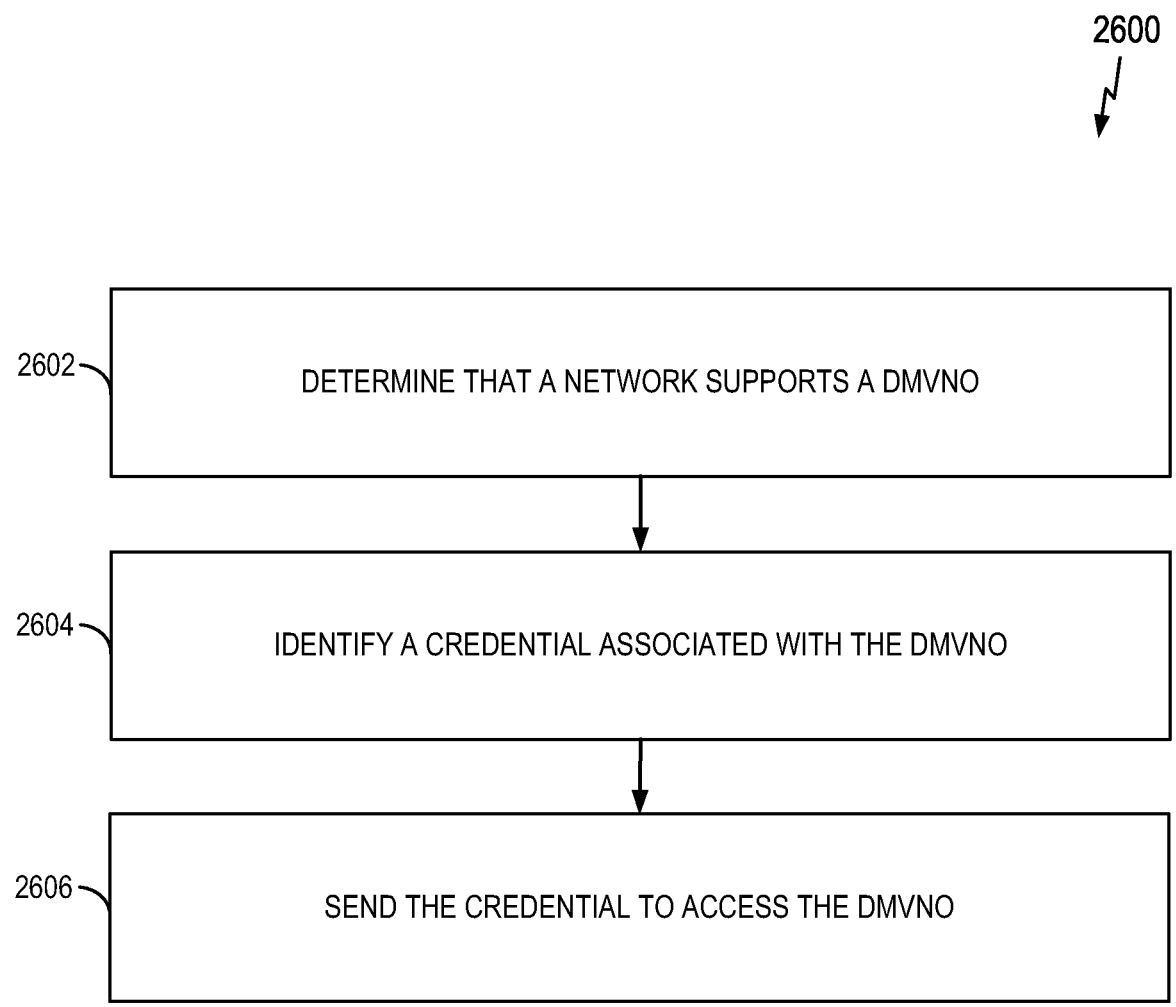
FIG. 26 illustrates another example of a process for supporting access and/or traffic differentiation in accordance with some aspects of the disclosure.

FIG. 26 illustrates a process 2600 for access in accordance with some aspects of the disclosure. The process 2600 may take place within a processing circuit (e.g., the processing circuit 1910 of FIG. 19), which may be located in a mobile device, or some other suitable apparatus. Of course, in various aspects within the scope of the disclosure, the process 2600 may be implemented by any suitable apparatus capable of supporting credential-related operations.

At block 2602, a determination is made that a network supports a DMVNO. For example, a UE may receive an indication from a network node that the network node supports at least one DMVNO.

In some aspects, the determination may include receiving information that indicates that the network supports establishment of the DMVNO. In some aspects, the information is received via at least one of: a broadcast signal, a layer 2 signal, a connection establishment communication, or a protocol configuration option (PCO) information element (IE). In some aspects, the determination may include: sending a query regarding whether the network supports establishment of the DMVNO; and receiving a response to the query, wherein the response indicates that the network supports establishment of the DMVNO.

At block 2604, a credential associated with the DMVNO is identified. For example, a UE may identify a service credential for the DMVNO.

In some aspects, the identified credential may be a credential of a first type, and the process 2600 may further include using a credential of a second type to gain access to service provider transport. In some aspects, the credential of the first type may be a service credential and the credential of the second type may be an access credential.

At block 2606, the credential is sent to access the DMVNO. For example, the UE may transmit the credential to the network node of block 2602.

In some aspects, the process 2600 may further include sending an identifier of an entity that established the DMVNO. In some aspects, the process 2600 may further include: identifying a radio bearer designated for the DMVNO; and communicating traffic for the DMVNO over the identified radio bearer. In some aspects, the process 2600 may further include: determining that the network supports another DMVNO; identifying another credential associated with the other DMVNO; and sending the other credential to access the other DMVNO.

Figure 27:
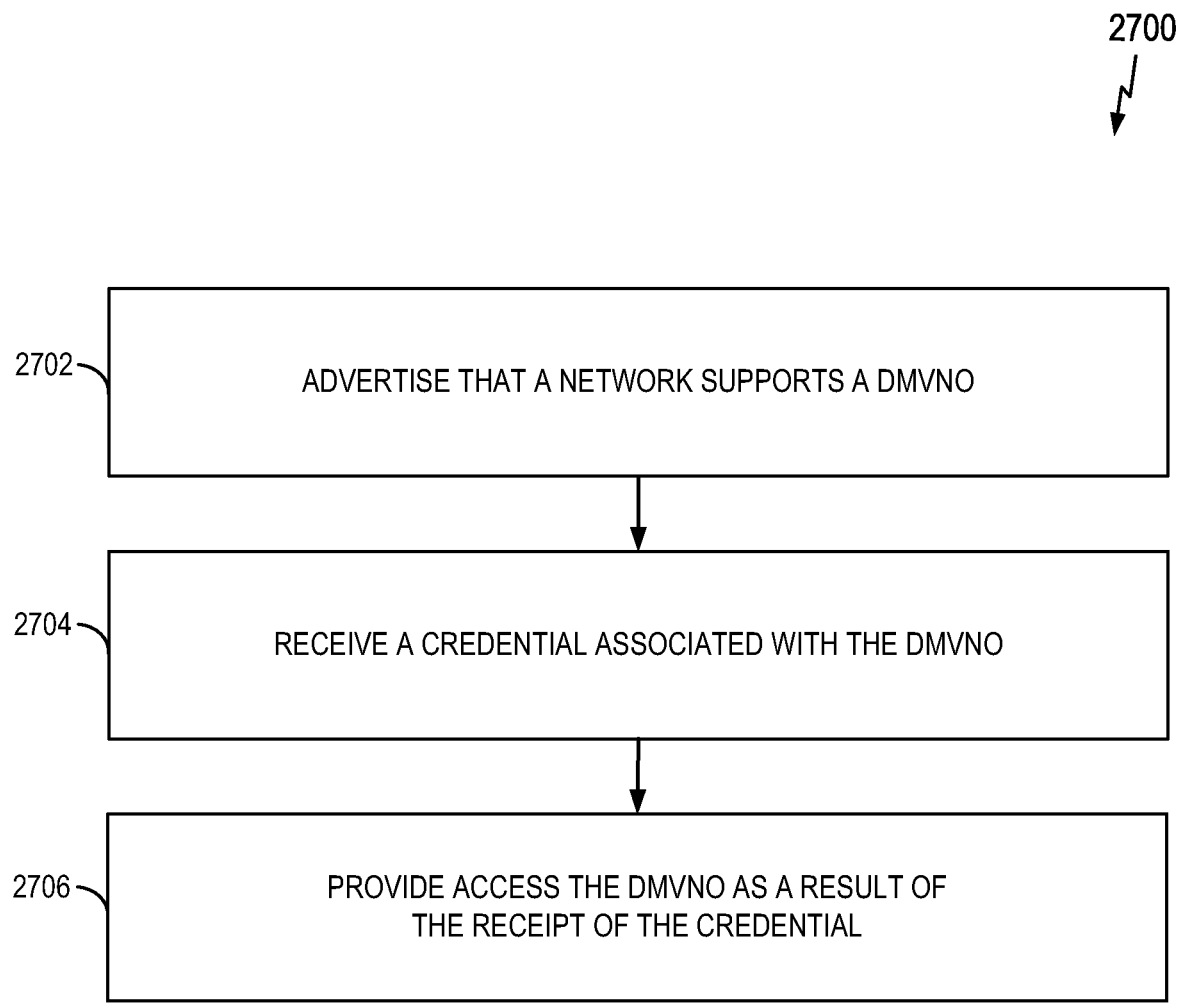
FIG. 27 illustrates another example of a process for supporting access and/or traffic differentiation in accordance with some aspects of the disclosure.

FIG. 27 illustrates a process 2700 for access in accordance with some aspects of the disclosure. The process 2700 may take place within a processing circuit (e.g., the processing circuit 2110 of FIG. 21), which may be located in a network node, or some other suitable apparatus. Of course, in various aspects within the scope of the disclosure, the process 2700 may be implemented by any suitable apparatus capable of supporting credential-related operations.

At block 2702, an apparatus (e.g., a network node) advertises that a network supports a DMVNO. For example, the apparatus may broadcast an indication of this support or respond to a query (e.g., from a UE).

In some aspects, the advertising may include at least one of: a broadcast signal, a layer 2 signal, a connection establishment communication, or a protocol configuration option (PCO) information element (IE).

In some aspects, the advertising may include: receiving a query regarding whether the network supports establishment of a DMVNO; and sending a response to the query, wherein the response indicates that the network supports establishment of a DMVNO.

At block 2704, a credential associated with the DMVNO is received (e.g., from a UE).

In some aspects, the credential may be received from a connecting device, and the process 2700 may further include verifying whether an entity that created the DMVNO has authorized the connecting device to access the DMVNO.

At block 2706, access to the DMVNO is provided as a result of the receipt of the credential at block 2704. For example, a network entity may provide connectivity to an OE service associated with the credential.

Figure 28:
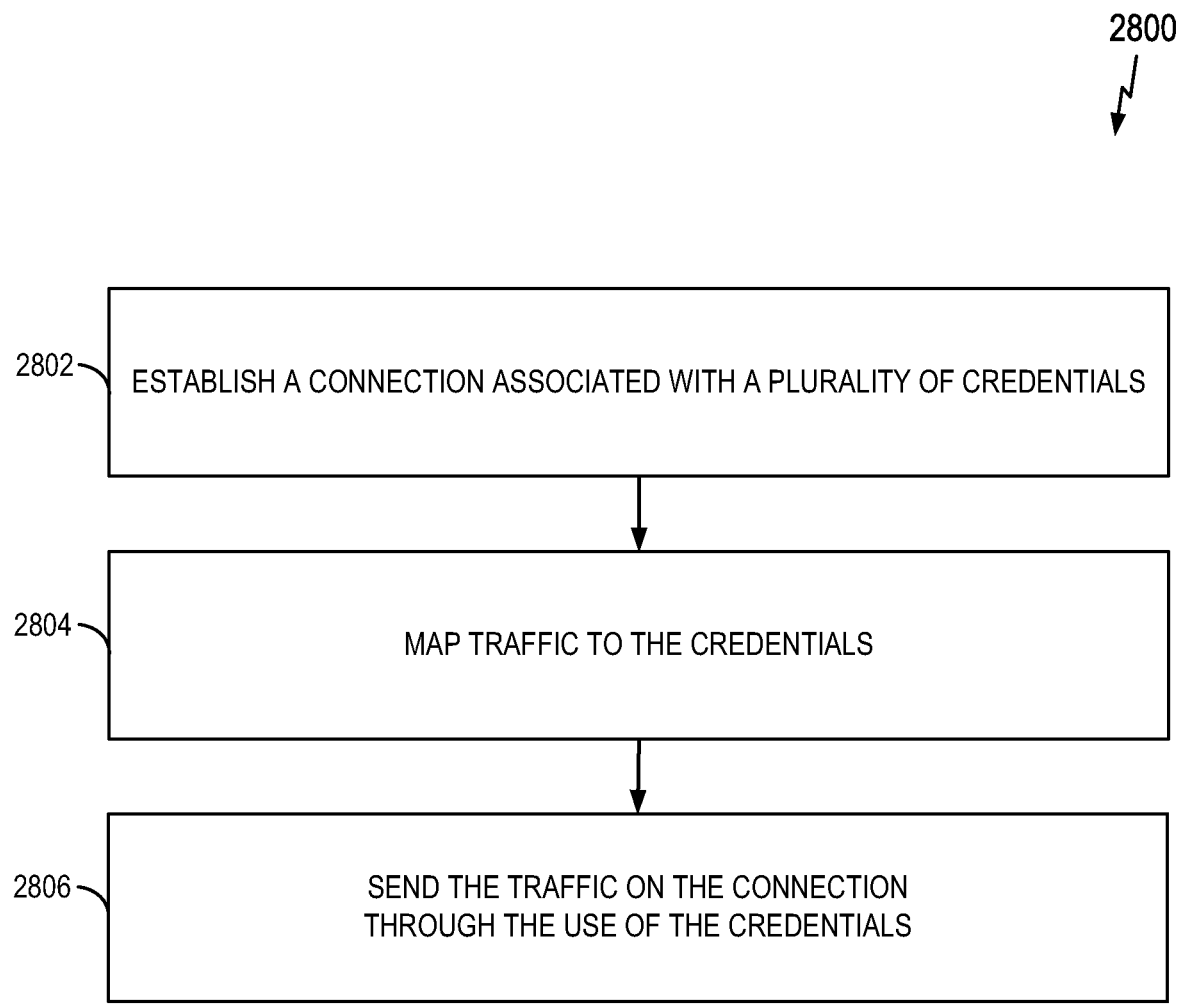
FIG. 28 illustrates another example of a process for supporting access and/or traffic differentiation in accordance with some aspects of the disclosure.

FIG. 28 illustrates a process 2800 employing multiple credentials in accordance with some aspects of the disclosure. The process 2800 may take place within a processing circuit (e.g., the processing circuit 1510 of FIG. 15 or the processing circuit 1810 of FIG. 18), which may be located in a mobile device, a network node, or some other suitable apparatus. Of course, in various aspects within the scope of the disclosure, the process 2800 may be implemented by any suitable apparatus capable of supporting credential-related operations.

At block 2802, a connection associated with a plurality of credentials is established. For example, the connection may be associated with different service credentials. In some aspects, the different service credentials may be associated with different ownership entities.

In some aspects, the credentials may be credentials of a first type; and the process 2800 may further include using a credential of a second type to gain access to service provider transport. In some aspects, the credentials of the first type may be service credentials; and the credential of the second type may be an access credential.

At block 2804, traffic is mapped to the credentials. In some aspects, the traffic may include different traffic flows; and the mapping may map the different traffic flows to different credentials of the plurality of credentials. For example a first traffic flow may be bound to a first service credential and a second traffic flow bound to a second service credential.

At block 2806, the traffic is sent on the connection through the use of the credentials. For example, a mobile device (e.g., a UE) or a network node (e.g., a server, a RAN node, an access node, etc.) may send or receive different traffic flows via different bearers associated with different credentials. In some aspects, the different traffic flows may be sent concurrently on the connection.

In some aspects, the different credentials may be associated with different radio bearers; and the sending of the traffic may include, for each traffic flow, communicating the traffic flow over a radio bearer associated with the corresponding credential.

In some aspects, the process 2800 may further include: communicating information that indicates, for each traffic flow, the credential mapped to the traffic flow. In some aspects, the information may be communicated in-band with respect to the sending of the traffic. In some aspects, the information may be communicated out-of-band with respect to the sending of the traffic.

In some aspects, the process 2800 may further include: for each traffic flow, applying a policy associated with the credential for the traffic flow. In some aspects, the policy may include at least one of: traffic filtering, traffic charging, preferred treatment for at least one of the traffic flows, or differentiated treatment for the traffic flows.

Figure 29:
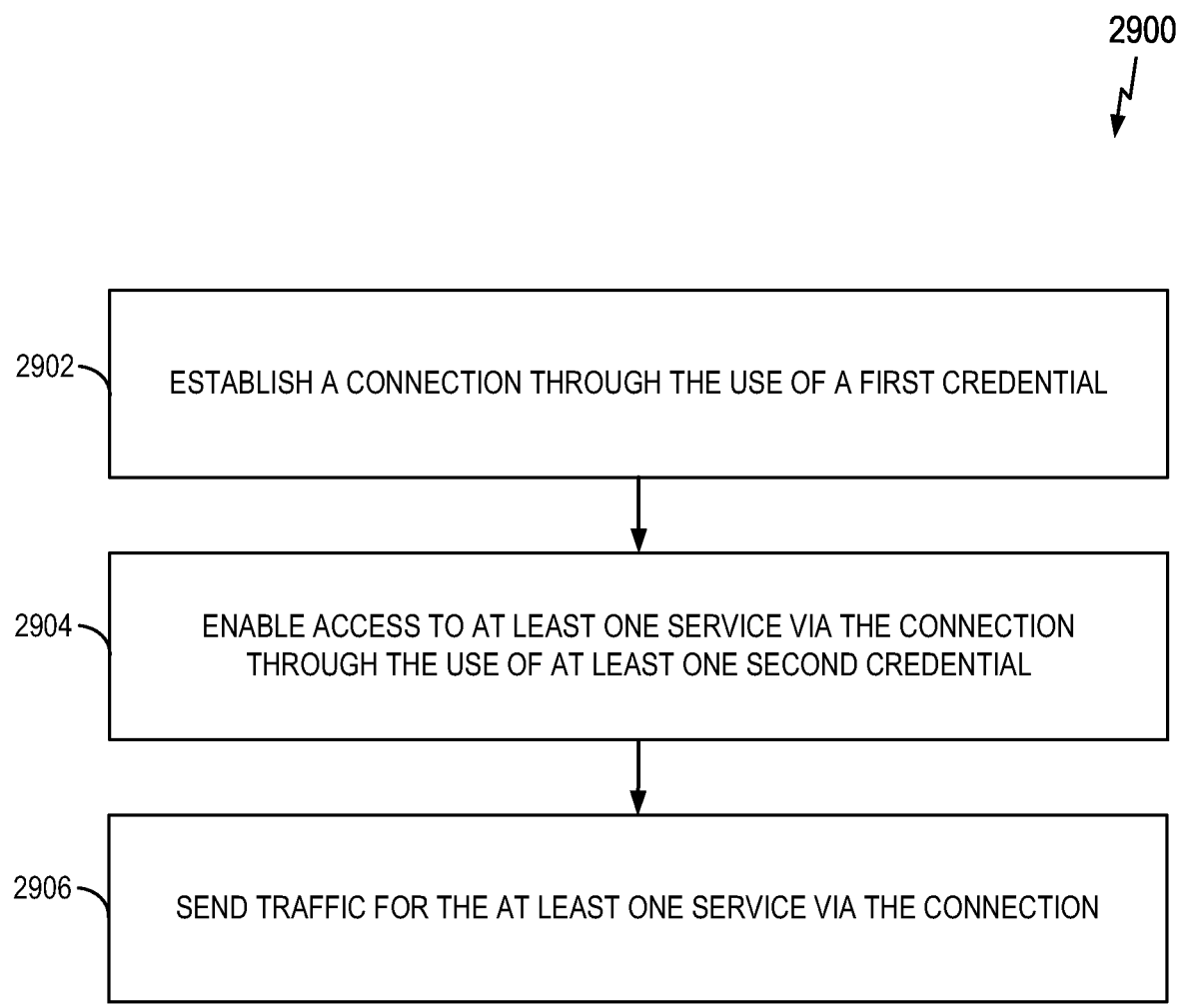
FIG. 29 illustrates another example of a process for supporting access and/or traffic differentiation in accordance with some aspects of the disclosure.

FIG. 29 illustrates another process 2900 employing multiple credentials in accordance with some aspects of the disclosure. The process 2900 may take place within a processing circuit (e.g., the processing circuit 2110 of FIG. 21), which may be located in a mobile device, a network node, or some other suitable apparatus. Of course, in various aspects within the scope of the disclosure, the process 2900 may be implemented by any suitable apparatus capable of supporting credential-related operations.

At block 2902, a connection is established through the use of a first credential. For example, an access credential may be used to gain access to service provider transport. In some aspects, the establishing of the connection may include using the first credential to gain access to service provider transport.

At block 2904, access is enabled to at least one service via the connection through the use of at least one second credential. For example a first service credential may be used to gain access to a first service and a second service credential may be used to gain access to a second service. In some aspects, the different service credentials (and services) may be associated with different ownership entities. In some aspects, the first credential may be an access credential; and each of the at least one second credential may be a service credential.

In some aspects, the process 2900 may further include communicating information that identifies the at least one second credential. In some aspects, the information may be communicated in-band with respect to the sending of the traffic. In some aspects, the information may be communicated out-of-band with respect to the sending of the traffic.

At block 2906, traffic for the at least one service is sent via the connection. For example, a mobile device (e.g., a UE) or a network node (e.g., a server, a RAN node, an access node, etc.) may send or receive a traffic flow associated with a particular service via a designated bearer.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method of wireless communication, comprising:
   establishing, by a client device, a transport connectivity with a network through use of access credentials;
   determining that first data corresponding to a first service is to be transmitted from the client device to the network;
   selecting first service credentials corresponding to the first service;
   establishing, by the client device, a first service connectivity with the network through use of the first service credentials, wherein the first service credentials are used by the client device to generate authorized traffic when the access credentials have been used to gain access to the network;
   receiving a traffic binding from the network that defines a packet marking to be added to data packets associated with the first service;
   marking one or more packets associated with the first service with the packet marking; and
   sending the first data to the network, wherein sending the first data comprises transmitting the one or more packets from the client device to the network.

2. The method of claim 1, further comprising:
   determining that second data corresponding to a second service is to be transmitted from the client device to the network;
   selecting second service credentials corresponding to the second service;
   establishing, by the client device, a second service connectivity with the network through use of the second service credentials; and
   sending the second data to the network.

3. The method of claim 2, wherein establishing the transport connectivity comprises establishing the transport connectivity via a serving node, wherein establishing the first service connectivity comprises establishing the first service connectivity via the serving node, and wherein establishing the second service connectivity comprises establishing the second service connectivity via the serving node.

4. The method of claim 1, wherein the establishment of the transport connectivity comprises a negotiation between the client device and the network, and wherein the establishment of the first service connectivity comprises a negotiation between the client device and the network.

5. The method of claim 1, wherein establishing the transport connectivity comprises:
   performing an attach procedure; and
   establishing a data connection.

6. The method of claim 1, wherein establishing the transport connectivity comprises installing data traffic and traffic binding information corresponding to the transport connection being created based on the access credentials.

7. The method of claim 1, wherein selecting the first service credentials comprises identifying the first service credentials based on an application identifier or service identifier included with the first data.

8. The method of claim 1, wherein sending the first data comprises marking one or more packets associated with the first service with an identifier of the first service.

9. The method of claim 1, further comprising receiving one or more packets marked with the packet marking at the client device from the network.

10. The method of claim 1, wherein the first service credentials identify to a network an entity to be charged for a given traffic flow and an entity that authorizes transport of the given traffic flow.

11. The method of claim 1, wherein the first service credentials comprise one or more of an ownership entity identifier, a content provider identifier, an application identifier, ownership entity policies, or security credentials.

12. The method of claim 1, wherein the traffic binding comprises a traffic flow template (TFT).

13. The method of claim 1, wherein the packet marking comprises a differentiated services code point (DSCP) marking that includes one or more of: an application identifier (ID), a service ID, an ownership entity ID, a subscription ID, or a service provider ID.

14. The method of claim 1, wherein establishing the first service connectivity comprises using the first service credentials to enable the network to differentiate traffic and identify a quality of service (QoS) policy for a traffic flow associated with the first service credentials.

15. An apparatus for wireless communication by a client device, comprising:
   a memory device; and
   a processing circuit coupled with the memory device and configured to cause the client device to:
      establish a transport connectivity with a network through use of access credentials;
      determine that first data corresponding to a first service is to be transmitted from the client device to the network;
      select first service credentials corresponding to the first service;
      establish a first service connectivity with the network through use of the first service credentials, wherein the first service credentials are used by the client device to generate authorized traffic when the access credentials have been used to gain access to the network;
      receive a traffic binding from the network that defines a packet marking to be added to data packets associated with the first service;
      mark one or more packets associated with the first service with the packet marking; and
      send the first data to the network, wherein the processing circuit is configured to cause the client device to send the first data by being configured to cause the client device to transmit the one or more packets from the client device to the network.

16. The apparatus of claim 15, wherein the processing circuit is further configured to cause the client device to:
   determine that second data corresponding to a second service is to be transmitted from the client device to the network;
   select second service credentials corresponding to the second service;
   establish a second service connectivity with the network through use of the second service credentials; and
   send the second data to the network.

17. The apparatus of claim 16, wherein the processing circuit is configured to cause the client device to establish the transport connectivity by being configured to cause the client device to establish the transport connectivity via a serving node, wherein the processing circuit is configured to cause the client device to establish the first service connectivity by being configured to cause the client device to establish the first service connectivity via the serving node, and wherein the processing circuit is configured to cause the client device to establish the second service connectivity by being configured to cause the client device to establish the second service connectivity via the serving node.

18. The apparatus of claim 15, wherein the establishment of the transport connectivity comprises a negotiation between the client device and the network, and wherein the establishment of the first service connectivity comprises a negotiation between the client device and the network.

19. The apparatus of claim 15, wherein the processing circuit is configured to cause the client device to establish the transport connectivity by being configured to cause the client device to:
perform an attach procedure; and
establish a data connection.

20. The apparatus of claim 15, wherein the processing circuit is configured to cause the client device to establish the transport connectivity by being configured to cause the client device to install data traffic and traffic binding information corresponding to the transport connection being created based on the access credentials.

21. The apparatus of claim 15, wherein the processing circuit is configured to cause the client device to select the first service credentials by being configured to cause the client device to identify the first service credentials based on an application identifier or service identifier included with the first data.

22. The apparatus of claim 15, wherein the processing circuit is configured to cause the client device to send the first data by being configured to cause the client device to mark one or more packets associated with the first service with an identifier of the first service.

23. The apparatus of claim 15, wherein the processing circuit is further configured to cause the client device to receive one or more packets marked with the packet marking at the client device from the network.

24. The apparatus of claim 15, wherein the first service credentials identify to a network an entity to be charged for a given traffic flow and an entity that authorizes transport of the given traffic flow.

25. The apparatus of claim 15, wherein the first service credentials comprise one or more of an ownership entity identifier, a content provider identifier, an application identifier, ownership entity policies, or security credentials.

26. The apparatus of claim 15, wherein the traffic binding comprises a traffic flow template (TFT).

27. The apparatus of claim 15, wherein the packet marking comprises a differentiated services code point (DSCP) marking that includes one or more of: an application identifier (ID), a service ID, an ownership entity ID, a subscription ID, or a service provider ID.

28. The apparatus of claim 15, wherein the processing circuit is configured to cause the client device to establish the first service connectivity by being configured to cause the client device to use the first service credentials to enable the network to differentiate traffic and identify a quality of service (QoS) policy for a traffic flow associated with the first service credentials.

29. An apparatus for wireless communication by a client device, comprising:
means for establishing a transport connectivity with a network through use of access credentials;
means for determining that first data corresponding to a first service is to be transmitted from the client device to the network;
means for selecting first service credentials corresponding to the first service;
means for establishing a first service connectivity with the network through use of the first service credentials, wherein the first service credentials are used by the client device to generate authorized traffic when the access credentials have been used to gain access to the network;
means for receiving a traffic binding from the network that defines a packet marking to be added to data packets associated with the first service;
means for marking one or more packets associated with the first service with the packet marking; and
means for sending the first data to the network, wherein the means for sending comprises means for transmitting the one or more packets from the client device to the network.

* * * * *